(12) United States Patent
Shibuya et al.

(10) Patent No.: US 10,095,081 B2
(45) Date of Patent: Oct. 9, 2018

(54) LIQUID CRYSTAL ELEMENT, DEFLECTION ELEMENT, LIQUID CRYSTAL MODULE, AND ELECTRONIC DEVICE

(71) Applicant: OSAKA UNIVERSITY, Osaka (JP)

(72) Inventors: Giichi Shibuya, Suita (JP); Hiroyuki Yoshida, Suita (JP); Masanori Ozaki, Suita (JP)

(73) Assignee: OSAKA UNIVERSITY, Osaka (JP)

( * ) Notice: Subject to any disclaimer, the term of this patent is extended or adjusted under 35 U.S.C. 154(b) by 0 days.

(21) Appl. No.: 15/545,177

(22) PCT Filed: Jan. 20, 2016

(86) PCT No.: PCT/JP2016/051574
§ 371 (c)(1),
(2) Date: Jul. 20, 2017

(87) PCT Pub. No.: WO2016/117604
PCT Pub. Date: Jul. 28, 2016

(65) Prior Publication Data
US 2018/0031947 A1     Feb. 1, 2018

(30) Foreign Application Priority Data
Jan. 23, 2015   (JP) ................. 2015-011112

(51) Int. Cl.
    *G02F 1/29*     (2006.01)
    *H04N 5/225*     (2006.01)
    *H04N 5/232*     (2006.01)

(52) U.S. Cl.
CPC ............. *G02F 1/29* (2013.01); *H04N 5/2257* (2013.01); *H04N 5/23258* (2013.01); *G02F 2201/122* (2013.01); *H04N 5/2254* (2013.01)

(58) Field of Classification Search
None
See application file for complete search history.

(56) References Cited

U.S. PATENT DOCUMENTS 6,879,431 B2    4/2005   Ide
6,882,482 B2    4/2005   Ogasawara
(Continued)

FOREIGN PATENT DOCUMENTS

JP    2004-101885 A    4/2004
JP    2006-313238 A    11/2006
(Continued)

OTHER PUBLICATIONS

International Search Report issued in PCT/JP2016/051574; dated Apr. 19, 2016.
(Continued)

*Primary Examiner* — Ryan Crockett
(74) *Attorney, Agent, or Firm* — Studebaker & Brackett PC

(57) ABSTRACT

A liquid crystal element includes: a first electrode to which a first voltage is applied; a second electrode to which a second voltage is applied; an insulating layer that is an electrical insulator; a highly resistive layer; a liquid crystal layer containing liquid crystal; a third electrode to which a third voltage is applied; a first boundary layer that is an electrical insulator; and a second boundary layer that faces the first boundary layer with the insulating layer therebetween. The insulating layer is located among the first electrode, the second electrode, and the highly resistive layer, and insulates the first electrode, the second electrode, and the highly resistive layer from one another. The highly resistive layer has an electric resistivity higher than each of electric resistivities of the first electrode and the second electrode, and lower than an electric resistivity of the insulating layer.

12 Claims, 24 Drawing Sheets

(56) References Cited

U.S. PATENT DOCUMENTS

| | | | |
|---|---|---|---|
| 9,389,454 B2 | 7/2016 | Yamaguchi et al. | |
| 9,833,312 B2* | 12/2017 | Galstian | A61F 2/1627 |
| 2003/0179426 A1 | 9/2003 | Ide | |
| 2004/0108984 A1 | 6/2004 | Ogasawara | |
| 2007/0097506 A1 | 5/2007 | Chuang | |
| 2007/0229754 A1* | 10/2007 | Galstian | G02B 3/14 349/200 |
| 2010/0053539 A1* | 3/2010 | Lin | G02F 1/13 349/200 |
| 2012/0188490 A1* | 7/2012 | Zohrabyan | G02F 1/134309 349/96 |
| 2012/0262663 A1* | 10/2012 | Chin | G02B 3/14 349/200 |
| 2013/0314632 A1* | 11/2013 | Zohrabyan | G02F 1/29 349/36 |
| 2014/0028924 A1* | 1/2014 | Yamaguchi | G02F 1/29 349/1 |
| 2014/0049682 A1* | 2/2014 | Galstian | G02B 7/38 348/356 |
| 2014/0340624 A1* | 11/2014 | Kadomi | G02F 1/29 349/139 |
| 2017/0048515 A1* | 2/2017 | Imai | G03B 35/24 |

FOREIGN PATENT DOCUMENTS

| | | |
|---|---|---|
| JP | 2007-094083 A | 4/2007 |
| JP | 2007-128071 A | 5/2007 |
| JP | 2008-134652 A | 6/2008 |
| JP | 2008-203360 A | 9/2008 |
| JP | 2008-216626 A | 9/2008 |
| JP | 2010-044266 A | 2/2010 |
| JP | 2012-073370 A | 4/2012 |
| JP | 2012-137682 A | 7/2012 |
| JP | 2012-141552 A | 7/2012 |
| JP | 5334116 B2 | 11/2013 |
| WO | 2012/099127 A1 | 7/2012 |
| WO | 2013/080819 A1 | 6/2013 |

OTHER PUBLICATIONS

Shibuya et al.; "High speed driving of liquid crystal lens with weakly conductive thin films and boosted pulse"; Applied Optics; Dec. 23, 2014; pp. 1-6.

Shibuya et al.; "New application of liquid crystal lens of active polarized filter for micro camera"; Optics Express; Dec. 3, 2012; pp. 27520-27529; vol. 20, No. 25.

Shibuya et al.; "Novel Fresnel Type Mechaless Optical Device Using Liquid Crystal and Future Prospect of the Same"; Optical and Electro-Optical Engineering Contact; Nov. 20, 2015; pp. 19-26; vol. 53, No. 11.

Shibuya et al.; "Tunable Optical Deflector with Fresnel Type of Liquid Crystal Device"; Proceedings of International Display Workshops (IDW' 15); Dec. 9, 2015; pp. 170-173; vol. 22; LCTp6-4.

Uchida et al.; "Deflection of Illumination Light by using a Liquid-crystal Cylindrical-lens-array with Slit-patterned Electrodes (II)"; Proceedings of the 62nd JSAP Spring Meeting; 2015; Shonan Campus, Tokai University; and an English translation thereof.

Kawamura et al.; "Liquid-crystal micro-lens array with two-divided and tetragonally hole-patterned electrodes"; Optics Express; Nov. 4, 2013; pp. 26520-26526; vol. 21, No. 22; DOI:10.1364/OE.21.026520.

* cited by examiner ly, the liquid crystal element of the present invention further includes a first boundary layer that is an electrical insulator and a second boundary layer. The second boundary layer is a resistor having an electric resistivity higher than the electric resistivity of the resistive layer or an electrical insulator. Preferably, the first electrode and the second electrode constitute a unit electrode, and the unit electrode includes a plurality of unit electrodes. A second electrode of one unit electrode of mutually adjacent unit electrodes among the plurality of unit electrodes is adjacent to a first electrode of the other unit electrode of the mutually adjacent unit electrodes. Preferably, the first boundary layer is located between the second electrode and the first electrode that are adjacent to each other. Preferably, the resistive layer includes a plurality of resistive layers corresponding to the plurality of unit electrodes, and the second boundary layer is located between mutually adjacent resistive layers among the plurality of resistive layers.

LIQUID CRYSTAL ELEMENT, DEFLECTION ELEMENT, LIQUID CRYSTAL MODULE, AND ELECTRONIC DEVICE

TECHNICAL FIELD

The present invention relates to a liquid crystal element, a deflection element, a liquid crystal module, and an electronic device.

BACKGROUND ART

A deflection element described in Patent Literature 1 includes a sheet-like first transparent electrode, a liquid crystal layer, and a sheet-like second transparent electrode. A pair of first terminals are formed along respective opposite ends of the first transparent electrode in an up-down direction. A pair of second terminals are formed along respective opposite ends of the second transparent electrode in a left-right direction.

When a first voltage is applied to one first terminal of the pair of first terminals and a second voltage different from the first voltage is applied to the other first terminal in order to deflect light downwards, an electric potential gradient linearly varying from the one first terminal to the other first terminal is formed in the first transparent electrode since the first transparent electrode is a highly resistive film. Therefore, refractive index distribution corresponding to the electric potential gradient in the first transparent electrode is formed in the liquid crystal layer. As a result, exiting light is deflected downwards.

CITATION LIST

Patent Literature

[Patent Literature 1] Japanese Patent Application Laid-Open Publication No. 2006-313238

SUMMARY OF INVENTION

Technical Problem

However, in the deflection element described in Patent Literature 1, electric current flows from the one first terminal to the other first terminal, resulting in an increase of power loss.

The present invention was made in view of the above-described problem, and it is an object of the present invention to provide a liquid crystal element, a deflection element, a liquid crystal module, and an electronic device, which can refract light while reducing power loss.

Solution to Problem

According to a first aspect of the present invention, a liquid crystal element refracts light exiting therefrom. The liquid crystal element includes: a first electrode to which a first voltage is applied; a second electrode to which a second voltage different from the first voltage is applied; an insulating layer that is an electrical insulator; a resistive layer; a liquid crystal layer containing liquid crystal; and a third electrode to which a third voltage is applied. The insulating layer is located among the first electrode, the second electrode, and the resistive layer, and insulates the first electrode, the second electrode, and the resistive layer from one another. The resistive layer has an electric resistivity higher than each of electric resistivities of the first electrode and the second electrode, and lower than an electric resistivity of the insulating layer. The resistive layer and the liquid crystal layer are located between the insulating layer and the third electrode. The resistive layer is located between the insulating layer and the liquid crystal layer.

Preferably, the liquid crystal element of the present invention further includes a boundary electrode to which a fourth voltage different from the first voltage and the second voltage is applied. Preferably, the fourth voltage is lower than a higher one of the first and second voltages. Preferably, the first electrode and the second electrode constitute a unit electrode, and the unit electrode includes a plurality of unit electrodes. A second electrode of one unit electrode of mutually adjacent unit electrodes among the plurality of unit electrodes is adjacent to a first electrode of the other unit electrode of the mutually adjacent unit electrodes. Preferably, the boundary electrode is located between the second electrode and the first electrode that are adjacent to each other.

In the liquid crystal element of the present invention, the first voltage, the second voltage, and the fourth voltage each are preferably an alternating current voltage, and the fourth voltage preferably has a frequency higher than each of frequencies of the first voltage and the second voltage.

In the liquid crystal element of the present invention, the first electrode and the second electrode preferably linearly extend side by side.

In the liquid crystal element of the present invention, the liquid crystal layer preferably has a linear electric potential gradient relative to a direction from the first electrode to the second electrode.

Preferably, the liquid crystal element of the present invention further includes a center electrode having a circular ring shape. Preferably, the first electrode and the second electrode constitute a unit electrode, and the center electrode and the unit electrode are in concentric circular arrangement centered about the center electrode. The unit electrode has a width that indicates a distance between the first electrode and the second electrode. The second electrode preferably has a radius larger than a radius of the first electrode.

In the liquid crystal element of the present invention, the unit electrode preferably includes a plurality of unit electrodes. Preferably, the center electrode and the plurality of unit electrodes are in concentric circular arrangement centered about the center electrode. In mutually adjacent unit electrodes among the plurality of unit electrodes, a unit electrode having a larger radius than the other unit electrode preferably has a width smaller than a width of the other unit electrode having a smaller radius. In each of the plurality of unit electrodes, the width of the unit electrode indicates a distance between the first electrode and the second electrode. Preferably, the second electrode has a radius larger than a radius of the first electrode, and the radius of the second electrode represents the radius of the unit electrode.

In the liquid crystal element of the present invention, a radius Rn of each of the plurality of unit electrodes is preferably represented by an expression shown below. In the expression, n represents an integer from 1 to N assigned to the respective plurality of unit electrodes incrementally from a unit electrode having a smallest radius to a unit electrode having a largest radius among the plurality of unit electrodes. N represents the number of the plurality of unit electrodes, and Rc represents a radius of the center electrode.

$$Rn=(n+1)^{1/2} \times Rc \quad \text{[Expression 1]}$$

Preferably, the liquid crystal element of the present invention further includes a first lead wire, a second lead wire, a third boundary layer, and an opposed layer. Preferably, the first voltage is applied to the first lead wire. Preferably, the second voltage is applied to the second lead wire. Preferably, the third boundary layer is an electrical insulator and located between the first lead wire and the second lead wire. Preferably, the opposed layer is a resistor having an electric resistivity higher than the electric resistivity of the resistive layer or an electrical insulator. Preferably, the first electrode and the second electrode each have a shape of an open curve. Preferably, one end of opposite ends of the first electrode is connected to the first lead wire, and the other end of the opposite ends of the first electrode is located opposite to the second lead wire. Preferably, one end of opposite ends of the second electrode is connected to the second lead wire, and the other end of the opposite ends of the second electrode is located opposite to the first lead wire. Preferably, the opposed layer is located opposite to the first lead wire, the third boundary layer, and the second lead wire with the insulating layer therebetween.

In the liquid crystal element of the present invention, the first electrode and the second electrode preferably constitute a unit electrode. A distance between the first electrode and the second electrode of the unit electrode is preferably larger than each of a width of the first electrode and a width of the second electrode.

According to a second aspect of the present invention, a deflection element deflects light exiting therefrom. The deflection element includes two liquid crystal elements each being the liquid crystal element according to the above-described first aspect. The first electrode and the second electrode of one liquid crystal element of the two liquid crystal elements extend along a first direction. The first electrode and the second electrode of the other liquid crystal element of the two liquid crystal elements extend along a second direction orthogonal to the first direction. The one liquid crystal element and the other liquid crystal element overlap with each other.

According to a third aspect of the present invention, a liquid crystal module includes the liquid crystal element according to the first aspect and a cover member covering an imaging element. The liquid crystal element is attached to an outer surface portion of the cover member to be located opposite to an imaging surface of the imaging element.

According to a fourth aspect of the present invention, an electronic device includes the liquid crystal element according to the first aspect, an imaging element, a cover member covering the imaging element, and a housing. The housing accommodates the liquid crystal element, the imaging element, and the cover member. The liquid crystal element is attached to an inner surface portion of the housing to be located opposite to an imaging surface of the imaging element.

According to a fifth aspect of the present invention, an electronic device includes the liquid crystal element according to the above-described first aspect, an imaging element that images an object through the liquid crystal element, a vibration sensor that detects vibration due to camera shaking, and a controller. The controller controls either or both of the first voltage and the second voltage depending on vibration detected by the vibration sensor to refract light incident on the imaging element through the liquid crystal element.

Advantageous Effects of Invention

According to the present invention, light can be refracted while reducing power loss.

DESCRIPTION OF EMBODIMENTS

Figure 1A:
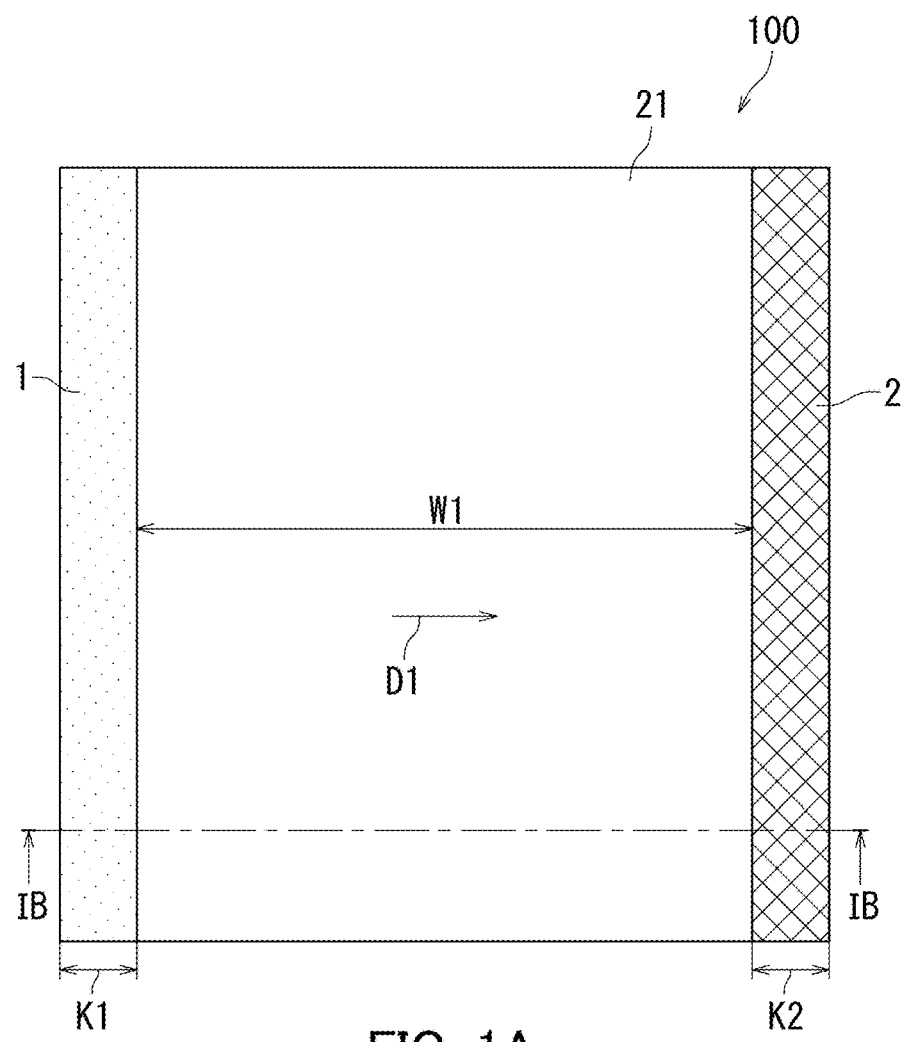
FIG. 1A is a plan view of a liquid crystal element according to a first embodiment of the present invention.

The following describes embodiments of the present invention with reference to the drawings. Elements that are the same or equivalent are indicated by the same reference signs in the drawings and description thereof will not be repeated. Hatching indicating a cross section will be omitted as appropriate in order to simplify the drawings. In the description of the embodiments of the present invention, refraction of light may be described as deflection of light, in which case, a refracting angle of light will be referred to as a deflection angle of light. Alternatively, deflection of light may be described as refraction of light, in which case, a deflection angle of light will be referred to as a refracting angle of light.

First Embodiment

Figure 1B:
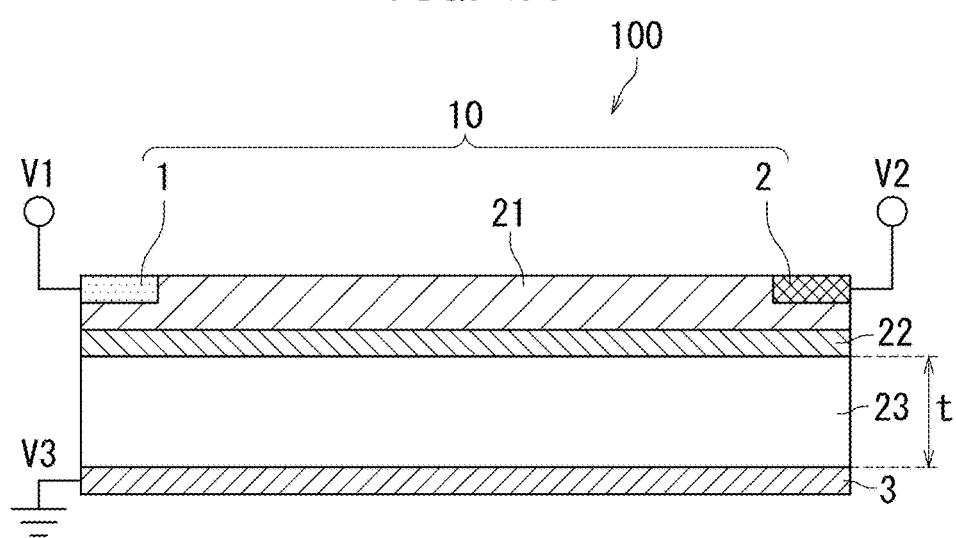
FIG. 1B is a cross-sectional view of the liquid crystal element according to the first embodiment of the present invention.

FIG. 1A is a plan view of a liquid crystal element 100 according to a first embodiment of the present invention. FIG. 1B is a cross-sectional view taken along a line IB-IB in FIG. 1A. The liquid crystal element 100 refracts light exiting therefrom. Therefore, the liquid crystal element 100 can for example be used as a deflection element that deflects light exiting therefrom or a lens that focuses or disperses light.

As illustrated in FIGS. 1A and 1B, the liquid crystal element 100 includes a first electrode 1, a second electrode 2, an insulating layer 21, a highly resistive layer 22 (resistive layer), a liquid crystal layer 23, and a third electrode 3.

A first voltage V1 is applied to the first electrode 1. The first electrode 1 is located opposite to one end region of a pair of end regions of the third electrode 3 with the insulating layer 21, the highly resistive layer 22, and the liquid crystal layer 23 therebetween. The first electrode 1 is for example transparent and formed from ITO (indium tin oxide).

A second voltage V2 different from the first voltage V1 is applied to the second electrode 2. The second electrode 2 is located opposite to the other end region of the pair of end regions of the third electrode 3 with the insulating layer 21, the highly resistive layer 22, and the liquid crystal layer 23 therebetween. The second electrode 2 is for example transparent and formed from ITO.

The first electrode 1 and the second electrode 2 are located at the same layer level and opposite to each other with the insulating layer 21 therebetween. The first electrode 1 and the second electrode 2 constitute a unit electrode 10 and linearly extend side by side with a distance W1 therebetween. The distance W1 between the first electrode 1 and the second electrode 2 of the unit electrode 10 is larger than each of a width K1 of the first electrode 1 and a width K2 of the second electrode 2. However, the distance W1 may be set to any value. The distance W1 indicates a distance between inner edges of the first electrode 1 and the second electrode 2. The distance W1 may be referred to as a width W1 of the unit electrode 10. The distance W1 may also be referred to as a width W1 of the liquid crystal layer 23. Further, lengths of the first electrode 1 and the second electrode 2 may be set to any values. The width K1 indicates a dimension of the first electrode 1 along a short direction of the first electrode 1. In other words, the width K1 indicates a dimension of the first electrode 1 along a direction D1. The width K2 indicates a dimension of the second electrode 2 along a short direction of the second electrode 2. In other words, the width K2 indicates a dimension of the second electrode 2 along the direction D1.

The insulating layer 21 is an electrical insulator. The insulating layer 21 is located among the first electrode 1, the second electrode 2, and the highly resistive layer 22, and electrically insulates the first electrode 1, the second electrode 2, and the highly resistive layer 22 from one another. The insulating layer 21 is for example transparent and formed from silicon dioxide ($SiO_2$).

The highly resistive layer 22 has a sheet-like shape and a single-layer structure and is located between the insulating layer 21 and the liquid crystal layer 23. The highly resistive layer 22 is located opposite to the unit electrode 10 with the insulating layer 21 therebetween. The highly resistive layer 22 has an electric resistivity higher than each of electric resistivities of the first electrode 1 and the second electrode 2 and lower than an electric resistivity of the insulating layer 21. For example, the highly resistive layer 22 has a surface resistivity higher than each of surface resistivities of the first electrode 1 and the second electrode 2 and lower than a surface resistivity of the insulating layer 21. A surface resistivity of a material is calculated by dividing an electric resistivity of the material by a thickness of the material.

For example, the highly resistive layer 22 has a surface resistivity of at least $5 \times 10^3 \Omega/\square$ and no greater than $5 \times 10^9 \Omega/\square$, the first electrode 1 and the second electrode 2 each have a surface resistivity of at least $5 \times 10^{-1} \Omega/\square$ and no greater than $5 \times 10^2 \Omega/\square$, and the insulating layer 21 has a surface resistivity of at least $1 \times 10^{11} \Omega/\square$ and no greater than $1 \times 10^{15} \Omega/\square$. For example, the highly resistive layer 22 may have a surface resistivity of at least $1 \times 10^2 \Omega/\square$ and no greater than $1 \times 10^{11} \Omega/\square$, the first electrode 1 and the second electrode 2 may each have a surface resistivity of at least $1 \times 10^{-2} \Omega/\square$ and no greater than $1 \times 10^2 \Omega/\square$, and the insulating layer 21 may have a surface resistivity of at least $1 \times 10^{11} \Omega/\square$ and no greater than $1 \times 10^{16} \Omega/\square$. The highly resistive layer 22 is for example transparent and formed from zinc oxide (ZnO).

The liquid crystal layer 23 contains liquid crystal. The liquid crystal layer 23 is located between the highly resistive layer 22 and the third electrode 3. The liquid crystal layer 23 has a thickness t. The liquid crystal is for example nematic liquid crystal. The liquid crystal exhibits homogeneous alignment when the first voltage V1 and the second voltage V2 are not applied and there is no electric field. The liquid crystal is for example transparent. The thickness t of the liquid crystal layer 23 is for example at least 5 μm and no greater than 100 μm.

A third voltage V3 is applied to the third electrode 3. In the first embodiment, the third electrode 3 is grounded and the third voltage V3 is set to the ground potential (0 V). The third electrode 3 has a sheet-like shape and a single-layer structure. The third electrode 3 is for example transparent and formed from ITO. For example, the first electrode 1, the second electrode 2, and the third electrode 3 have substantially the same electric resistivity (for example, surface resistivity).

According to the first embodiment described above, light can be refracted while reducing power loss. That is, no electric current flows between the first electrode 1 and the second electrode 2 since the first electrode 1 and the second electrode 2 are insulated from each other by the insulating layer 21. Therefore, power loss in the liquid crystal element 100 is reduced. Further, when the first voltage V1 is applied to the first electrode 1 and the second voltage V2 is applied to the second electrode 2, an electric potential gradient is formed in the liquid crystal layer 23 due to the presence of the highly resistive layer 22. As a result, light incident on the liquid crystal element 100 can be refracted at a refracting angle corresponding to the electric potential gradient.

Figure 2A:
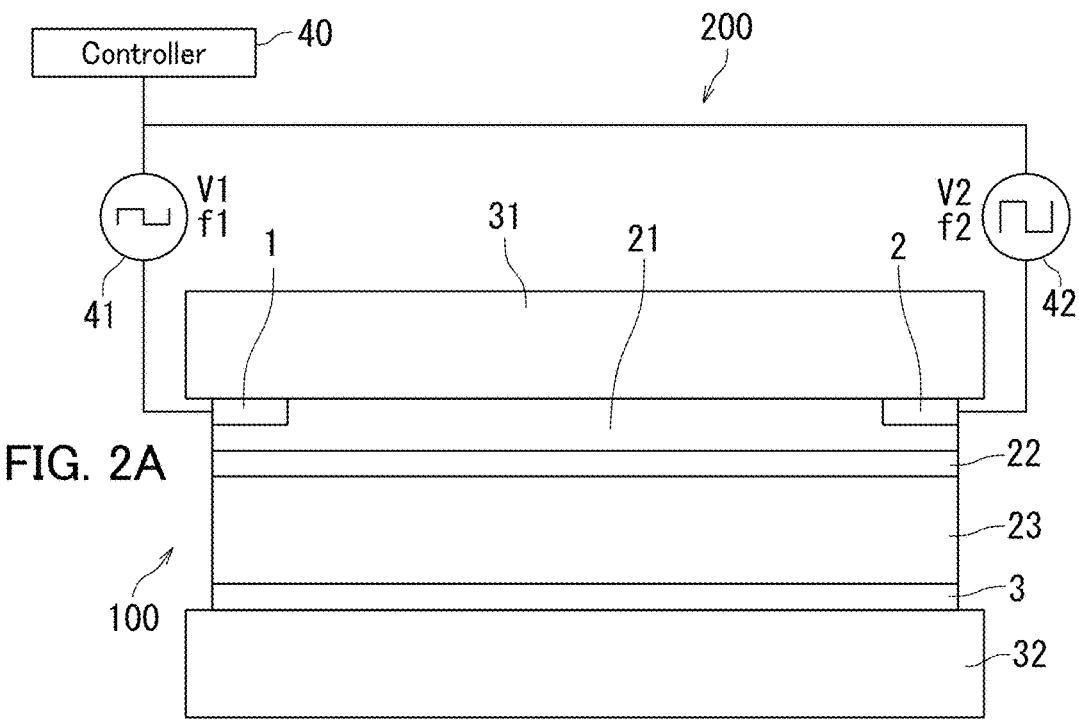
FIG. 2A is a cross-sectional view illustrating details of the liquid crystal element according to the first embodiment of the present invention.
Figure 2B:
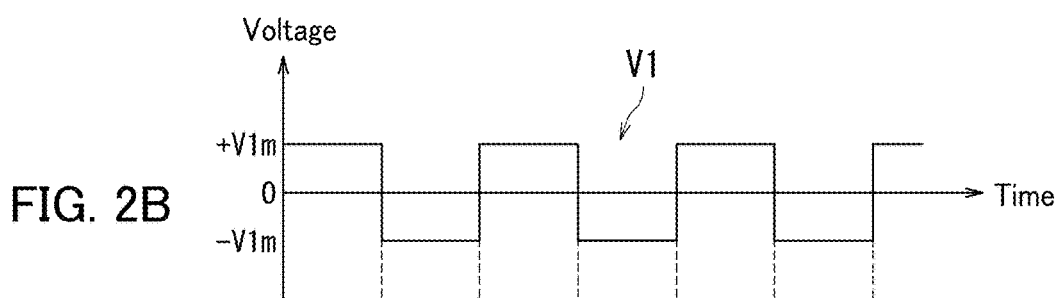
FIG. 2B is a diagram illustrating a waveform of a first voltage applied to a first electrode of the liquid crystal element according to the first embodiment of the present invention.
Figure 2C:
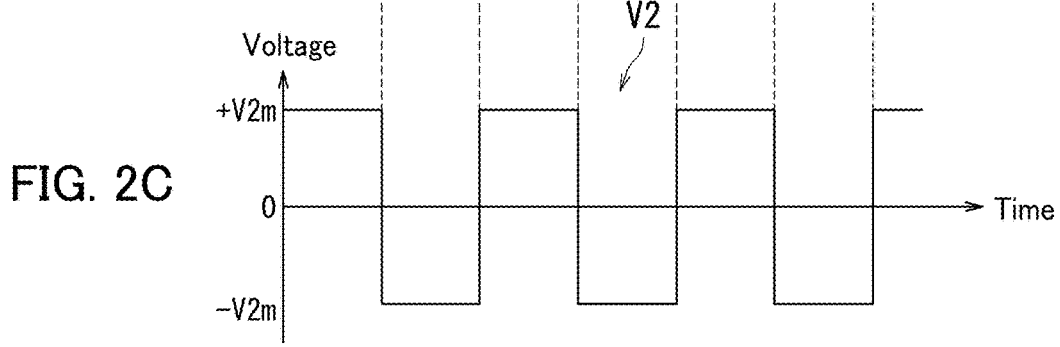
FIG. 2C is a diagram illustrating a waveform of a second voltage applied to a second electrode of the liquid crystal element according to the first embodiment of the present invention.

The following describes details of the liquid crystal element 100 with reference to FIGS. 2A to 2C. FIG. 2A is a cross-sectional view illustrating details of the liquid crystal element 100. FIG. 2B is a diagram illustrating a waveform of the first voltage V1 applied to the first electrode 1. FIG. 2C is a diagram illustrating a waveform of the second voltage V2 applied to the second electrode 2.

As illustrated in FIG. 2A, the liquid crystal element 100 further includes a first substrate 31 and a second substrate 32. The first electrode 1, the second electrode 2, and the insulating layer 21 are formed on the first substrate 31. Further, the highly resistive layer 22 is formed on the first substrate 31 with the insulating layer 21 therebetween. On the other hand, the third electrode 3 is formed on the second substrate 32. The first substrate 31 and the second substrate 32 are spaced apart from each other with a constant distance therebetween using spacers such that the liquid crystal layer 23 is interposed between the first substrate 31 and the second substrate 32. For example, the first substrate 31 and the second substrate 32 are each transparent and formed from a glass.

The liquid crystal element 100 is included in a liquid crystal device 200. The liquid crystal device 200 further includes a controller 40 such as a computer, a first power supply circuit 41, and a second power supply circuit 42. The controller 40 controls the first power supply circuit 41 and the second power supply circuit 42.

The first power supply circuit 41 generates the first voltage V1 under control by the controller 40 as illustrated in FIGS. 2A and 2B. The first power supply circuit 41 is connected to the first electrode 1 and applies the first voltage V1 to the first electrode 1. The first voltage V1 is an alternating current voltage having a frequency f1. The first voltage V1 is a square wave having a maximum amplitude V1m. For example, the maximum amplitude V1m is at least 0 V and no greater than 50 V and the frequency f1 is at least 100 Hz and no greater than 10 kHz.

The second power supply circuit 42 generates the second voltage V2 under control by the controller 40 as illustrated in FIGS. 2A and 2C. The second power supply circuit 42 is connected to the second electrode 2 and applies the second voltage V2 to the second electrode 2. The second voltage V2 is an alternating current voltage having a frequency f2. The frequency f2 is the same as the frequency f1. The second voltage V2 is a square wave having a maximum amplitude V2m. For example, the maximum amplitude V2m is at least 2 V and no greater than 100 V. However, the maximum amplitude V2m is larger than the maximum amplitude V1m. In the first embodiment, the maximum amplitude V2m is twice the maximum amplitude V1m. The second voltage V2 matches the first voltage V1 in phase. However, the second voltage V2 need not match the first voltage V1 in phase.

Figure 3A:
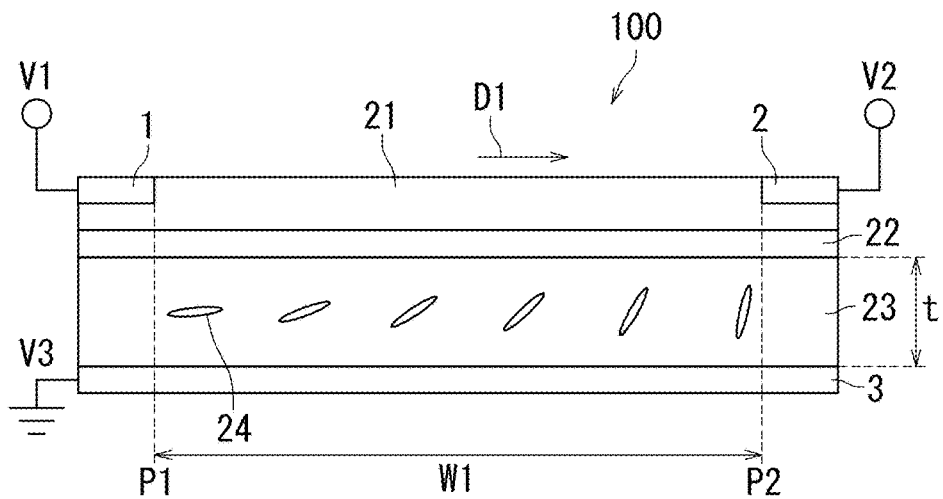
FIG. 3A is a cross-sectional view of the liquid crystal element according to the first embodiment of the present invention.
Figure 3B:
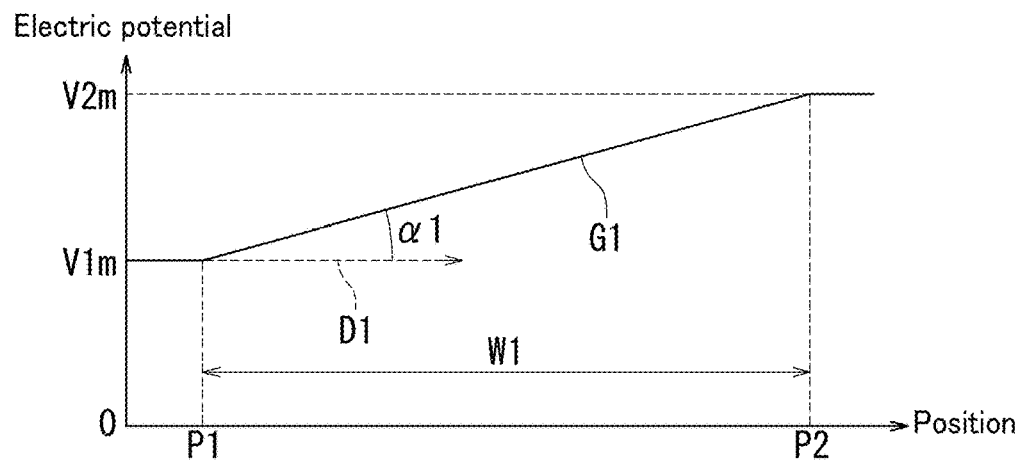
FIG. 3B is a diagram illustrating an electric potential gradient formed in the liquid crystal element according to the first embodiment of the present invention.
Figure 3C:
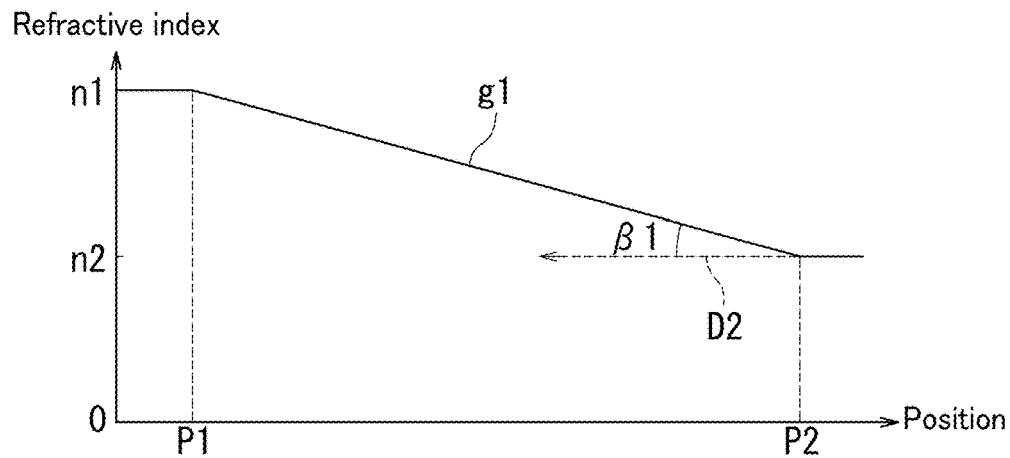
FIG. 3C is a diagram illustrating a refractive index gradient formed in the liquid crystal element according to the first embodiment of the present invention.
Figure 4:
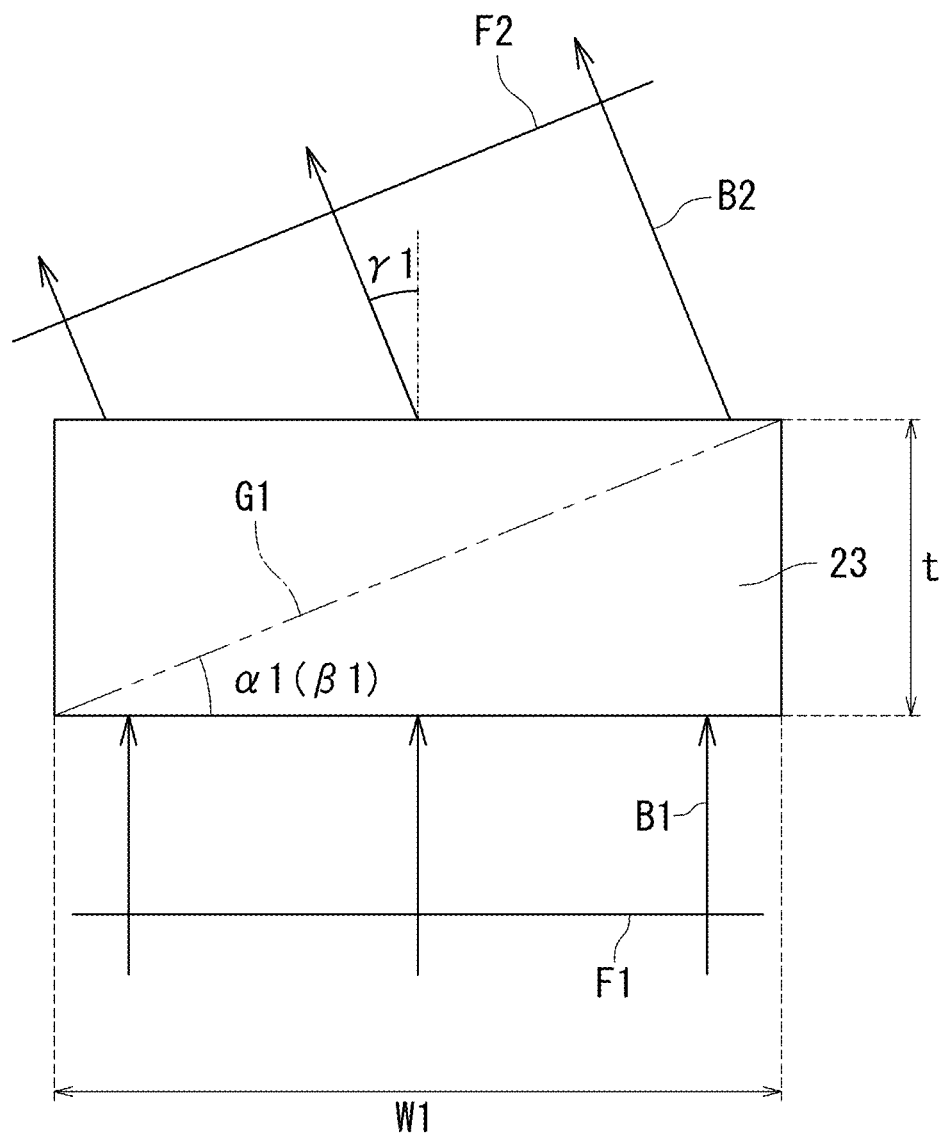
FIG. 4 is a diagram illustrating incoming beams incident on the liquid crystal element according to the first embodiment of the present invention and outgoing beams exiting from the liquid crystal element.

A mechanism by which the liquid crystal element 100 refracts light will be described with reference to FIGS. 3A to 4. FIG. 3A is a cross-sectional view of the liquid crystal element 100. FIG. 3B is a diagram illustrating an electric potential gradient G1 formed in the liquid crystal element 100. FIG. 3C is a diagram illustrating a refractive index gradient g1 formed in the liquid crystal element 100. In FIGS. 3A to 3C, positions P1 and P2 indicate positions in the liquid crystal layer 23 along the direction D1. FIG. 4 is a diagram illustrating incoming beams B1 incident on the liquid crystal element 100 and outgoing beams B2 exiting from the liquid crystal element 100.

As illustrated in FIG. 3A, the liquid crystal layer 23 contains a large number of liquid crystal molecules 24 (a plurality of liquid crystal molecules) and has the following characteristics. That is, a tilt angle of the liquid crystal molecule 24, which indicates an inclination angle of the liquid crystal molecule 24 relative to the direction D1, increases with an increase in magnitude of an electric field applied to the liquid crystal molecule 24. The direction D1 is a direction from the first electrode 1 to the second electrode 2 and is substantially orthogonal to longitudinal directions of the first electrode 1 and the second electrode 2 (see FIG. 1A) and substantially parallel to the liquid crystal layer 23. A refractive index of the liquid crystal layer 23 decreases with an increase in the tilt angle of the liquid crystal molecule 24.

The description will be continued based on the above-described characteristics of the liquid crystal layer 23. When the first voltage V1 is applied to the first electrode 1 and the second voltage V2 is applied to the second electrode 2, a smooth linear electric potential gradient G1 is formed in the liquid crystal layer 23 relative to the direction D1 by an effect of the highly resistive layer 22, as illustrated in FIGS. 3A and 3B. The "smooth" electric potential gradient G1 means that the electric potential gradient is not stepwise. The electric potential gradient G1 is formed in a manner that the electric potential increases in the direction D1, since the maximum amplitude V2m of the second voltage V2 is larger than the maximum amplitude V1m of the first voltage V1. The electric potential gradient G1 varies continuously from beneath the first electrode 1 to beneath the second electrode 2 with no extrema (minimal values and maximal values).

The electric potential gradient G1 relative to the direction D1 is represented by a gradient angle α1. The gradient angle α1 can be varied by varying a difference (V2m−V1m) between the maximum amplitude V2m of the second voltage V2 and the maximum amplitude V1m of the first voltage V1. For example, as illustrated in FIG. 2A, the controller 40 controls the first power supply circuit 41 to maintain the maximum amplitude V1m of the first voltage V1 constant and controls the second power supply circuit 42 to vary the maximum amplitude V2m of the second voltage V2. As a result, the difference (V2m−V1m) is varied, whereby the gradient angle α1 is varied.

It should be noted that the controller 40 may control the second power supply circuit 42 to maintain the maximum amplitude V2m constant and control the first power supply circuit 41 to vary the maximum amplitude V1m in order to vary the difference (V2m−V1m) and the gradient angle α1.

The shape of the electric potential gradient G1 is determined depending on the frequencies f1 and f2 and the electric resistivity (for example, surface resistivity) of the highly resistive layer 22. In the first embodiment, the frequencies f1 and f2 and the electric resistivity of the highly resistive layer 22 are determined such that the electric potential gradient G1 has a linear shape.

As a result of formation of the linear electric potential gradient G1 in the liquid crystal layer 23, a linear refractive index gradient g1 is formed in the liquid crystal layer 23 relative to a direction D2 as illustrated in FIGS. 3B and 3C. The direction D2 is opposite to the direction D1. Since the electric potential of the liquid crystal layer 23 increases in the direction D1, the tilt angle of the liquid crystal molecule 24 gradually decreases in the direction D2. Therefore, the refractive index gradient g1 is formed in a manner that the refractive index increases in the direction D2. The refractive index of the liquid crystal layer 23 at the position P1 is n1 and the refractive index of the liquid crystal layer 23 at the position P2 is n2, which is smaller than n1. The refractive index gradient g1 varies continuously from beneath the first electrode 1 to beneath the second electrode 2 with no extrema (minimal values and maximal values).

The refractive index gradient g1 relative to the direction D2 is represented by a gradient angle β1. The gradient angle β1 is represented by expression (1) shown below. The gradient angle β1 is substantially proportional to the gradient angle α1. In the first embodiment, the gradient angle β1 is substantially the same as the gradient angle α1.

$$\beta 1 = \arctan((n1-n2)t/W1) \quad (1)$$

As illustrated in FIGS. 3A to 3C and 4, the refractive index gradient g1 corresponding to the electric potential gradient G1 is formed in the liquid crystal layer 23. Therefore, incoming beams B1 substantially perpendicularly incident on the liquid crystal layer 23 are refracted at a refracting angle γ1 corresponding to the gradient angles α1 and β1 and exit as the outgoing beams B2. The refracting angle γ1 is an angle of a direction of travel of the outgoing beams B2 relative to a direction of travel of the incoming beams B1. In the first embodiment, the refracting angle γ1 is substantially the same as each of the gradient angles α1 and β1. Since the electric potential gradient G1 has a linear shape, the refractive index gradient g1 also has a linear shape. Therefore, a wavefront F2 of the outgoing beams B2 is substantially in a straight line. It should be noted that a wavefront F1 of the incoming beams B1 is substantially parallel to the liquid crystal layer 23.

The incoming beams B1 are refracted toward a side on which the first electrode 1 is located since light is typically refracted toward a side having a larger refractive index. However, the incoming beams B1 can be refracted toward a side on which the second electrode 2 is located as described below. That is, as illustrated in FIG. 2A, the controller 40 controls the first power supply circuit 41 and the second power supply circuit 42 to make the maximum amplitude V1m of the first voltage V1 larger than the maximum amplitude V2m of the second voltage V2 so that the electric potential gradient G1 is formed in a manner that the electric potential increases in the direction D2. Therefore, the refractive index gradient g1 is formed in a manner that the refractive index increases in the direction D1. As a result, the incoming beams B1 are refracted toward a side on which the second electrode 2 is located.

As described above with reference to FIGS. 3A to 3C and 4, power loss is reduced in the first embodiment due to the presence of the insulating layer 21. Further, when the first voltage V1 and the second voltage V2 are applied to the first electrode 1 and the second electrode 2, respectively, the electric potential gradient G1 and the refractive index gradient g1 are formed due to the presence of the highly resistive layer 22. As a result, the incoming beams B1 are refracted in accordance with the electric potential gradient G1.

In the first embodiment, the electric potential gradient G1 is formed in the liquid crystal layer 23 using the first electrode 1 and the second electrode 2 located at the same layer level. Therefore, the liquid crystal element 100 has simpler structure as compared with a configuration in which a multiplicity of (at least three) electrodes located at the same layer level are used to form an electric potential gradient. As a result, a manufacturing cost of the liquid crystal element 100 can be reduced and a manufacturing yield of the liquid crystal element 100 can be increased.

Further, according to the first embodiment, the incoming beams B1 are refracted at the refracting angle γ1 that is substantially the same as the gradient angle α1 as a result of formation of the linear electric potential gradient G1. Also, the wavefront F2 of the outgoing beams B2 is substantially in a straight line since the smooth linear electric potential gradient G1 is formed by the effect of the highly resistive layer 22. As a result, wavefront aberration of the outgoing beams B2 is reduced as compared with a situation in which a stepwise electric potential gradient is formed using a multiplicity of (at least three) electrodes located at the same layer level. It should be noted that if an electric potential gradient is stepwise, a wavefront of outgoing beams becomes stepwise and therefore wavefront aberration occurs. Further, the wavefront F2 of the outgoing beams B2 is further approximated to a straight line due to the absence of extrema in the electric potential gradient G1. Therefore, the liquid crystal element 100 is capable of effectively functioning as a deflection element.

Further, in the first embodiment, the distance W1 between the first electrode 1 and the second electrode 2 is larger than each of the width K1 of the first electrode 1 and the width K2 of the second electrode 2. Therefore, relative to a total light quantity of incoming beams incident on the liquid crystal element 100, a proportion of a light quantity of outgoing beams refracted at the refracting angle γ1 can be easily made larger than a proportion of a light quantity of outgoing beams traveling straight. As a result, the liquid crystal element 100 is capable of more effectively functioning as a deflection element.

The distance W1 between the first electrode 1 and the second electrode 2 is preferably at least twice the width K1 of the first electrode 1 and at least twice the width K2 of the second electrode 2. In this case, the liquid crystal element 100 is capable of more effectively functioning as a deflection element. For example, the distance W1 is preferably five times the width K1 and five times the width K2.

In the first embodiment, the distance W1 between the first electrode 1 and the second electrode 2 is larger than each of the width K1 of the first electrode 1 and the width K2 of the second electrode 2. Further, the highly resistive layer 22 extends over a wide area (as wide as the distance W1) from beneath the first electrode 1 to beneath the second electrode 2. Therefore, the electric potential gradient G1 having no extrema can be easily formed from beneath the first electrode 1 to beneath the second electrode 2 by appropriately setting the maximum amplitudes V1m and V2m, the frequencies f1 and f2, and resistivity of the highly resistive layer 22. As a result, the wavefront F2 of the outgoing beams B2 is further approximated to a straight line, and the liquid crystal element 100 is capable of more effectively functioning as a deflection element.

Further, in the first embodiment, the electric potential gradient G1 is formed in the liquid crystal layer 23 using the linear first electrode 1 and the linear second electrode 2 as illustrated in FIGS. 1A and 3B. Therefore, an electric potential gradient plane is formed in the liquid crystal layer 23 along longitudinal directions of the first electrode 1 and the second electrode 2. The electric potential gradient plane is formed by the electric potential gradient G1 that is continuous along the longitudinal directions of the first electrode 1 and the second electrode 2. Therefore, the incoming beams B1 can be caused to exit after being refracted in a manner that the refracting angle γ1 is substantially constant in the longitudinal directions of the first electrode 1 and the second electrode 2. This is particularly effective in a case where the liquid crystal element 100 is used as a deflection element.

Further, as described above with reference to FIGS. 2A and 3B, according to the first embodiment, the gradient angle α1 and consequently the refracting angle γ1 can be easily varied in the single liquid crystal element 100 by merely varying the maximum amplitude V1m of the first voltage V1 or the maximum amplitude V2m of the second voltage V2 while keeping the thickness t of the liquid crystal layer 23 unchanged. Also, a direction of refraction of the incoming beams B1 can be altered toward a side on which the first electrode 1 is located or toward a side on which the second electrode 2 is located by merely changing which of the maximum amplitude V1m of the first voltage V1 and the maximum amplitude V2m of the second voltage V2 is larger than the other.

Second Embodiment

The following describes a liquid crystal element 100 according to a second embodiment of the present invention with reference to FIG. 5. The liquid crystal element 100 according to the second embodiment differs from the liquid crystal element 100 according to the first embodiment in that a serration-like electric potential gradient is formed in a liquid crystal layer 23 by providing two unit electrodes 10. The following mainly describes differences between the second embodiment and the first embodiment.

Figure 5A:
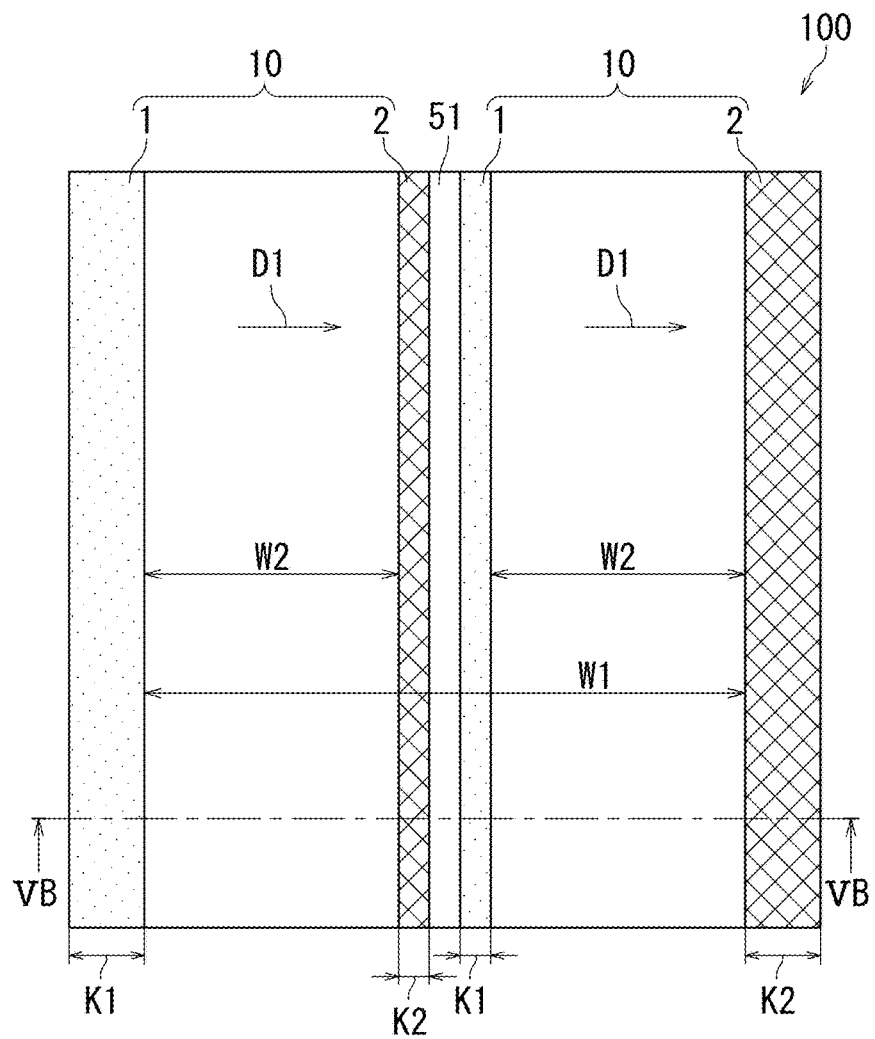
FIG. 5A is a plan view of a liquid crystal element according to a second embodiment of the present invention.
Figure 5B:
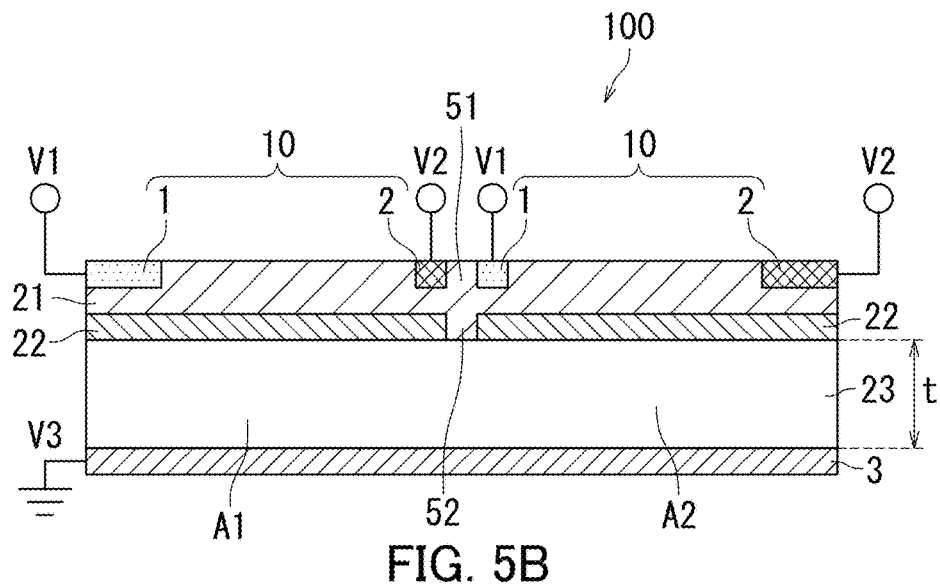
FIG. 5B is a cross-sectional view of the liquid crystal element according to the second embodiment of the present invention.

FIG. 5A is a plan view of the liquid crystal element 100 according to the second embodiment. FIG. 5B is a cross-sectional view taken along a line VB-VB in FIG. 5A. As illustrated in FIGS. 5A and 5B, the liquid crystal element 100 includes two unit electrodes 10 and two highly resistive layers 22 (two resistive layers) corresponding to the respective two unit electrodes 10. The liquid crystal element 100 further includes a first boundary layer 51 and a second boundary layer 52 in addition to the structure of the liquid crystal element 100 according to the first embodiment.

The two unit electrodes 10 are located at the same layer level. A second electrode 2 of one unit electrode 10 of the mutually adjacent unit electrodes 10 is adjacent to a first electrode 1 of the other unit electrode 10. The first electrode 1 and the second electrode 2 of each unit electrode 10 linearly extend side by side with a distance W2 therebetween. The distance W2 between the first electrode 1 and the second electrode 2 of each unit electrode 10 is larger than each of a width K1 of the first electrode 1 and a width K2 of the second electrode 2. However, the distance W2 may be set to any value. The distance W2 indicates a distance between an inner edge of the first electrode 1 and an inner edge of the second electrode 2 constituting each unit electrode 10. The distance W2 may be referred to as a width W2 of the unit electrode 10. Lengths of the first electrode 1 and the second electrode 2 may be set to any values. A first voltage V1 is applied to each first electrode 1 and a second voltage V2 is applied to each second electrode 2. A first electrode 1 and a second electrode 2, which are farthest from each other, are spaced apart from each other by a distance W1 that is substantially the same as the distance W1 between the first electrode 1 and the second electrode 2 in the first embodiment. The distance W1 indicates a distance between an inner edge of the first electrode 1 and an inner edge of the second electrode 2 that are farthest from each other. The distance W1 may be referred to as a width W1 of the liquid crystal layer 23.

Widths of the two first electrodes 1 are each referred to as the "width K1" and widths of the two second electrodes 2 are each referred to as the "width K2". Similarly to the first embodiment, the width K1 indicates a dimension of the first electrode 1 along a short direction of the first electrode 1. In other words, the width K1 indicates a dimension of the first electrode 1 along the direction D1. The width K2 indicates a dimension of the second electrode 2 along a short direction of the second electrode 2. In other words, the width K2 indicates a dimension of the second electrode 2 along the direction D1.

The two highly resistive layers 22 are located at the same layer level. One highly resistive layer 22 of the two highly resistive layers 22 is located opposite to one unit electrode 10 of the two unit electrodes 10 with an insulating layer 21 therebetween. The other highly resistive layer 22 is located opposite to the other unit electrode 10 with the insulating layer 21 therebetween. Specifically, the first electrode 1 is located opposite to one end region of a pair of end regions of a corresponding highly resistive layer 22 with the insulating layer 21 therebetween. The second electrode 2 is located opposite to the other end region of the pair of end regions of a corresponding highly resistive layer 22 with the insulating layer 21 therebetween.

The first boundary layer 51 contains the same electrical insulator as the insulating layer 21 and is formed from the same material as the insulating layer 21. Therefore, the first boundary layer 51 is formed as a part of the insulating layer 21. The first boundary layer 51 is located between the mutually adjacent first electrode 1 and second electrode 2. Therefore, the first boundary layer 51 electrically insulates the mutually adjacent first electrode 1 and second electrode 2 from each other. The first boundary layer 51 linearly extends along the mutually adjacent first electrode 1 and second electrode 2.

The second boundary layer 52 is the same electrical insulator as the insulating layer 21 and is formed from the same material as the insulating layer 21. Therefore, in the second embodiment, the second boundary layer 52 is formed as a part of the insulating layer 21. However, the second boundary layer 52 may be an electrical insulator different from the insulating layer 21. For example, the second boundary layer 52 may be formed from an electrical insulator such as polyimide that is used as an alignment material for the liquid crystal layer 23.

The second boundary layer 52 faces the first boundary layer 51 with the insulating layer 21 therebetween. The second boundary layer 52 has a width that is substantially the same as a width of the first boundary layer 51. The width of the second boundary layer 52 indicates a dimension of the second boundary layer 52 along a short direction of the second boundary layer 52. In other words, the width of the second boundary layer 52 indicates a dimension of the second boundary layer 52 along the direction D1. The width of the first boundary layer 51 indicates a dimension of the first boundary layer 51 along a short direction of the first boundary layer 51. In other words, the width of the first boundary layer 51 indicates a dimension of the first boundary layer 51 along the direction D1. The second boundary layer 52 is located between the mutually adjacent highly resistive layers 22. Therefore, the second boundary layer 52 electrically insulates the mutually adjacent highly resistive layers 22 from each other. The second boundary layer 52 linearly extends along the mutually adjacent highly resistive layers 22.

The liquid crystal layer 23 is located between a third electrode 3, and the highly resistive layers 22 and the second boundary layer 52, which are located at the same layer level. The liquid crystal layer 23 includes a region A1 corresponding to one unit electrode 10 of the two unit electrodes 10 and a region A2 corresponding to the other unit electrode 10. The liquid crystal layer 23 has a thickness t that is substantially the same as the thickness t of the liquid crystal layer 23 in the first embodiment. The third electrode 3 has a sheet-like shape and is located opposite to the two unit electrodes 10 with the insulating layer 21, the highly resistive layers 22, and the liquid crystal layer 23 therebetween.

Similarly to the first embodiment, the liquid crystal element 100 further includes a first substrate 31 and a second substrate 32 as illustrated in FIG. 2A. The first electrodes 1, the second electrodes 2, the insulating layer 21, and the first boundary layer 51 are formed on the first substrate 31. Further, the highly resistive layers 22 and the second boundary layer 52 are formed on the insulating layer 21 on the first substrate 31. The first substrate 31 and the second substrate 32 are spaced apart from each other with a constant distance therebetween using spacers such that the liquid crystal layer 23 is interposed between the first substrate 31 and the second substrate 32. Similarly to the first embodiment, the liquid crystal element 100 is included in a liquid crystal device 200. As illustrated in FIGS. 2B and 2C, a first voltage V1 is applied to each first electrode 1 by a first power supply circuit 41 and a second voltage V2 is applied to each second electrode 2 by a second power supply circuit 42.

Figure 6A:
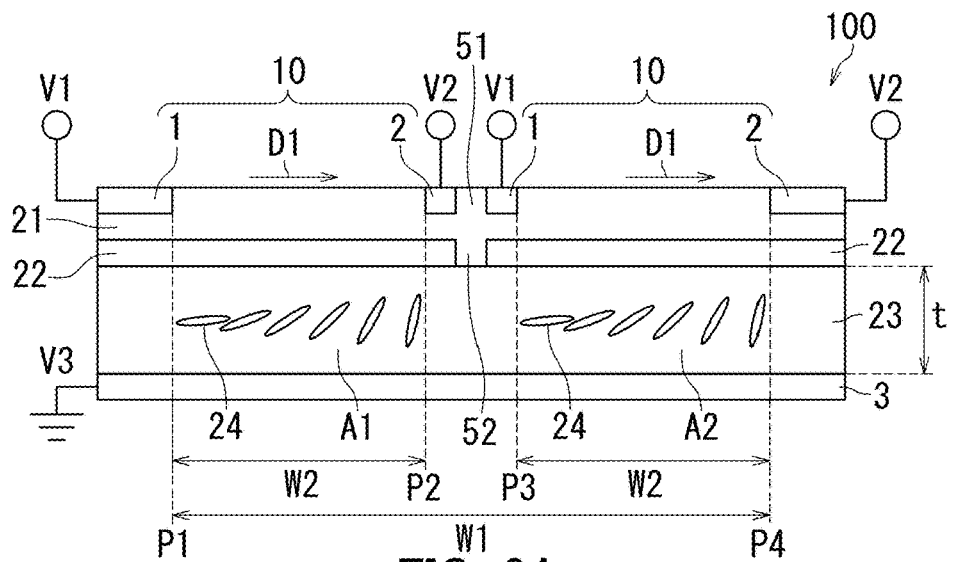
FIG. 6A is a cross-sectional view of the liquid crystal element according to the second embodiment of the present invention.
Figure 6B:
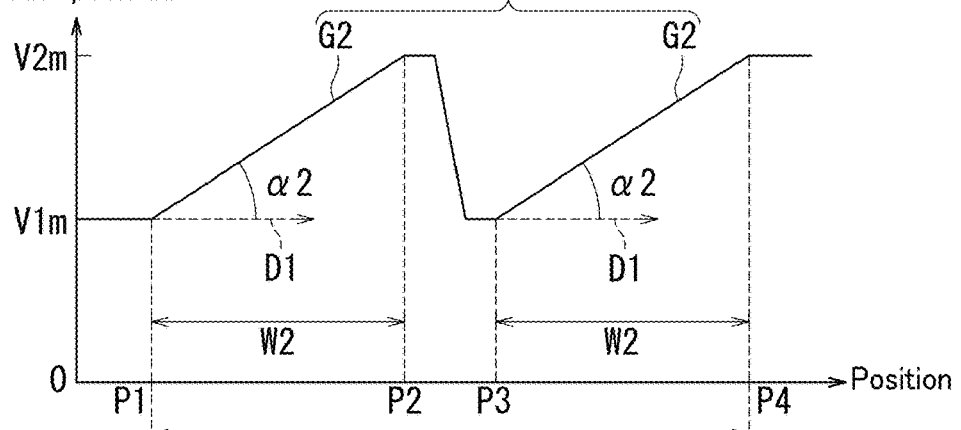
FIG. 6B is a diagram illustrating an electric potential gradient formed in the liquid crystal element according to the second embodiment of the present invention.
Figure 6C:
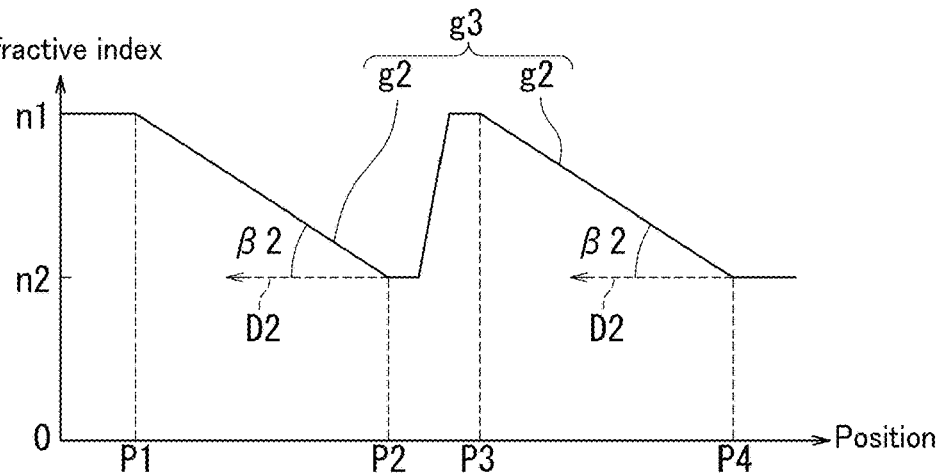
FIG. 6C is a diagram illustrating a refractive index gradient formed in the liquid crystal element according to the second embodiment of the present invention.
Figure 7:
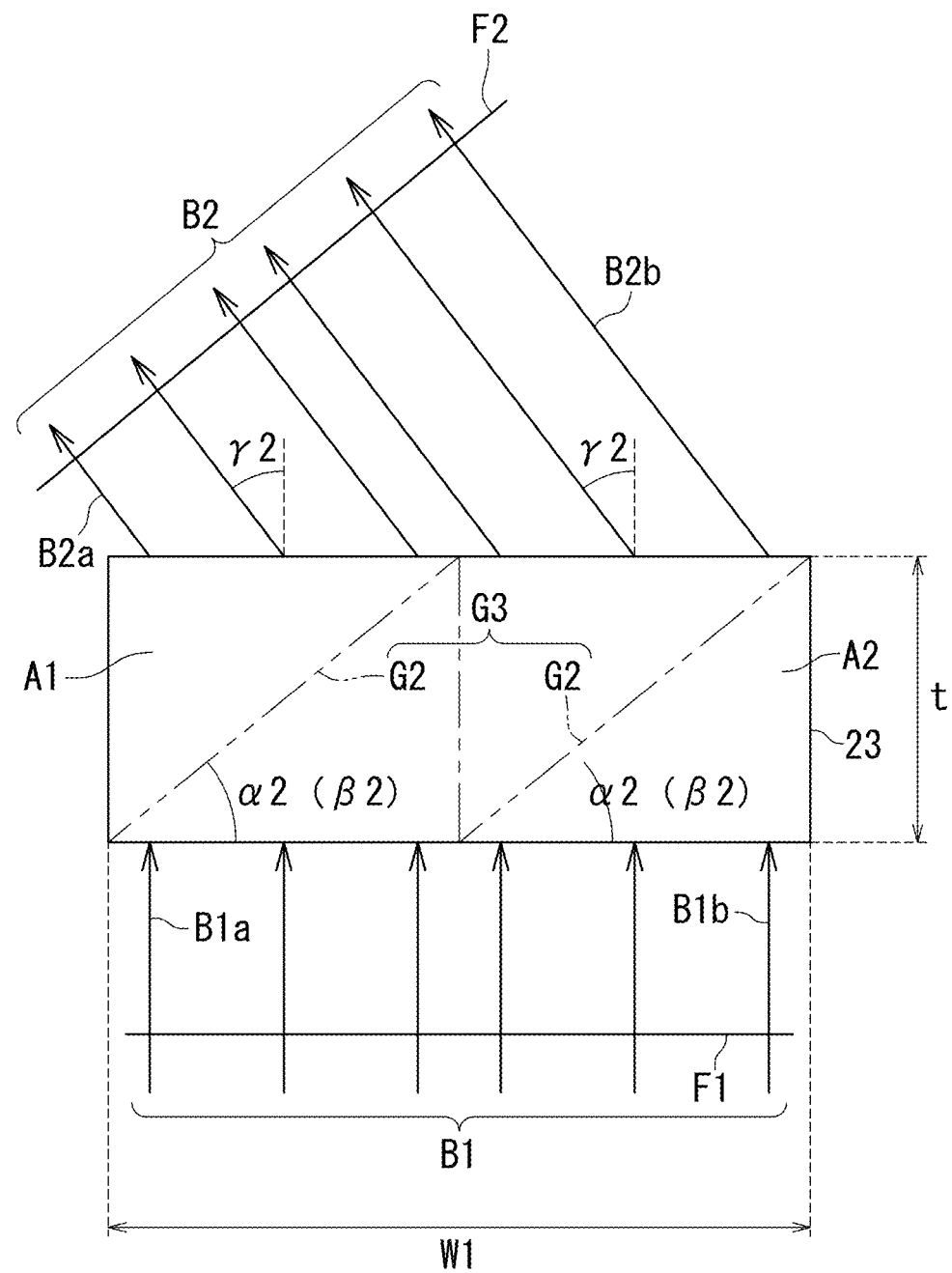
FIG. 7 is a diagram illustrating incoming beams incident on the liquid crystal element according to the second embodiment of the present invention and outgoing beams exiting from the liquid crystal element.

A mechanism by which the liquid crystal element 100 refracts light will be described with reference to FIGS. 6A to 7. FIG. 6A is a cross-sectional view of the liquid crystal element 100. FIG. 6B is a diagram illustrating an electric potential gradient G3 formed in the liquid crystal element 100. FIG. 6C is a diagram illustrating a refractive index gradient g3 formed in the liquid crystal element 100. In FIGS. 6A to 6C, positions P1 to P4 indicate positions in the liquid crystal layer 23 along the direction D1. FIG. 7 is a diagram illustrating incoming beams B1 incident on the liquid crystal element 100 and outgoing beams B2 exiting from the liquid crystal element 100.

As illustrated in FIGS. 6A and 6B, when the first voltage V1 is applied to each first electrode 1 and the second voltage V2 is applied to each second electrode 2, a serration-like electric potential gradient G3 is formed in the liquid crystal layer 23 due to the presence of the highly resistive layers 22, the first boundary layer 51, and the second boundary layer 52.

The electric potential gradient G3 includes two electric potential gradients G2. That is, a smooth linear electric potential gradient G2 is formed in each of the regions A1 and A2 of the liquid crystal layer 23 relative to the direction D1. Similarly to the electric potential gradient G1 illustrated in FIG. 3B, the electric potential gradients G2 are each formed in a manner that the electric potential increases in the direction D1. The electric potential gradients G2 each vary continuously from beneath the first electrode 1 to beneath the second electrode 2 with no extrema (minimal values and maximal values). Further, the electric potential sharply decreases in a region of the liquid crystal layer 23. The region is located opposite to the second boundary layer 52. This is because the above region is prevented from being affected by the highly resistive layers 22 by providing the first boundary layer 51 and the second boundary layer 52.

The electric potential gradient G2 relative to the direction D1 is represented by a gradient angle α2. The gradient angle α2 in the region A1 and the gradient angle α2 in the region A2 are substantially the same.

Similarly to the first embodiment, the gradient angle α2 can be varied by varying the maximum amplitude V1m of the first voltage V1 or the maximum amplitude V2m of the second voltage V2. Also, similarly to the first embodiment, the shape of the electric potential gradient G2 is determined depending on the frequencies f1 and f2 and electric resistivity of the highly resistive layers 22.

As a result of formation of the serration-like electric potential gradient G3 in the liquid crystal layer 23, a serration-like refractive index gradient g3 is formed in the liquid crystal layer 23 as illustrated in FIGS. 6B and 6C. The refractive index gradient g3 includes two refractive index gradients g2. That is, a linear refractive index gradient g2 is formed in each of the regions A1 and A2 of the liquid crystal layer 23 relative to the direction D2. Similarly to the refractive index gradient g1 illustrated in FIG. 3C, the refractive index gradients g2 are each formed in a manner that the refractive index increases in the direction D2. The refractive index gradients g2 each vary continuously from beneath the first electrode 1 to beneath the second electrode 2 with no extrema (minimal values and maximal values). Further, the refractive index sharply increases in a region of the liquid crystal layer 23. The region is interposed between the first boundary layer 51 and the second boundary layer 52. The refractive index of the liquid crystal layer 23 at the positions P1 and P3 is n1 and the refractive index of the liquid crystal layer 23 at the positions P2 and P4 is n2, which is smaller than n1.

The refractive index gradient g2 relative to the direction D2 is represented by a gradient angle β2. The gradient angle β2 is represented by expression (2) shown below. The gradient angle β2 is substantially proportional to the gradient angle α2. In the second embodiment, the gradient angle β2 is substantially the same as the gradient angle α2.

$$\beta 2 = \arctan((n1-n2)t/W2) \qquad (2)$$

As illustrated in FIGS. 6A to 6C and 7, the serration-like refractive index gradient g3 corresponding to the serration-like electric potential gradient G3 is formed in the liquid crystal layer 23. Therefore, incoming beams B1 substantially perpendicularly incident on the liquid crystal layer 23 are refracted at a refracting angle γ2 corresponding to the gradient angles α2 and β2 and exit as outgoing beams B2. The refracting angle γ2 is an angle of a direction of travel of the outgoing beams B2 relative to a direction of travel of the incoming beams B1. In the second embodiment, the refracting angle γ2 is substantially the same as each of the gradient angles α2 and β2.

Specifically, among the incoming beams B1, incoming beams B1a substantially perpendicularly incident on the region A1 are refracted at the refracting angle γ2 and exit as outgoing beams B2a among the outgoing beams B2. Among the incoming beams B1, incoming beams B1b substantially perpendicularly incident on the region A2 are refracted at the refracting angle γ2 and exit as outgoing beams B2b among the outgoing beams B2. The gradient angle α2 in the region A1 and the gradient angle α2 in the region A2 are substantially the same (that is, the gradient angle β2 in the region A1 and the gradient angle β2 in the region A2 are substantially the same). In addition, the refractive index gradients g2 corresponding to the electric potential gradients G2 each have a linear shape. Therefore, a wavefront of the outgoing beams B2a and a wavefront of the outgoing beams B2b form a wavefront F2 that is substantially in a straight line. As a result, wavefront aberration of the outgoing beams B2 is reduced. It should be noted that a wavefront of the incoming beams B1a and a wavefront of the incoming beams B1b form a wavefront F1 that is substantially in a straight line and substantially parallel to the liquid crystal layer 23.

Similarly to the first embodiment, the incoming beams B1a are refracted toward a side on which the first electrode 1 of the unit electrode 10 corresponding to the region A1 is located and the incoming beams B1b are refracted toward a side on which the first electrode 1 of the unit electrode 10 corresponding to the region A2 is located. However, similarly to the first embodiment, the incoming beams B1a can be refracted toward a side on which the second electrode 2 of the unit electrode 10 corresponding to the region A1 is located and the incoming beams B1b can be refracted toward a side on which the second electrode 2 of the unit electrode 10 corresponding to the region A2 is located by making the maximum amplitude V1m of the first voltage V1 larger than the maximum amplitude V2m of the second voltage V2.

The refracting angle γ2 in the second embodiment will be compared with the refracting angle γ1 in the first embodiment with reference to FIGS. 7 and 4. The liquid crystal layer 23 has substantially the same width W1 and substantially the same thickness t in the first and second embodiments. However, the two unit electrodes 10 are provided in the second embodiment while keeping the width W1 unchanged. As a result, the gradient angle α2 in the second embodiment is made larger than the gradient angle α1 in the first embodiment, the gradient angle α2 in the second embodiment is made larger than the gradient angle α1 in the first embodiment, and the gradient angle β2 in the second embodiment is made larger than the gradient angle β1 in the first embodiment, without an increase in the thickness t. As apparent from the expressions (1) and (2), the gradient angle β2 is larger than the gradient angle β1 since the width W2 is smaller than the width W1.

Thus, the refracting angle γ2 in the second embodiment can be made larger than the refracting angle γ1 in the first embodiment without increasing the thickness t of the liquid crystal layer 23 and preventing reduction of response speed of the liquid crystal molecules 24. In other words, the thickness t of the liquid crystal layer 23 can be reduced and response speed of the liquid crystal molecules 24 can be increased while satisfying a requirement for the refracting angle γ2 of the liquid crystal element 100.

As described above with reference to FIGS. 6A to 6C and 7, in the second embodiment similarly to the first embodiment, light can be refracted while reducing power loss as a result of formation of the electric potential gradient G3 and the refractive index gradient g3 due to the presence of the insulating layer 21 and the highly resistive layers 22.

Further, similarly to the first embodiment, the electric potential gradients G2 in the second embodiment are each formed using the first electrode 1 and the second electrode 2. Therefore, similarly to the first embodiment, the liquid crystal element 100 has simple structure. As a result, a manufacturing cost of the liquid crystal element 100 can be reduced and a manufacturing yield of the liquid crystal element 100 can be increased.

Also, similarly to the first embodiment, the smooth linear electric potential gradients G2 are formed in the second embodiment by effects of the highly resistive layers 22. Therefore, similarly to the first embodiment, the incoming beams B1 can be refracted at the refracting angle γ2 that is substantially the same as the gradient angle α2 of the electric potential gradient G2 and wavefront aberration is reduced as compared with a situation in which stepwise electric potential gradients are formed. Further, the wavefront F2 of the outgoing beams B2 is further approximated to a straight line due to the absence of extrema in the electric potential gradients G2. Therefore, the liquid crystal element 100 is capable of effectively functioning as a deflection element.

Further, similarly to the first embodiment, the width W2 between the first electrode 1 and the second electrode 2 in the second embodiment is larger than each of the width K1 of the first electrode 1 and the width K2 of the second electrode 2. Therefore, relative to a total light quantity of incoming beams incident on the liquid crystal element 100, a proportion of a light quantity of outgoing beams refracted at the refracting angle γ2 can be easily made larger than a proportion of a light quantity of outgoing beams traveling straight. As a result, the liquid crystal element 100 is capable of more effectively functioning as a deflection element.

The distance W2 between the first electrode 1 and the second electrode 2 is preferably at least twice the width K1 of the first electrode 1 and at least twice the width K2 of the second electrode 2. In this case, the liquid crystal element 100 is capable of more effectively functioning as a deflection element.

Similarly to the first embodiment, the width W2 between the first electrode 1 and the second electrode 2 in the second embodiment is larger than each of the width K1 of the first electrode 1 and the width K2 of the second electrode 2. Further, the highly resistive layer 22 extends over a wide area (as wide as the distance W2) from beneath the first electrode 1 to beneath the second electrode 2. Therefore, the electric potential gradient G2 having no extrema can be easily formed from beneath the first electrode 1 to beneath the second electrode 2 by appropriately setting the maximum amplitudes V1$m$ and V2$m$, the frequencies f1 and f2, and resistivity of the highly resistive layer 22. As a result, the wavefront F2 of the outgoing beams B2 is further approximated to a straight line, and the liquid crystal element 100 is capable of more effectively functioning as a deflection element.

Further, similarly to the first embodiment, an electric potential gradient plane is formed in the liquid crystal layer 23 along longitudinal directions of the first electrode 1 and the second electrode 2 in the second embodiment as illustrated in FIGS. 5A and 6B. The electric potential gradient plane is formed by the electric potential gradient G3 that is continuous along the longitudinal directions of the first electrode 1 and the second electrode 2. Therefore, the incoming beams B1 can be refracted in a manner that the refracting angle γ2 is substantially constant in the longitudinal directions of the first electrode 1 and the second electrode 2. This is particularly effective in a case where the liquid crystal element 100 is used as a deflection element.

Further, as described above with reference to FIGS. 2A and 6B, in the second embodiment similarly to the first embodiment, the gradient angle α2 and consequently the refracting angle γ2 can be easily varied and a direction of refraction of the incoming beams B1 can be altered toward a side on which the first electrode 1 is located or toward a side on which the second electrode 2 is located by merely controlling the maximum amplitude V1$m$ of the first voltage V1 and/or the maximum amplitude V2$m$ of the second voltage V2 while keeping the thickness t of the liquid crystal layer 23 unchanged.

Third Embodiment

Figure 8A:
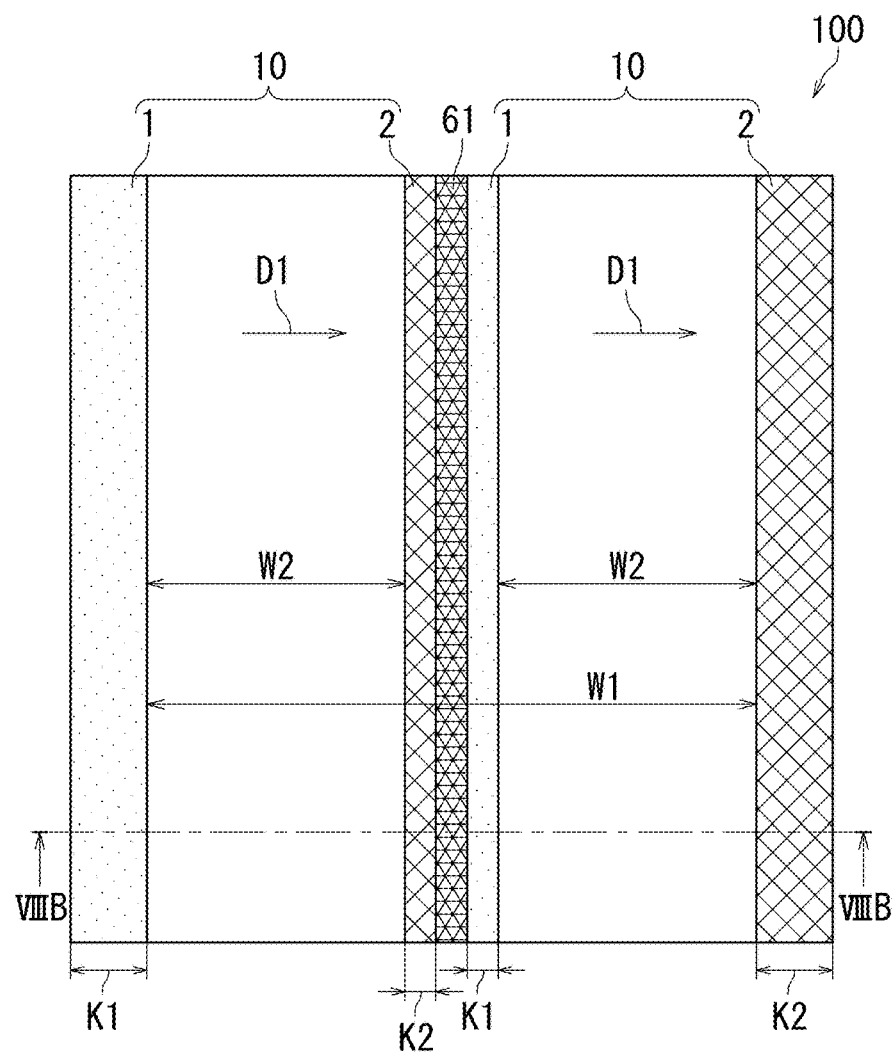
FIG. 8A is a plan view of a liquid crystal element according to a third embodiment of the present invention.
Figure 8B:
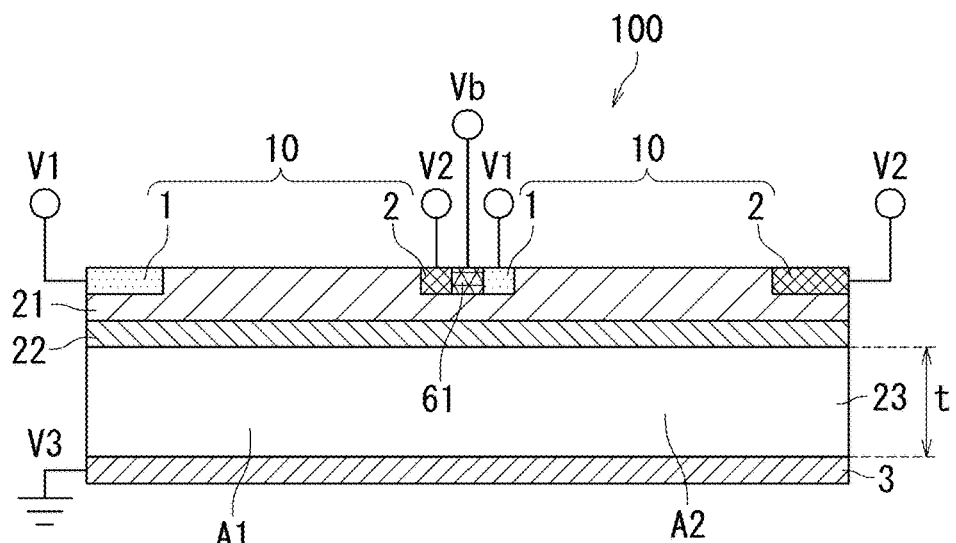
FIG. 8B is a cross-sectional view of the liquid crystal element according to the third embodiment of the present invention.

The following describes a liquid crystal element 100 according to a third embodiment of the present invention with reference to FIGS. 8A and 8B. The liquid crystal element 100 according to the third embodiment differs from the liquid crystal element 100 according to the second embodiment in that the first boundary layer 51 in the second embodiment is replaced by a boundary electrode 61 and the second boundary layer 52 in the second embodiment is not provided. The following mainly describes differences between the third embodiment and the second embodiment.

FIG. 8A is a plan view of the liquid crystal element 100 according to the third embodiment. FIG. 8B is a cross-sectional view taken along a line VIIIB-VIIIB in FIG. 8A. As illustrated in FIGS. 8A and 8B, the liquid crystal element 100 includes the boundary electrode 61 in place of the first boundary layer 51 in the second embodiment. A boundary voltage Vb (fourth voltage) different from a first voltage V1 and a second voltage V2 is applied to the boundary electrode 61. The boundary voltage Vb is lower than a higher one of the first voltage V1 and the second voltage V2. In the second embodiment, the boundary voltage Vb is substantially the same as the first voltage V1.

The boundary electrode 61 is located between a second electrode 2 and a first electrode 1 that are adjacent to each other. In this configuration, the boundary electrode 61 is electrically insulated from the second electrode 2 and the first electrode 1. For example, an insulating film is provided between the boundary electrode 61 and the second electrode 2, and an insulating film is provided between the boundary electrode 61 and the first electrode 1. The boundary electrode 61 linearly extends along the mutually adjacent second electrode 2 and first electrode 1. The boundary electrode 61 is for example transparent and formed from ITO. The boundary electrode 61 and two unit electrodes 10 are located at the same layer level and opposite to a highly resistive layer 22 (resistive layer) with an insulating layer 21 therebetween. The highly resistive layer 22 has a sheet-like shape and a single-layer structure.

A liquid crystal layer 23 is located between the highly resistive layer 22 and a third electrode 3. The liquid crystal layer 23 includes a region A1 corresponding to one unit electrode 10 of the two unit electrodes 10 and a region A2 corresponding to the other unit electrode 10. The liquid crystal layer 23 has a thickness t that is substantially the same as the thickness t of the liquid crystal layer 23 in the first embodiment. The third electrode 3 has a sheet-like shape and is located opposite to the two unit electrodes 10 and the boundary electrode 61 with the insulating layer 21, the highly resistive layer 22, and the liquid crystal layer 23 therebetween.

Figure 9A:
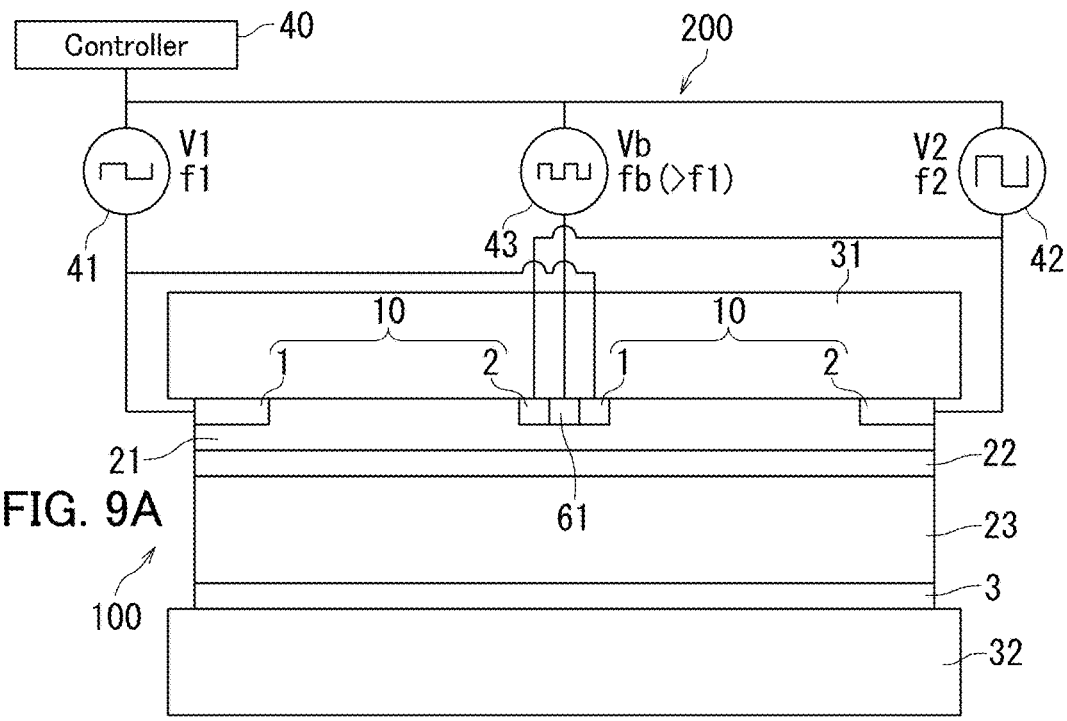
FIG. 9A is a cross-sectional view illustrating details of the liquid crystal element according to the third embodiment of the present invention.
Figure 9B:
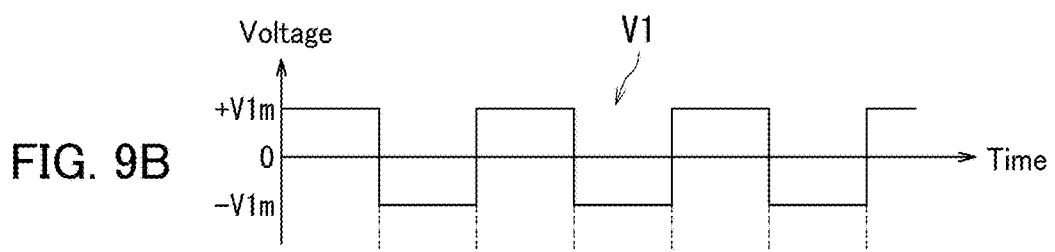
FIG. 9B is a diagram illustrating a waveform of a first voltage applied to a first electrode of the liquid crystal element according to the third embodiment of the present invention.
Figure 9C:
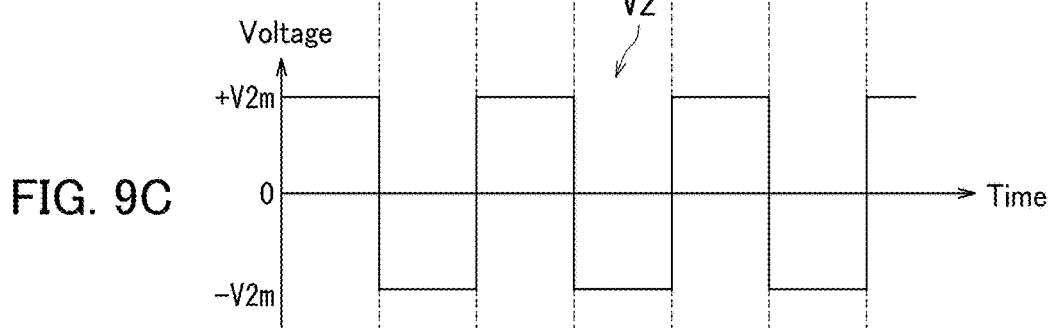
FIG. 9C is a diagram illustrating a waveform of a second voltage applied to a second electrode of the liquid crystal element according to the third embodiment of the present invention.
Figure 9D:
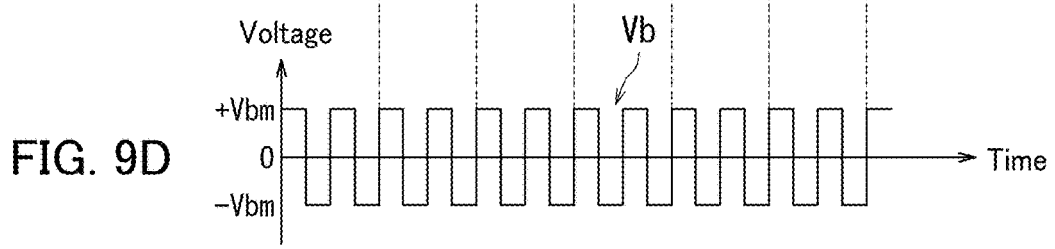
FIG. 9D is a diagram illustrating a waveform of a boundary voltage applied to a boundary electrode of the liquid crystal element according to the third embodiment of the present invention.

Details of the liquid crystal element 100 will be described with reference to FIGS. 9A to 9D. FIG. 9A is a cross-sectional view illustrating details of the liquid crystal element 100. FIG. 9B is a diagram illustrating a waveform of the first voltage V1 applied to first electrodes 1. FIG. 9C is a diagram illustrating a waveform of the second voltage V2 applied to second electrodes 2. FIG. 9D is a diagram illustrating a waveform of the boundary voltage Vb applied to the boundary electrode 61.

As illustrated in FIG. 9A, the liquid crystal element 100 further includes a first substrate 31 and a second substrate 32 similarly to the first embodiment. The first electrodes 1, the second electrodes 2, the insulating layer 21, and the boundary electrode 61 are formed on the first substrate 31. Further, the highly resistive layer 22 is formed on the insulating layer 21 on the first substrate 31. On the other hand, the third electrode 3 is formed on the second substrate 32. The first substrate 31 and the second substrate 32 are spaced apart from each other with a constant distance therebetween using spacers such that the liquid crystal layer 23 is interposed between the first substrate 31 and the second substrate 32.

The liquid crystal element 100 is included in a liquid crystal device 200. The liquid crystal device 200 further includes a controller 40, a first power supply circuit 41, a second power supply circuit 42, and a third power supply circuit 43. The controller 40 controls the first power supply circuit 41, the second power supply circuit 42, and the third power supply circuit 43.

As illustrated in FIGS. 9A and 9B, the first power supply circuit 41 has structure similar to structure of the first power supply circuit 41 in the first embodiment. The first power supply circuit 41 is connected to each first electrode 1 and applies the first voltage V1 to each first electrode 1. As illustrated in FIGS. 9A and 9C, the second power supply circuit 42 has structure similar to structure of the second power supply circuit 42 in the first embodiment. The second power supply circuit 42 is connected to each second electrode 2 and applies the second voltage V2 to each second electrode 2.

As illustrated in FIGS. 9A and 9D, the third power supply circuit 43 generates the boundary voltage Vb under control by the controller 40. The third power supply circuit 43 is connected to the boundary electrode 61 and applies the boundary voltage Vb to the boundary electrode 61. The boundary voltage Vb is an alternating current voltage having a frequency fb. The frequency fb is higher than each of a frequency f1 of the first voltage V1 and a frequency f2 of the second voltage V2. For example, the frequency fb is from 10 times to 10,000 times the frequency f1, and at least 1 kHz and no higher than 1 MHz. An upper limit of the frequency fb is a highest frequency to which liquid crystal molecules 24 are able to respond.

The boundary voltage Vb is a square wave having a maximum amplitude Vbm. The maximum amplitude Vbm of the boundary voltage Vb is smaller than a larger one of the maximum amplitude V1m of the first voltage V1 and the maximum amplitude V2m of the second voltage V2. In the third embodiment, the maximum amplitude Vbm is substantially the same as the maximum amplitude V1m. The boundary voltage Vb preferably matches the first voltage V1 and the second voltage V2 in phase. However, the boundary voltage Vb may be shifted from the first voltage V1 and the second voltage V2 in phase.

When the boundary voltage Vb having a high frequency is applied to the boundary electrode 61, a serration-like electric potential gradient similar to the electric potential gradient G3 illustrated in FIG. 6B is formed in the liquid crystal layer 23. That is, upon application of the boundary voltage Vb having the high frequency, an effect of the highly resistive layer 22 weakens in a region of the highly resistive layer 22. The region is located opposite to the boundary electrode 61. The thus produced condition of the liquid crystal layer 23 is similar to condition produced in the second embodiment including the first boundary layer 51 and the second boundary layer 52. As a result, the electric potential gradient similar to the electric potential gradient G3 illustrated in FIG. 6B is formed. As a result of formation of the electric potential gradient similar to the electric potential gradient G3, a serration-like refractive index gradient similar to the refractive index gradient g3 illustrated in FIG. 6C is formed in the liquid crystal layer 23. As a result, similarly to the second embodiment, the liquid crystal element 100 according to the third embodiment can refract incoming beams B1 at a refracting angle γ2 that is substantially the same as the gradient angle α2 as illustrated in FIG. 7.

The shape of the electric potential gradient formed in the liquid crystal layer 23 is determined depending on the frequencies f1 and f2, the frequency fb of the boundary voltage Vb, and electric resistivity (for example, surface resistivity) of the highly resistive layer 22. In the third embodiment, the frequencies f1, f2, and fb and the electric resistivity of the highly resistive layer 22 are determined such that the electric potential gradient has a serration-like shape.

As described above with reference to FIGS. 6A to 9D, the liquid crystal element 100 according to the third embodiment has structure similar to structure of the liquid crystal element 100 according to the second embodiment other than inclusion of the boundary electrode 61 and the absence of the first boundary layer 51 and the second boundary layer 52. Further, the electric potential gradient and the refractive index gradient similar to the electric potential gradient and the refractive index gradient formed in the second embodiment are formed in the liquid crystal layer 23 in the third embodiment. Therefore, the liquid crystal element 100 according to the third embodiment has effects similar to effects of the liquid crystal element 100 according to the second embodiment.

Further, the third embodiment includes the single highly resistive layer 22. Therefore, formation of the highly resistive layer 22 is easier than in the second embodiment where the two highly resistive layers 22 are formed with the second boundary layer 52.

Further, the serration-like electric potential gradient can be easily formed in the liquid crystal layer 23 in the third embodiment by setting the frequency fb of the boundary voltage Vb so as to be higher than each of the frequency f1 of the first voltage V1 and the frequency f2 of the second voltage V2 to weaken the effect of the highly resistive layer 22. Also, a wavefront of outgoing beams B2a and a wavefront of outgoing beams B2b can be easily aligned substantially in a straight line by adjusting the frequency fb of the boundary voltage Vb to a value that is higher than each of the frequencies f1 and f2. As a result, wavefront aberration of outgoing beams B2 is reduced.

Further, in the third embodiment similarly to the second embodiment, the gradient angle α2 and consequently the refracting angle γ2 can be easily varied and a direction of refraction of the incoming beams B1 can be altered toward a side on which the first electrode 1 is located or toward a side on which the second electrode 2 is located by merely controlling the maximum amplitude V1m of the first voltage V1 and/or the maximum amplitude V2m of the second voltage V2 while keeping the thickness t of the liquid crystal layer 23 unchanged. In this case, the controller 40 maintains the frequency fb of the boundary voltage Vb constant. Further, the controller 40 controls the third power supply circuit 43 such that the maximum amplitude Vbm of the boundary voltage Vb becomes substantially the same as a smaller one of the maximum amplitudes V1m and V2m.

Fourth Embodiment

Figure 10:
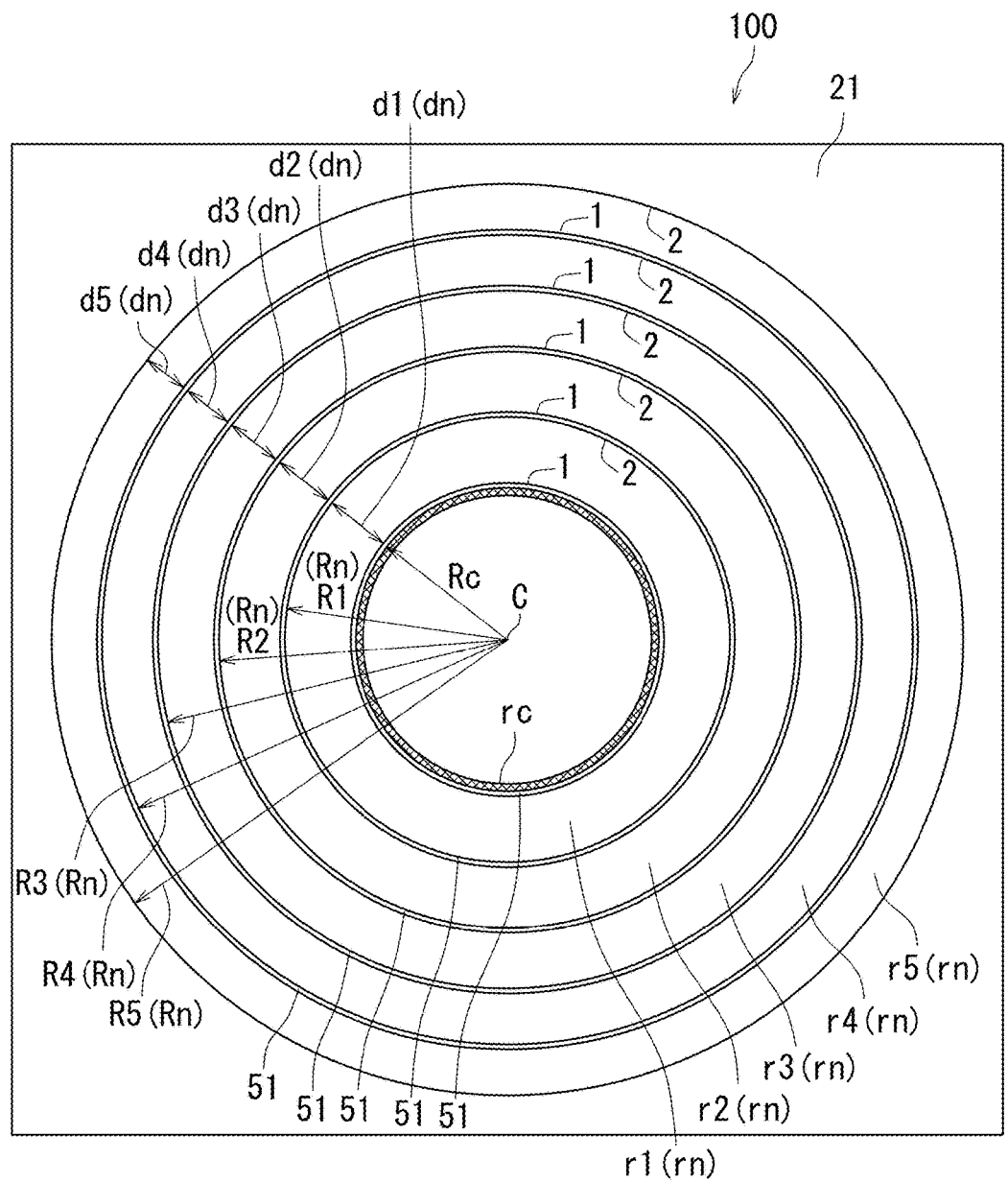
FIG. 10 is a plan view of a liquid crystal element according to a fourth embodiment of the present invention.
Figure 11:
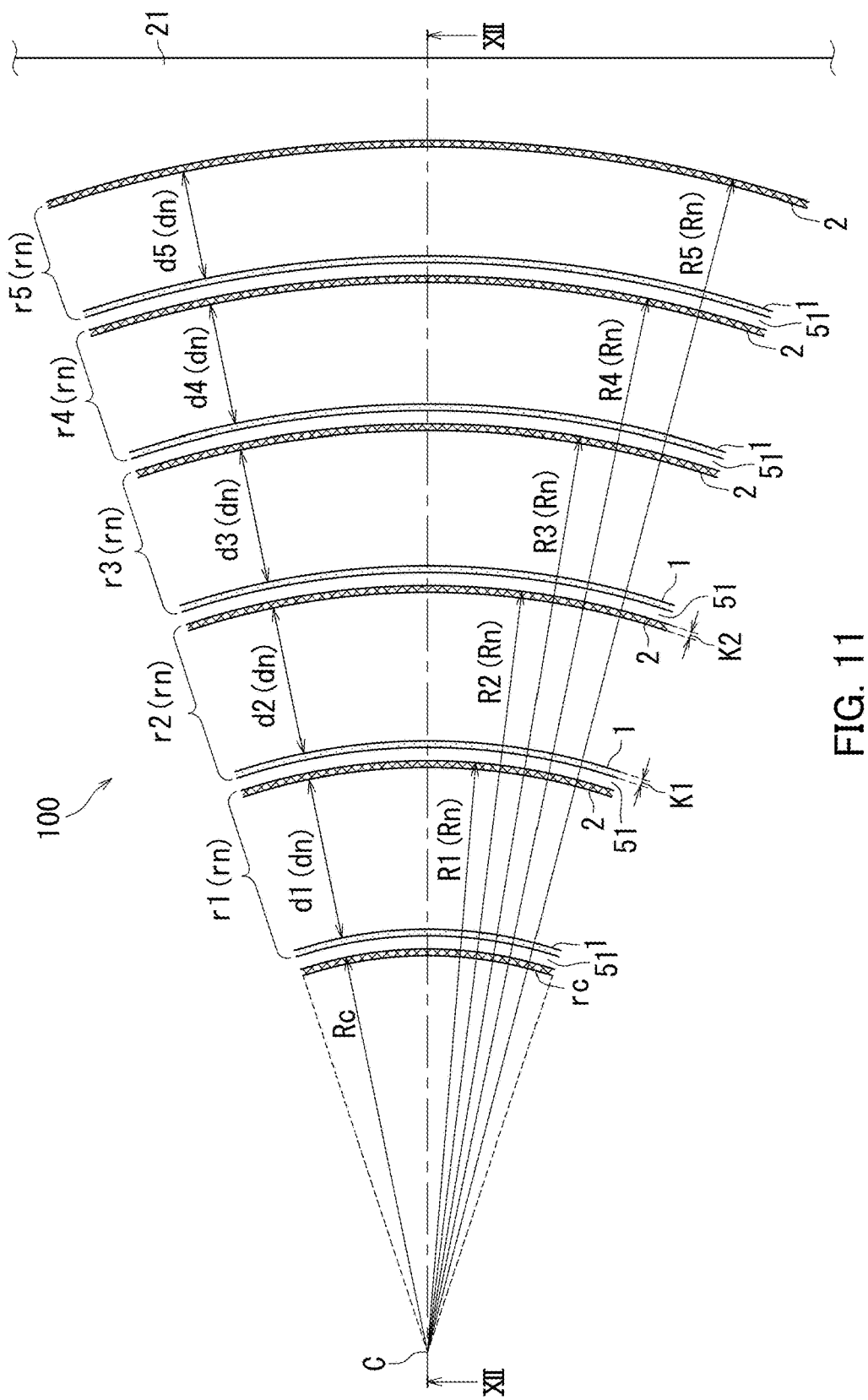
FIG. 11 is an enlarged plan view of a part of the liquid crystal element according to the fourth embodiment of the present invention.
Figure 12:
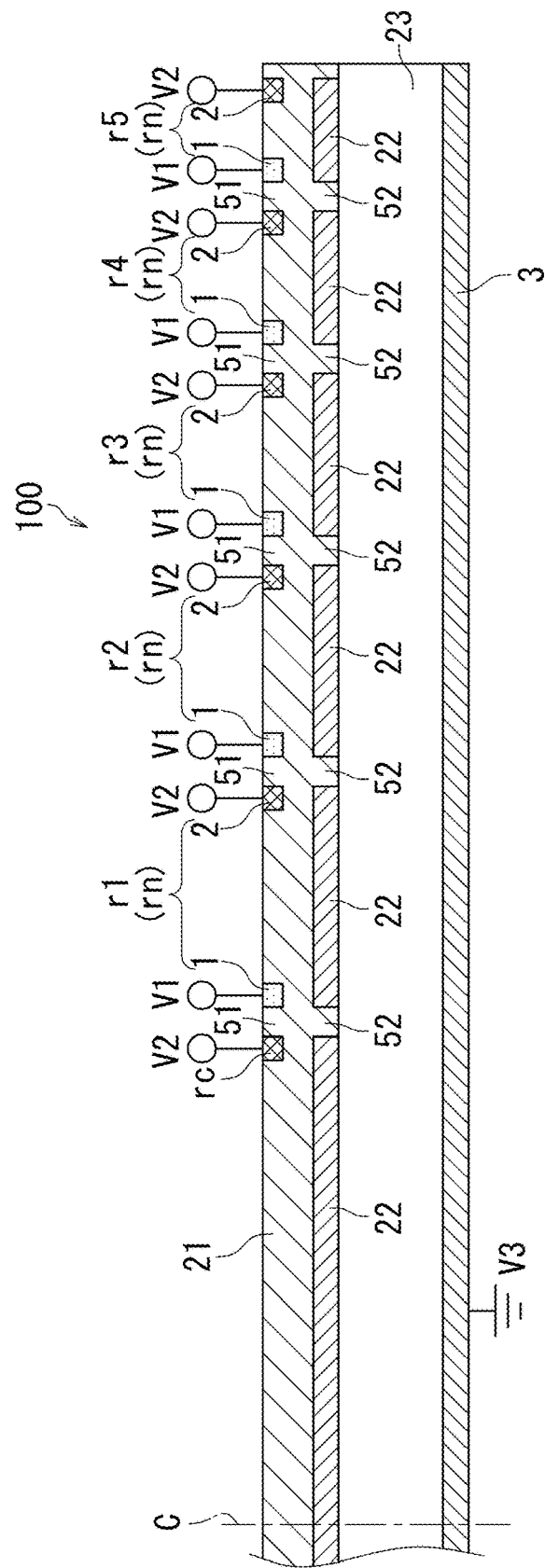
FIG. 12 is a cross-sectional view of a part of the liquid crystal element according to the fourth embodiment of the present invention.

The following describes a liquid crystal element 100 according to a fourth embodiment of the present invention with reference to FIGS. 10 to 12. In the fourth embodiment, the liquid crystal element 100 according to the second embodiment is modified so as to be capable of functioning as a Fresnel lens. The following mainly describes differences between the fourth embodiment and the second embodiment.

FIG. 10 is a plan view of the liquid crystal element 100 according to the fourth embodiment. FIG. 11 is an enlarged plan view of a part of the liquid crystal element 100. FIG. 12 is a cross-sectional view taken along a line XII-XII in FIG. 11.

As illustrated in FIGS. 10 and 11, the liquid crystal element 100 includes a center electrode rc, unit electrodes r1 to r5, an insulating layer 21, and a plurality of first boundary layers 51. The center electrode rc and the unit electrodes r1 to r5 are in concentric circular arrangement centered about the center electrode rc. A first boundary layer 51 having a circular ring shape is located between the center electrode rc and the unit electrode r1. Also, first boundary layers 51 each having a circular ring shape are each located between the unit electrodes r1 and r2, between the unit electrodes r2 and r3, between the unit electrodes r3 and r4, and between the unit electrodes r4 and r5.

The center electrode rc of the liquid crystal element 100 has a circular ring shape. The center electrode rc has a radius Rc. The radius Rc indicates an outer radius of the center electrode rc. The unit electrodes r1 to r5 each include a first electrode 1 and a second electrode 2. Each of the first electrodes 1 has a circular ring shape and each of the second electrodes 2 has a circular ring shape. The unit electrodes r1 to r5 have respective radiuses R1 to R5 (R5>R4>R3>R2>R1). The radius Rc is smaller than each of the radiuses R1 to R5. The unit electrodes r1 to r5 have respective widths d1 to d5 (d5<d4<d3<d2<d1). While the size of the center electrode rc may be set to any value, the radius Rc is preferably larger than each of the widths d1 to d5 in order to increase light utilization efficiency.

In the following description, each of the unit electrodes r1 to r5 may be referred to as a unit electrode rn. A radius of the unit electrode rn, which is any of the radiuses R1 to R5, may be referred to as a radius Rn. A width of the unit electrode rn, which is any of the widths d1 to d5, may be referred to as a width dn. The suffix n represents any of integers from 1 to N assigned to the respective unit electrodes incrementally from a unit electrode having a smallest radius to a unit electrode having a largest radius. N represents the number of the unit electrodes, which is "5" in the fourth embodiment.

The following further describes the liquid crystal element 100 with reference to FIG. 11. The unit electrode rn has the width dn that is larger than each of a width K1 of the first electrode 1 and a width K2 of the second electrode 2. The width dn of the unit electrode rn indicates a distance between the first electrode 1 and the second electrode 2 of the unit electrode rn. The width K1 indicates a dimension of the first electrode 1 along a radial direction of the first electrode 1 and the width K2 indicates a dimension of the second electrode 2 along a radial direction of the second electrode 2.

The radius Rn of the unit electrode rn is represented by a radius of the second electrode 2 of the unit electrode rn. The radius of the second electrode 2 indicates an outer radius of the second electrode 2 and a radius of the first electrode 1 indicates an outer radius of the first electrode 1. The radius of the second electrode 2 of the unit electrode rn is larger than the radius of the first electrode 1 of the unit electrode rn.

The radius Rn of the unit electrode rn is represented by expression (3) shown below.

[Expression 2]

$$Rn = (n+1)^{1/2} \times Rc \quad (3)$$

The width dn of the unit electrode rn is represented by a distance between an outer edge of the first electrode 1 and an inner edge of the second electrode 2 constituting the unit electrode rn. A unit electrode rn having a larger radius Rn than an adjacent unit electrode rn has a width dn smaller than a width of the adjacent unit electrode rn having a smaller radius Rn.

The liquid crystal element 100 will be further described with reference to FIG. 12. The liquid crystal element 100 further includes six highly resistive layers 22 (six resistive layers), five second boundary layers 52, a liquid crystal layer 23, and a third electrode 3 in addition to the center electrode rc, the unit electrodes r1 to r5, the insulating layer 21, and the five first boundary layers 51.

The center electrode rc, the unit electrodes r1 to r5, and the first boundary layers 51 are located at the same layer level. The center electrode rc is adjacent to a second electrode 2 of the unit electrode r1 with one of the first boundary layers 51 therebetween. A second voltage V2 is applied to the center electrode rc. A second electrode 2 of one unit electrode rn of mutually adjacent unit electrodes rn is adjacent to a first electrode 1 of the other unit electrode rn with one of the first boundary layers 51 therebetween. For example, a second electrode 2 of the unit electrode r1 is adjacent to a first electrode 1 of the unit electrode r2 with one of the first boundary layers 51 therebetween.

A first voltage V1 is applied to each first electrode 1 and the second voltage V2 is applied to each second electrode 2. Specifically, through holes corresponding to the respective first electrodes 1 and through holes corresponding to the respective second electrodes 2 are formed in a first substrate 31 (see FIG. 2). A first lead wire is provided in each of the through holes corresponding to the respective first electrodes 1 and the first voltage V1 is applied via the first lead wire. Also, a second lead wire is provided in each of the through holes corresponding to the respective second electrodes 2 and the second voltage V2 is applied via the second lead wire.

The six highly resistive layers 22 and the second boundary layers 52 are located at the same layer level. An innermost highly resistive layer 22 is located opposite to the center electrode rc and has a circular sheet-like shape (that is, a disk-like shape). Specifically, the center electrode rc is located opposite to an annular end region of the corresponding highly resistive layer 22 along an outer periphery of the highly resistive layer 22 with the insulating layer 21 therebetween. The other five highly resistive layers 22 are located opposite to the respective unit electrodes r1 to r5 and each have a circular band-like shape. Specifically, each first electrode 1 is located opposite to an annular end region of a corresponding highly resistive layer 22 along an inner periphery of the highly resistive layer 22 with the insulating layer 21 therebetween. Each second electrode 2 is located opposite to an annular end region of a corresponding highly resistive layer 22 along an outer periphery of the highly resistive layer 22 with the insulating layer 21 therebetween.

The second boundary layers 52 each having a circular ring shape are each located between mutually adjacent highly resistive layers 22. The second boundary layers 52 each face a corresponding first boundary layer 51 with the insulating layer 21 therebetween. It should be noted that the first boundary layers 51 and the second boundary layers 52 are formed from the same material as the insulating layer 21 as parts of the insulating layer 21. However, the second boundary layers 52 may be electrical insulators different from the insulating layer 21. For example, the second boundary layers 52 may be formed from an electrical insulator such as polyimide that is used as an alignment material for the liquid crystal layer 23. The insulating layer 21 electrically insulates the center electrode rc, the first electrodes 1, the second electrodes 2, and the highly resistive layers 22 from one another.

The second boundary layer 52 has a width that is substantially the same as a width of the first boundary layer 51. The width of the second boundary layer 52 indicates a dimension of the second boundary layer 52 along a short direction of the second boundary layer 52. In other words, the width of the second boundary layer 52 indicates a dimension of the second boundary layer 52 along a radial direction of the second boundary layer 52. The width of the first boundary layer 51 indicates a dimension of the first boundary layer 51 along a short direction of the first boundary layer 51. In other words, the width of the first boundary layer 51 indicates a dimension of the first boundary layer 51 along a radial direction of the first boundary layer 51.

The liquid crystal layer 23 is located between the third electrode 3, and the highly resistive layers 22 and the second boundary layers 52, which are located at the same layer level. The third electrode 3 has a sheet-like shape and is located opposite to the center electrode rc and the unit electrodes r1 to r5 with the insulating layer 21, the highly resistive layers 22, and the liquid crystal layer 23 therebetween. The structure of the liquid crystal element 100 is symmetrical about a center line C of the liquid crystal element 100.

Also, similarly to the second embodiment, the liquid crystal element 100 further includes the first substrate 31 and a second substrate 32 as illustrated in FIG. 2A. The center electrode rc, the first electrodes 1, the second electrodes 2, the insulating layer 21, and the first boundary layers 51 are formed on the first substrate 31. Further, the highly resistive layers 22 and the second boundary layers 52 are formed on the insulating layer 21 on the first substrate 31. The first substrate 31 and the second substrate 32 are spaced apart from each other with a constant distance therebetween using spacers such that the liquid crystal layer 23 is interposed between the first substrate 31 and the second substrate 32. Further, similarly to the second embodiment, the liquid crystal element 100 is included in a liquid crystal device 200. As illustrated in FIGS. 2B and 2C, the first voltage V1 is applied to each first electrode 1 by a first power supply circuit 41 and the second voltage V2 is applied to each second electrode 2 by a second power supply circuit 42. Further, the second power supply circuit 42 is connected to the center electrode rc and applies the second voltage V2 to the center electrode rc.

Figure 13A:
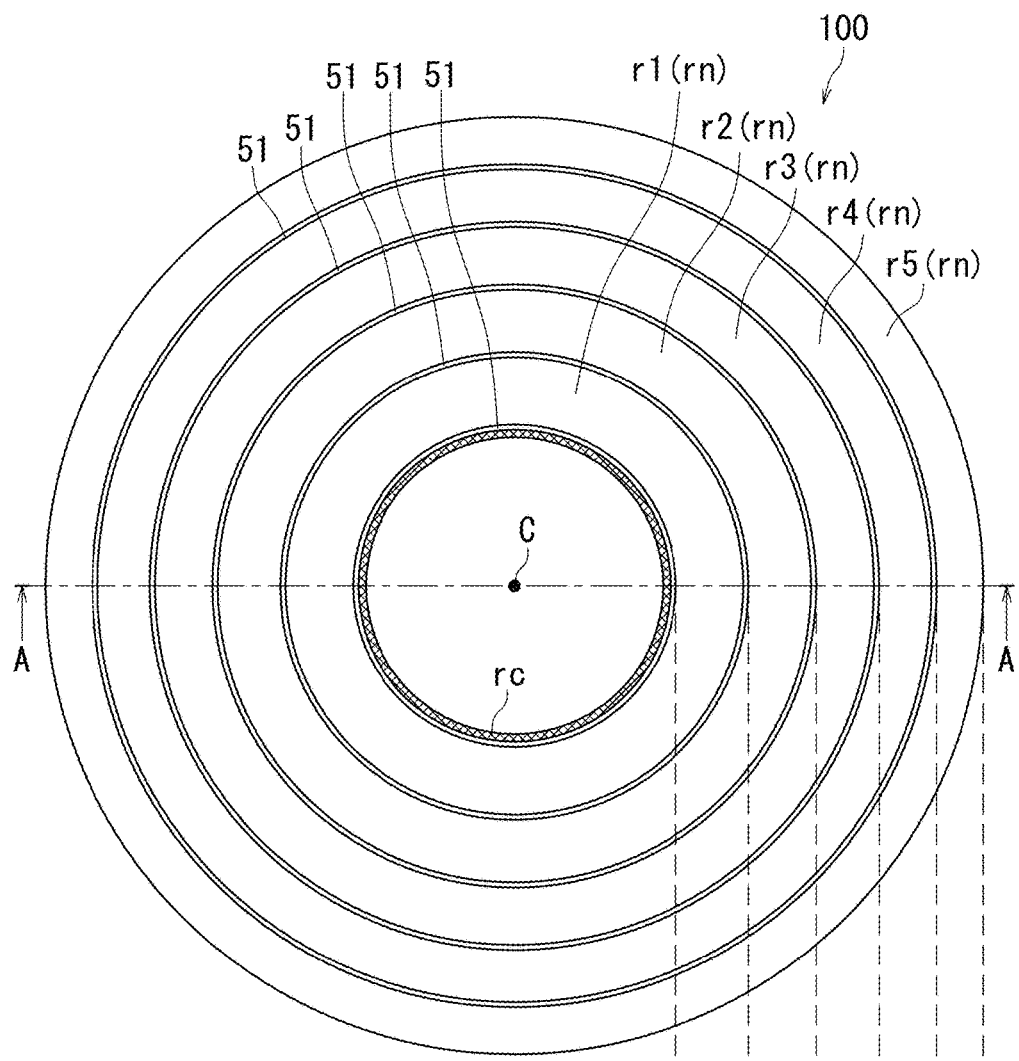
FIG. 13A is a plan view of the liquid crystal element according to the fourth embodiment of the present invention.
Figure 13B:
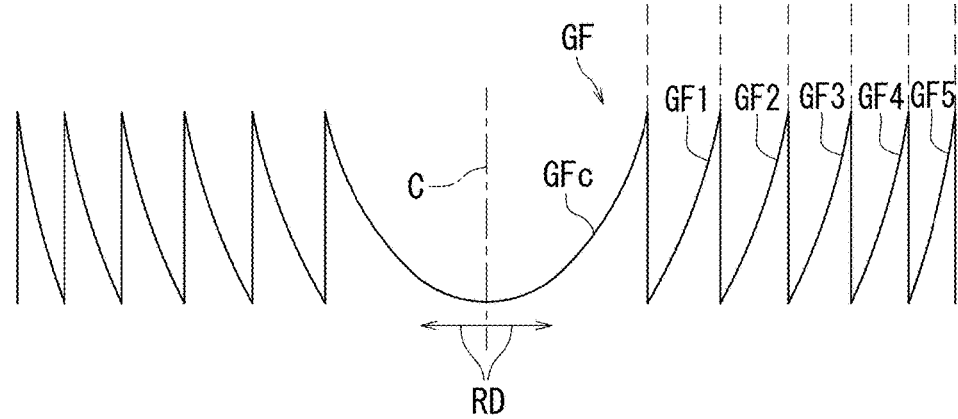
FIG. 13B is a diagram illustrating an electric potential gradient formed in the liquid crystal element according to the fourth embodiment of the present invention.

The following describes an electric potential gradient GF formed in the liquid crystal element 100 with reference to FIGS. 12 to 13B. FIG. 13A is a plan view of the liquid crystal element 100. FIG. 13B is a diagram illustrating the electric potential gradient GF formed in the liquid crystal element 100. The electric potential gradient GF illustrated in FIG. 13B is formed in a cross section taken along a line A-A in FIG. 13A.

As illustrated in FIGS. 12, 13A, and 13B, when the second voltage V2 is applied to the center electrode rc and the respective second electrodes 2 of the unit electrodes r1 to r5 and the first voltage V1 is applied to the respective first electrodes 1 of the unit electrodes r1 to r5, a serration-like electric potential gradient GF that is symmetrical about the center line C of the liquid crystal element 100 is formed in the liquid crystal layer 23 due to the presence of the highly resistive layers 22, the first boundary layers 51, and the second boundary layers 52. In other words, the electric potential gradient GF has a concentric circular pattern in a plan view of the liquid crystal element 100 (i.e., when the liquid crystal element 100 is viewed from a direction of extension of the center line C).

The electric potential gradient GF includes: an electric potential gradient GFc corresponding to the center electrode rc; an electric potential gradient GF2 corresponding to the unit electrode r1; an electric potential gradient GF2 corresponding to the unit electrode r2; an electric potential gradient GF3 corresponding to the unit electrode r3; an electric potential gradient GF4 corresponding to the unit electrode r4; and an electric potential gradient GF5 corresponding to the unit electrode r5. The electric potential gradients GFc and GF1 to GF5 are each an electric potential gradient relative to a radial direction RD of the liquid crystal element 100.

The electric potential gradients GF1 to GF5 each are a smooth curve with no steps and no extrema (minimal values and maximal values). Also, the electric potential gradient GFc is a smooth curve with no steps. The electric potential gradient GFc has no extrema (minimal values and maximal values) between the center electrode rc and the center line C. The electric potential gradient GFc is represented for example by a quadratic curve. The electric potential gradients GFc and GF1 to GF5 each in the shape of a curve can be formed by setting the frequencies f1 and f2 so as to be higher than frequencies used to form linear electric potential gradients. The electric potential gradients GFc and GF1 to GF5 are each formed in a manner that the electric potential increases in the radial direction RD of the liquid crystal element 100 away from the center line C. Further, the electric potential gradients GFc and GF1 to GF5 get steeper in the direction away from the center line C.

As a result of formation of the electric potential gradient GF in the liquid crystal layer 23, a refractive index gradient corresponding to the electric potential gradient GF is formed in the liquid crystal layer 23. As a result, incoming beams incident on the liquid crystal layer 23 are refracted at refracting angles corresponding to the electric potential gradients GFc and GF1 to GF5 and exit as outgoing beams from the liquid crystal layer 23. Since the electric potential gradients get steeper in the direction away from the center line C, the refracting angles get larger in the direction away from the center line C, and the outgoing beams focus toward the center line C. As a result, the liquid crystal element 100 is capable of functioning as a Fresnel lens.

It should be noted that refractive index gradients corresponding to the respective electric potential gradients GF1, GF2, GF3, GF4, and GF5 each are a smooth curve with no steps and no extrema (minimal values and maximal values). Also, a refractive index gradient corresponding to the electric potential gradient GFc is a smooth curve with no steps. The refractive index gradient corresponding to the electric potential gradient GFc has no extrema (minimal values and maximal values) between the center electrode rc and the center line C.

As described above with reference to FIGS. 10 to 13B, the center electrode rc and the plurality of unit electrodes rn are in concentric circular arrangement in the fourth embodiment. The center electrode rc has the radius Rc that is larger than the width dn of each unit electrode rn. A unit electrode rn having a larger radius Rn has a width dn smaller than a width of another unit electrode rn having a smaller radius Rn. In addition, the plurality of highly resistive layers 22 corresponding to the plurality of unit electrodes rn are provided. Therefore, upon application of the first voltage V1 and the second voltage V2, the serration-like electric potential gradient GF that is symmetrical about the center line C as illustrated in FIG. 13B is formed. As a result, the refracting angles can be made larger in the direction away from the center line C without an increase in the thickness of the liquid crystal layer 23, and the liquid crystal element 100 is capable of functioning as the Fresnel lens.

Further, the electric potential gradients GFc and GF1 to GF5 each being a smooth curve with no steps are formed in the fourth embodiment due to the presence of the plurality of highly resistive layers 22 corresponding to the plurality of unit electrodes rn. Therefore, wavefront aberration of the outgoing beams is reduced. Further, the electric potential gradient GFc has no extrema (minimal values and maximal values) between the center electrode rc and the center line C. In addition, the electric potential gradients GF1 to GF5 each have no extrema. Therefore, incoming beams can be refracted with high precision and therefore a high precision Fresnel lens can be formed from the liquid crystal element 100.

Further, in the fourth embodiment similarly to the second embodiment, the width dn (distance between the first electrode 1 and the second electrode 2) is larger than each of the width K1 of the first electrode 1 and the width K2 of the second electrode 2. Therefore, relative to a total light quantity of incoming beams incident on the liquid crystal element 100, a proportion of a light quantity of refracted outgoing beams can be easily made larger than a proportion of a light quantity of outgoing beams traveling straight. As a result, the liquid crystal element 100 is capable of effectively functioning as the Fresnel lens.

The width dn is preferably at least twice the width K1 of the first electrode 1 and at least twice the width K2 of the second electrode 2. In this case, the liquid crystal element 100 is capable of more effectively functioning as the Fresnel lens.

In the fourth embodiment similarly to the second embodiment, the width dn is larger than each of the width K1 of the first electrode 1 and the width K2 of the second electrode 2. Further, each highly resistive layer 22 extends over a wide area (as wide as the width dn) from beneath each first electrode 1 to beneath a corresponding second electrode 2. Therefore, the electric potential gradients GF1 to GF5 having no extrema can each be easily formed from beneath each first electrode 1 to beneath the corresponding second electrode 2 by appropriately setting the maximum amplitudes V1m and V2m, the frequencies f1 and f2, and resistivity of the highly resistive layers 22. As a result, a higher precision Fresnel lens can be formed from the liquid crystal element 100.

Furthermore, according to the fourth embodiment, a Fresnel lens having a large refracting angle can be efficiently formed by forming the center electrode rc and each unit electrode rn so as to satisfy the expression (3) and merely controlling the first voltage V1 and the second voltage V2. That is, the Fresnel lens can be formed without a necessity to control a multiplicity of, that is, more than two voltages.

Further, in the fourth embodiment similarly to the second embodiment, gradient angles of the respective electric potential gradients GFc and GF1 to GF5 and consequently the refracting angles can be easily varied by merely controlling the maximum amplitude V1m of the first voltage V1 or the maximum amplitude V2m of the second voltage V2 while keeping the thickness of the liquid crystal layer 23 unchanged. In other words, a focal length of the Fresnel lens can be varied in both positive and negative directions by merely controlling the maximum amplitude V1m of the first voltage V1 or the maximum amplitude V2m of the second voltage V2. Thus, focus control that realizes a wide operation range can be performed in the single liquid crystal element 100.

Further, in the fourth embodiment, the maximum amplitude V2m of the second voltage V2 is larger than the maximum amplitude V1m of the first voltage V1. As a result, a convex Fresnel lens can be formed from the liquid crystal element 100. However, the maximum amplitude V2m may be made smaller than the maximum amplitude V1m. As a result, a concave Fresnel lens can be formed. According to the fourth embodiment, a convex Fresnel lens and a concave Fresnel lens can be easily formed from the single liquid crystal element 100 by controlling the maximum amplitudes V1m and V2m.

Further, in the fourth embodiment similarly to the second embodiment, light can be refracted as a result of formation of the electric potential gradient GF and the refractive index gradient while reducing power loss. Also, similarly to the second embodiment, the liquid crystal element 100 has simple structure and therefore a manufacturing cost of the liquid crystal element 100 can be reduced and a manufacturing yield of the liquid crystal element 100 can be increased.

Fifth Embodiment

Figure 14:
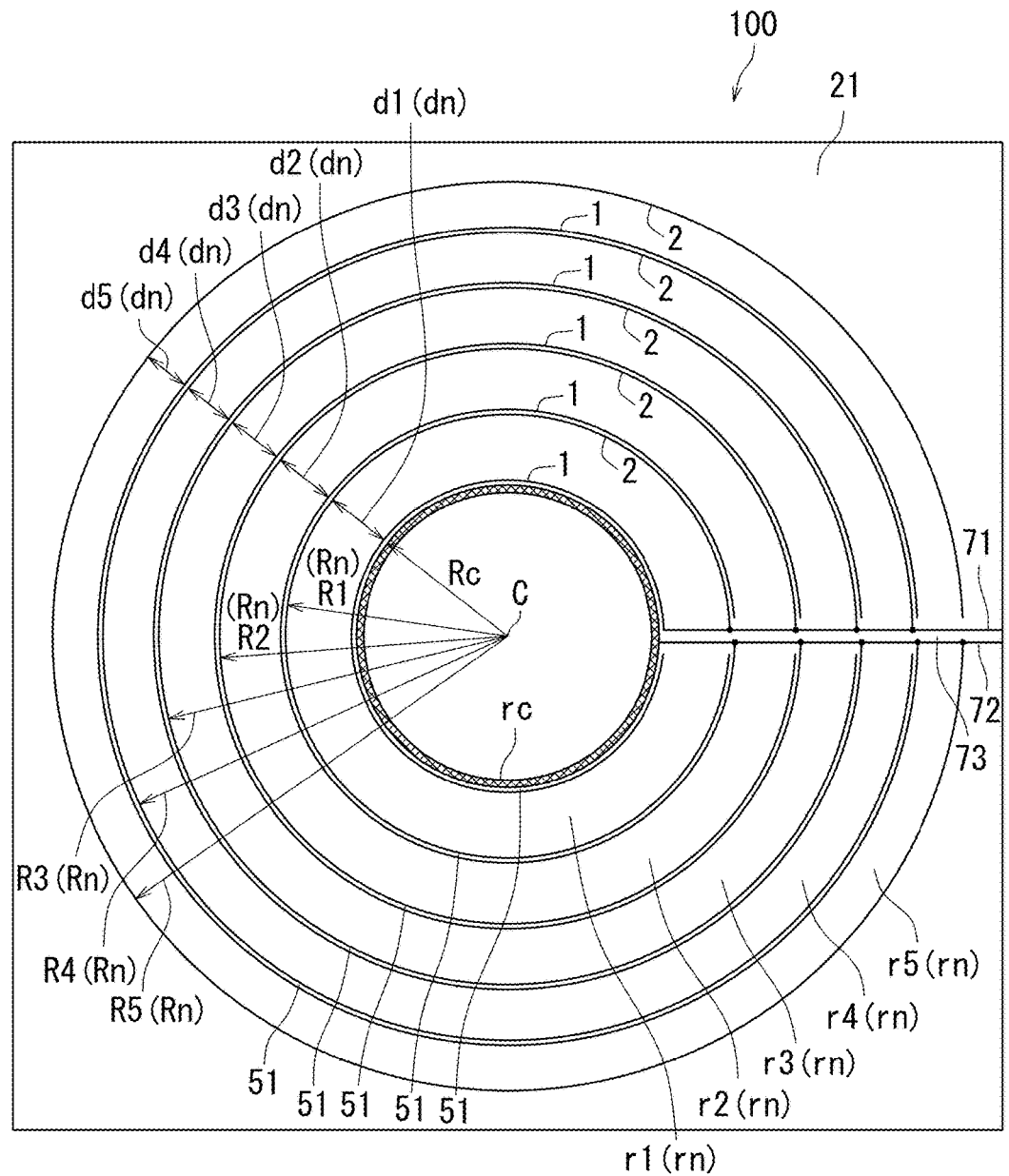
FIG. 14 is a plan view of a liquid crystal element according to a fifth embodiment of the present invention.
Figure 15:
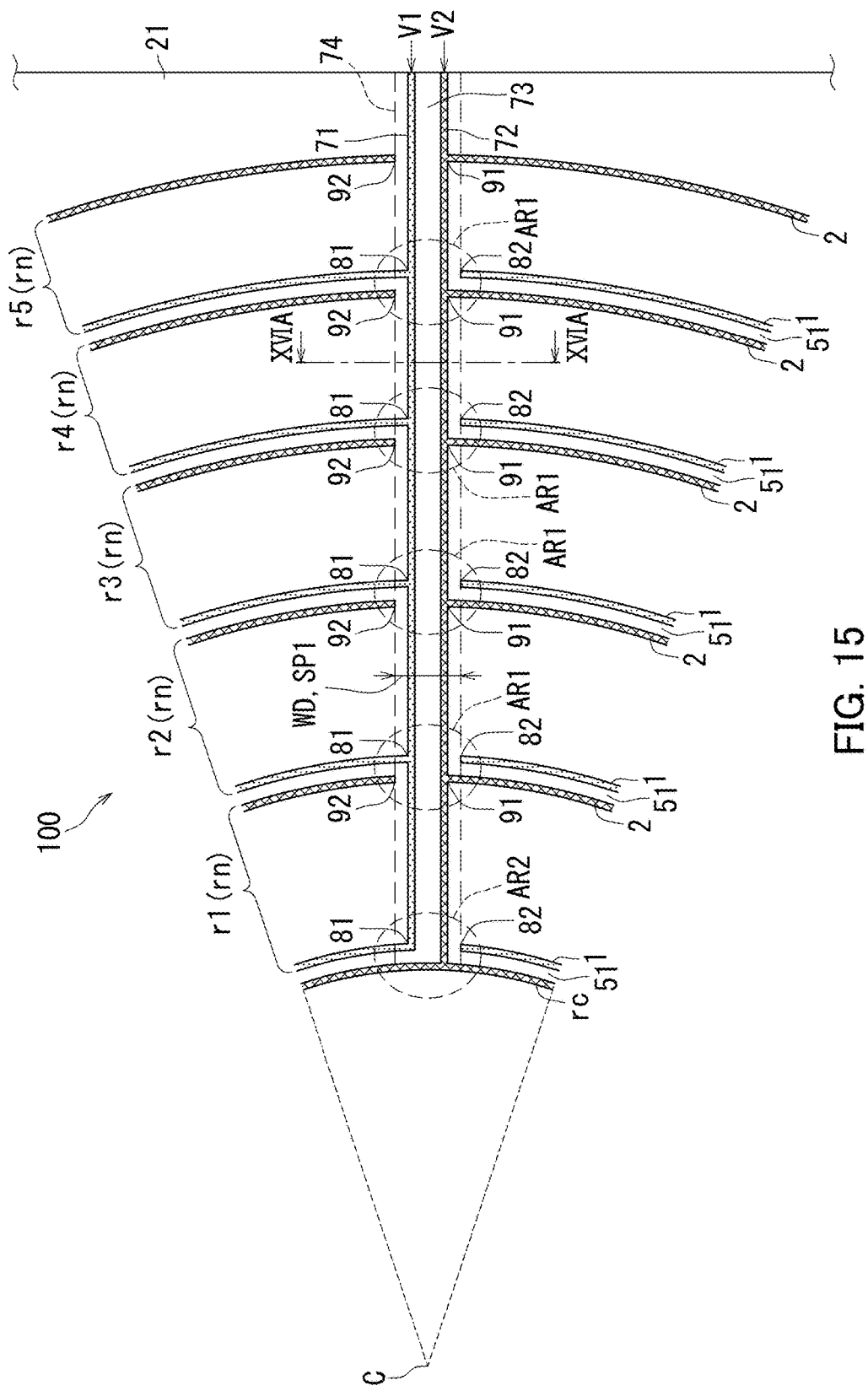
FIG. 15 is an enlarged plan view of a part of the liquid crystal element according to the fifth embodiment of the present invention.

The following describes a liquid crystal element 100 according to a fifth embodiment of the present invention with reference to FIGS. 14 to 16B. The liquid crystal element 100 according to the fifth embodiment differs from the liquid crystal element 100 according to the fourth embodiment in that a first lead wire 71 and a second lead wire 72 are provided as illustrated in FIG. 14 and a third boundary layer 73 and an opposed layer 74 are provided as illustrated in FIG. 15. Also, unlike the first electrode 1 and the second electrode 2 in the fourth embodiment each having a circular ring shape with no cut part, a first electrode 1 and a second electrode 2 in the fifth embodiment each have a circular ring shape including a cut part. The following mainly describes differences between the fifth embodiment and the fourth embodiment.

FIG. 14 is a plan view of the liquid crystal element 100 according to the fifth embodiment. FIG. 15 is an enlarged plan view of a part of the liquid crystal element 100.

As illustrated in FIGS. 14 and 15, the liquid crystal element 100 includes the first lead wire 71, the second lead wire 72, and the third boundary layer 73 in addition to the structure of the liquid crystal element 100 according to the fourth embodiment.

The first lead wire 71 extends from a first electrode 1 that has a smallest radius among a plurality of first electrodes 1 toward a first electrode 1 that has a largest radius without contacting a plurality of second electrodes 2. That is, the first lead wire 71 extends outwardly in a radial direction of the liquid crystal element 100 without contacting the plurality of second electrodes 2. The first lead wire 71 extends linearly. A first voltage V1 is applied to the first lead wire 71. The first lead wire 71 is formed from the same material as the first electrodes 1.

The second lead wire 72 extends from a center electrode rc toward a second electrode 2 that has a largest radius among the plurality of second electrodes 2 without contacting the plurality of first electrodes 1. That is, the second lead wire 72 extends outwardly in the radial direction of the liquid crystal element 100 without contacting the plurality of first electrodes 1. The second lead wire 72 extends linearly.

A second voltage V2 is applied to the second lead wire 72. The second lead wire 72 is formed from the same material as the second electrodes 2.

The third boundary layer 73 contains the same electric insulator as an insulating layer 21 and is formed from the same material as the insulating layer 21. Therefore, the third boundary layer 73 is formed as a part of the insulating layer 21. Also, the third boundary layer 73 is located between the first lead wire 71 and the second lead wire 72. Therefore, the third boundary layer 73 electrically insulates the first lead wire 71 and the second lead wire 72 from each other. The third boundary layer 73 linearly extends along the first lead wire 71 and the second lead wire 72.

The first electrodes 1 each have a circular ring shape including a cut part. Specifically, the first electrodes 1 each have the shape of an open curve, that is, a C-shape. One end 81 of opposite ends of each first electrode 1 is connected to the first lead wire 71. Therefore, the first voltage V1 is applied to each first electrode 1 via the first lead wire 71. The other end 82 of the opposite ends of each first electrode 1 is located opposite to the second lead wire 72 with the insulating layer 21 therebetween.

The second electrodes 2 each have a circular ring shape including a cut part. Specifically, the second electrodes 2 each have the shape of an open curve, that is, a C-shape. One end 91 of opposite ends of each second electrode 2 is connected to the second lead wire 72. Therefore, the second voltage V2 is applied to each second electrode 2 via the second lead wire 72. The other end 92 of the opposite ends of each second electrode 2 is located opposite to the first lead wire 71 with the insulating layer 21 therebetween.

First boundary layers 51 each have a circular ring shape including a cut part. Specifically, the first boundary layers 51 each have the shape of an open curve, that is, a C-shape. It should be noted that second boundary layers 52 (see FIG. 12) correspond to the respective first boundary layers 51 and each have a circular ring shape including a cut part. Specifically, the second boundary layers 52 each have the shape of an open curve, that is, a C-shape. The second boundary layers 52 are each connected to the opposed layer 74 at the cut part.

The center electrode rc is connected to the second lead wire 72. The center electrode rc, the plurality of first electrodes 1, the plurality of second electrodes 2, the plurality of first boundary layers 51, the first lead wire 71, the second lead wire 72, and the third boundary layer 73 are located at the same layer level.

The liquid crystal element 100 will be further described with reference to FIGS. 15 to 16B. As illustrated in FIG. 15, the liquid crystal element 100 further includes the opposed layer 74. The opposed layer 74 is formed in a straight line so as to correspond to the first lead wire 71, the third boundary layer 73, and the second lead wire 72. The opposed layer 74 has a width WD that is substantially the same as a distance SP1. The distance SP1 indicates a distance between a straight line connecting the plurality of ends 82 and a straight line connecting the plurality of ends 92. The width WD of the opposed layer 74 indicates a dimension of the opposed layer 74 along a circumferential direction of the liquid crystal element 100.

Figure 16A:
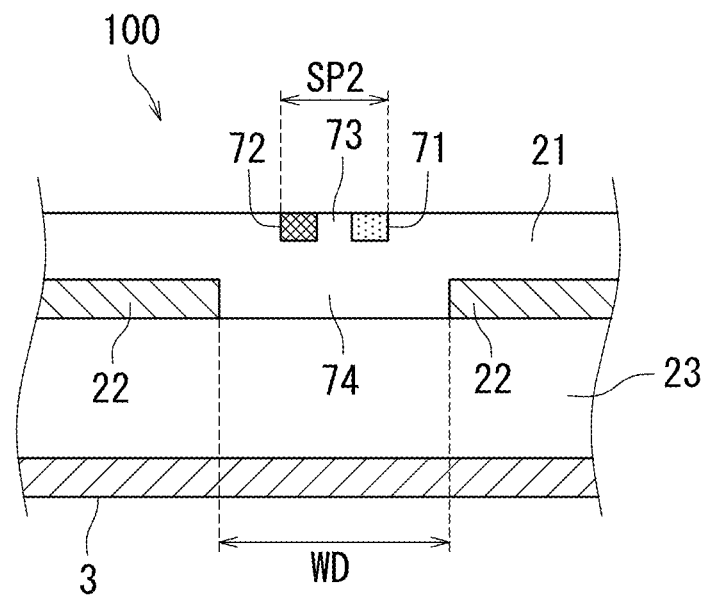
FIG. 16A is a cross-sectional view of a part of the liquid crystal element according to the fifth embodiment of the present invention.

FIG. 16A is a cross-sectional view taken along a line XVIA-XVIA in FIG. 15. As illustrated in FIG. 16A, the opposed layer 74 is located opposite to the first lead wire 71, the third boundary layer 73, and the second lead wire 72 with the insulating layer 21 therebetween. The width WD of the opposed layer 74 is larger than a distance SP2. The distance SP2 indicates a distance between an outer edge of the first lead wire 71 and an outer edge of the second lead wire 72. However, the width WD of the opposed layer 74 may be at least the distance SP2 and no greater than the distance SP1.

The opposed layer 74 is the same electrical insulator as the insulating layer 21 and is formed from the same material as the insulating layer 21. Therefore, in the fifth embodiment, the opposed layer 74 is formed as a part of the insulating layer 21. However, the opposed layer 74 may be an electrical insulator different from the insulating layer 21. For example, the opposed layer 74 may be formed from an electrical insulator such as polyimide that is used as an alignment material for a liquid crystal layer 23. The opposed layer 74 and highly resistive layers 22 are located at the same layer level. It should be noted that each highly resistive layer 22 (see FIG. 12) located opposite to each unit electrode rn has a circular band-like shape including a cut part due to the presence of the opposed layer 74. That is, the opposed layer 74 traverses each highly resistive layer 22 located opposite to each unit electrode rn. Therefore, each highly resistive layer 22 located opposite to each unit electrode rn includes a cut part.

Figure 16B:
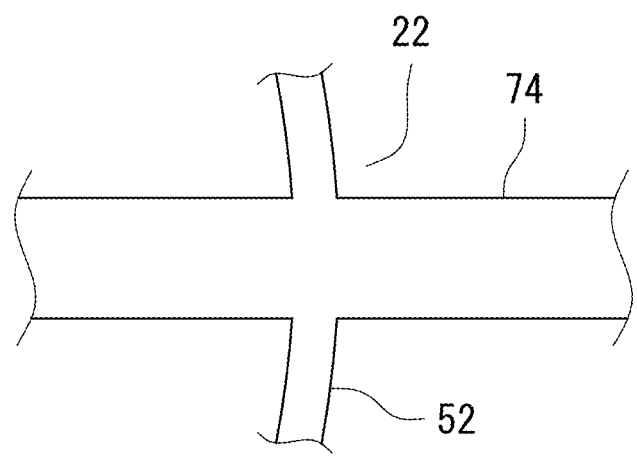
FIG. 16B is a plan view of a part of the liquid crystal element according to the fifth embodiment of the present invention.

FIG. 16B is a plan view illustrating the opposed layer 74 and the second boundary layer 52 located in a region opposite to a region AR1 illustrated in FIG. 15. FIG. 16B illustrates the opposed layer 74 and the second boundary layer 52 located in a region opposite to a single region AR1 in order to simplify the drawing. A plurality of regions AR1 each indicate a region in which the first boundary layer 51 is interrupted by the first lead wire 71, the third boundary layer 73, and the second lead wire 72. Also, the first electrode 1 is interrupted in each region AR1, and the end 82 of the first electrode 1 is located in the region AR1. Also, the second electrode 2 is interrupted in each region AR1, and the end 92 of the second electrode 2 is located in the region AR1.

As illustrated in FIG. 16B, the opposed layer 74 is connected to the second boundary layer 52 in the region opposite to the region AR1. Similarly, the opposed layer 74 is connected to the second boundary layer 52 in a region opposite to a region AR2 illustrated in FIG. 15. The region AR2 indicates a region in which the first boundary layer 51 is interrupted by the first lead wire 71, the third boundary layer 73, and the second lead wire 72. Also, the first electrode 1 is interrupted in the region AR2, and the end 82 of the first electrode 1 is located in the region AR2. The end 92 of the second electrode 2 is not located in the region AR2.

In the fifth embodiment, the first voltage V1 is applied to the first lead wire 71 by the first power supply circuit 41 illustrated in FIG. 2A. As a result, the first voltage V1 illustrated in FIG. 2B is supplied to each first electrode 1 via the first lead wire 71. Also, the second voltage V2 is applied to the second lead wire 72 by the second power supply circuit 42 illustrated in FIG. 2A. As a result, the second voltage V2 illustrated in FIG. 2C is supplied to the center electrode rc and each second electrode 2 via the second lead wire 72.

The liquid crystal element 100 according to the fifth embodiment described above with reference to FIGS. 14 to 16 has structure similar to structure of the liquid crystal element 100 according to the fourth embodiment. Therefore, similarly to the fourth embodiment, a serration-like electric potential gradient GF (see FIG. 13B) that is symmetrical about a center line C of the liquid crystal element 100 is formed in the fifth embodiment. That is, the electric potential gradient GF has a concentric circular pattern in a plan view of the liquid crystal element 100. As a result, similarly to the fourth embodiment, a high precision Fresnel lens can be formed from the liquid crystal element 100. In addition to the above, the fifth embodiment has effects similar to effects of the fourth embodiment.

Further, the liquid crystal element 100 according to the fifth embodiment includes the opposed layer 74. The opposed layer 74 is an electrical insulator. Therefore, as compared with a configuration in which the highly resistive layer 22 is provided at the position of the opposed layer 74 in place of the opposed layer 74, interference between an electric potential derived from the first voltage V1 of the end 82 of the first electrode 1 and the vicinity of the end 82 and an electric potential derived from the second voltage V2 of the second lead wire 72 is reduced. Further, interference between an electric potential derived from the second voltage V2 of the end 92 of the second electrode 2 and the vicinity of the end 92 and an electric potential derived from the first voltage V1 of the first lead wire 71 is reduced. As a result, distortion of the concentric circular pattern of the electric potential gradient GF in a plan view of the liquid crystal element 100 is reduced and therefore a higher precision Fresnel lens can be formed.

Interference between the electric potentials is reduced for the following reasons. That is, the opposed layer 74 has an electric resistivity higher than an electric resistivity of the highly resistive layer 22. Therefore, as compared with a configuration in which the highly resistive layer 22 is provided in place of the opposed layer 74, the electric potential derived from the first voltage V1 of the end 82 of the first electrode 1 and the electric potential derived from the second voltage V2 of the second lead wire 72 sharply decrease between the end 82 of the first electrode 1 and the second lead wire 72. As a result, interference between the electric potential derived from the first voltage V1 of the end 82 and the electric potential derived from the second voltage V2 of the second lead wire 72 is reduced as compared with a configuration in which the highly resistive layer 22 is provided in place of the opposed layer 74. Similarly to the above, interference between electric potentials is reduced due to a sharp decrease in electric potential between the vicinity of the end 82 and the second lead wire 72.

Similarly to the above, due to the presence of the opposed layer 74, the electric potential derived from the second voltage V2 of the end 92 of the second electrode 2 and the electric potential derived from the first voltage V1 of the first lead wire 71 sharply decrease between the end 92 of the second electrode 2 and the first lead wire 71 as compared with a configuration in which the highly resistive layer 22 is provided in place of the opposed layer 74. As a result, interference between the electric potential derived from the second voltage V2 of the end 92 and the electric potential derived from the first voltage V1 of the first lead wire 71 is reduced as compared with a configuration in which the highly resistive layer 22 is provided in place of the opposed layer 74. Similarly to the above, interference between electric potentials is reduced due to a sharp decrease in electric potential between the vicinity of the end 92 and the first lead wire 71.

Further, in the fifth embodiment, the opposed layer 74 is connected to the second boundary layers 52 in regions located opposite to the regions AR1 and the region AR2. Therefore, the electric potential derived from the first voltage V1 of the end 82 of the first electrode 1 and the electric potential derived from the second voltage V2 of the second lead wire 72 decrease more sharply between the end 82 of the first electrode 1 and the second lead wire 72. As a result, interference between the electric potential derived from the first voltage V1 of the end 82 and the electric potential derived from the second voltage V2 of the second lead wire 72 is further reduced. Similarly to the above, interference between electric potentials is further reduced due to a more sharp decrease in electric potential between the vicinity of the end 82 and the second lead wire 72.

Similarly to the above, since the opposed layer 74 is connected to the second boundary layers 52 in the regions located opposite to the regions AR1 and the region AR2, the electric potential derived from the second voltage V2 of the end 92 of the second electrode 2 and the electric potential derived from the first voltage V1 of the first lead wire 71 decrease more sharply between the end 92 of the second electrode 2 and the first lead wire 71. As a result, interference between the electric potential derived from the second voltage V2 of the end 92 and the electric potential derived from the first voltage V1 of the first lead wire 71 is further reduced. Similarly to the above, interference between electric potentials is further reduced due to a more sharp decrease in electric potential between the vicinity of the end 92 and the first lead wire 71.

Further, in the fifth embodiment, the first lead wire 71 and the second lead wire 72 are formed at the same layer level as the first electrodes 1 and the second electrodes 2 so as to extend outwardly in the radial direction of the liquid crystal element 100. As a result, a manufacturing cost can be reduced as compared with a configuration in which through holes for the first electrodes 1 and through holes for the second electrodes 2 are formed in the first substrate 31 (see FIG. 2A) (fourth embodiment).

Further, in the fifth embodiment, the maximum amplitude V2$m$ of the second voltage V2 is larger than the maximum amplitude V1$m$ of the first voltage V1. As a result, a convex Fresnel lens can be formed from the liquid crystal element 100.

Variation

Figure 17:
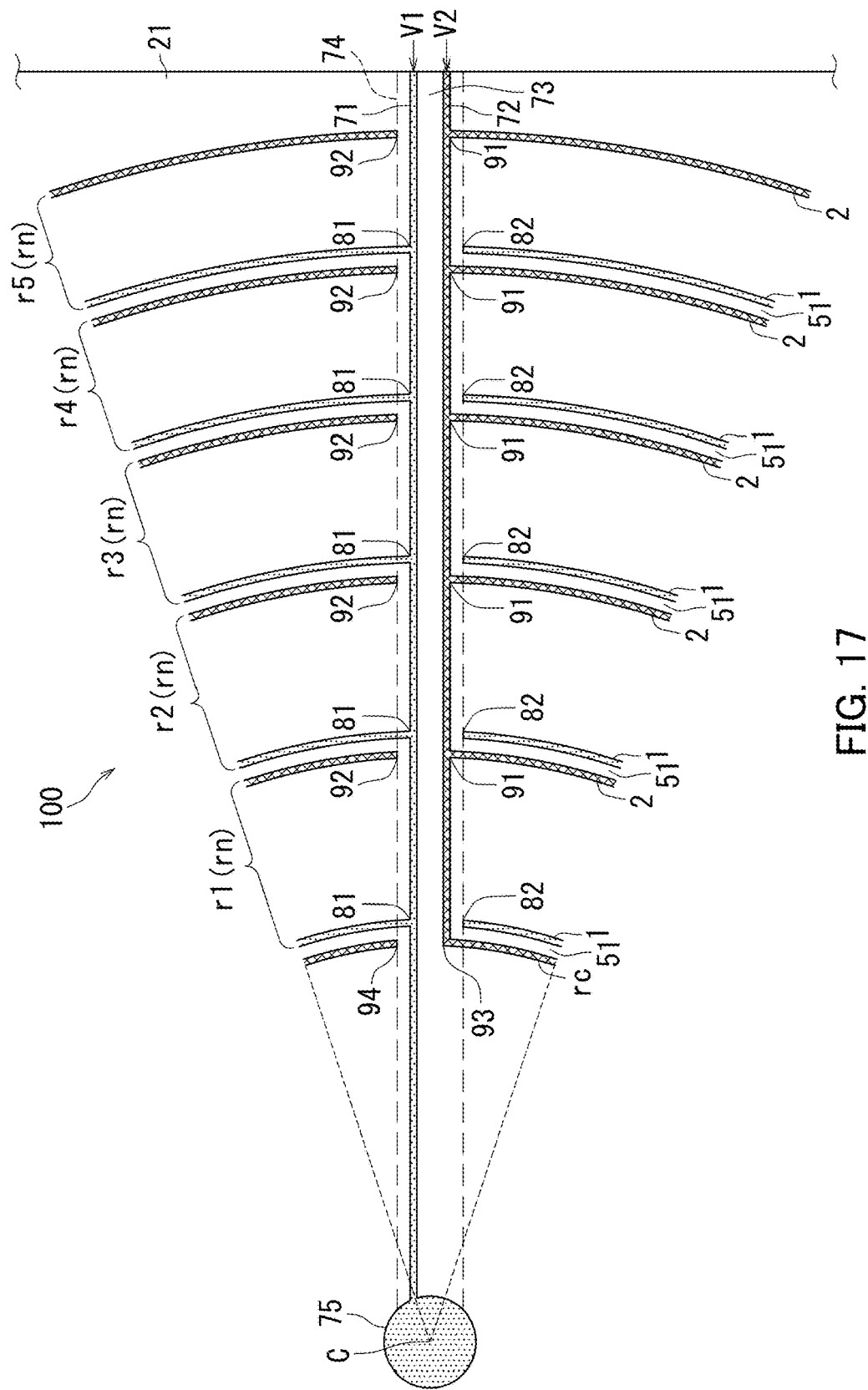
FIG. 17 is a plan view of a part of a liquid crystal element according to a variation of the fifth embodiment of the present invention.

The following describes a liquid crystal element 100 according to a variation of the fifth embodiment of the present invention with reference to FIG. 17. The liquid crystal element 100 according to the variation differs from the liquid crystal element 100 according to the fifth embodiment illustrated in FIG. 15 in that the liquid crystal element includes a core electrode 75 as illustrated in FIG. 17. The following mainly describes differences between the variation and the fifth embodiment.

FIG. 17 is a plan view illustrating a part of the liquid crystal element 100 according to the variation. As illustrated in FIG. 17, the liquid crystal element 100 according to the variation includes the core electrode 75 in addition to the structure of the liquid crystal element 100 according to the fifth embodiment illustrated in FIG. 15. The core electrode 75 has a circular sheet-like shape (that is, a disk-like shape) and is located such that a center line C extends therethrough. The core electrode 75 is connected to a first lead wire 71. The core electrode 75 is formed from the same material as first electrodes 1. The core electrode 75, a center electrode rc, a plurality of first electrodes 1, a plurality of second electrodes 2, a plurality of first boundary layers 51, the first lead wire 71, a second lead wire 72, and a third boundary layer 73 are located at the same layer level.

The first lead wire 71 extends from the core electrode 75 to a first electrode 1 that has a largest radius without contacting the plurality of second electrodes 2. A first voltage V1 is applied to the first lead wire 71. Therefore, the first voltage V1 is supplied to the core electrode 75 and each first electrode 1 via the first lead wire 71.

The core electrode 75 and the center electrode rc are insulated from each other by an insulating layer 21. The center electrode rc has a circular ring shape including a cut part. Specifically, the center electrode rc has the shape of an open curve, that is, a C-shape. One end 93 of opposite ends of the center electrode rc is connected to the second lead wire 72. The other end 94 of the opposite ends of the center electrode rc is located opposite to the first lead wire 71 with the insulating layer 21 therebetween.

As described above with reference to FIG. 17, the liquid crystal element 100 according to the variation includes the core electrode 75. Therefore, a concave Fresnel lens can be formed. That is, a maximum amplitude V2$m$ of the second voltage V2 is made smaller than a maximum amplitude V1$m$ of the first voltage V1. The first voltage V1 is applied to the core electrode 75. Therefore, a serration-like electric potential gradient corresponding to a concave Fresnel lens is formed in the liquid crystal element 100. As a result, the concave Fresnel lens can be formed. It should be noted that the serration-like electric potential gradient is symmetrical about the center line C of the liquid crystal element 100.

Further, according to the variation, the maximum amplitude V2$m$ of the second voltage V2 can be made larger than the maximum amplitude V1$m$ of the first voltage V1. As a result, a convex Fresnel lens can be formed. According to the variation, the concave Fresnel lens and the convex Fresnel lens can be easily formed from the single liquid crystal element 100 by controlling the maximum amplitudes V1$m$ and V2$m$.

Sixth Embodiment

Figure 18:
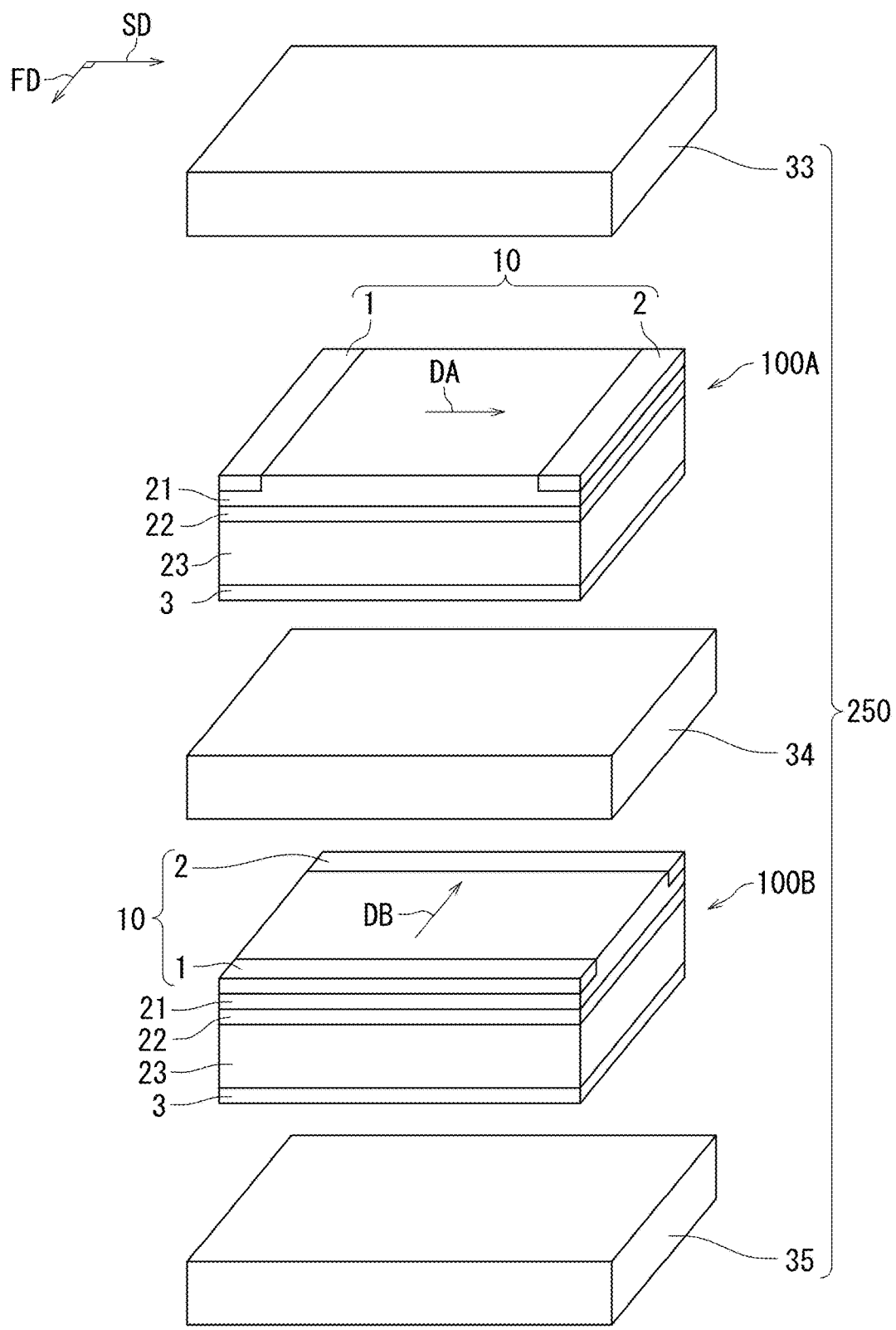
FIG. 18 is an exploded perspective view of a deflection element according to a sixth embodiment of the present invention.

The following describes a deflection element 250 according to a sixth embodiment of the present invention with reference to FIGS. 2 and 18. The deflection element 250 according to the sixth embodiment deflects light using two liquid crystal elements 100 according to the first embodiment described above with reference to FIG. 2. The following mainly describes differences between the sixth embodiment and the first embodiment.

FIG. 18 is an exploded perspective view of the deflection element 250 according to the sixth embodiment. The deflection element 250 includes a third substrate 33, a liquid crystal element 100A, a fourth substrate 34, a liquid crystal element 100B, and a fifth substrate 35. The liquid crystal elements 100A and 100B each have structure similar to structure of the liquid crystal element 100 according to the first embodiment. However, the liquid crystal elements 100A and 100B each do not include a first substrate 31 and a second substrate 32.

In the second embodiment, the third substrate 33 functions as a first substrate 31 of the liquid crystal element 100A, and the fourth substrate 34 functions as a second substrate 32 of the liquid crystal element 100A. Also, the fourth substrate 34 functions as a first substrate 31 of the liquid crystal element 100B, and the fifth substrate 35 functions as a second substrate 32 of the liquid crystal element 100B. In this case, a third electrode 3 of the liquid crystal element 100A is formed on one main surface of a pair of main surfaces of the fourth substrate 34, and a first electrode 1, a second electrode 2, an insulating layer 21, and a highly resistive layer 22 of the liquid crystal element 100B are formed on the other main surface of the fourth substrate 34. For example, the third substrate 33, the fourth substrate 34, and the fifth substrate 35 are each transparent and formed from a glass.

The first electrode 1 and the second electrode 2 of the liquid crystal element 100A each extend along a first direction FD. The first direction FD is substantially orthogonal to a direction DA in the liquid crystal element 100A. The direction DA is defined in the same manner as the direction D1 in the first embodiment. The first electrode 1 and the second electrode 2 of the liquid crystal element 100B each extend along a second direction SD orthogonal to the first direction FD. The second direction SD is substantially orthogonal to a direction DB in the liquid crystal element 100B. The direction DB is defined in the same manner as the direction D1 in the first embodiment. The liquid crystal element 100A and the liquid crystal element 100B overlap with each other with the fourth substrate 34 therebetween.

Further, a first power supply circuit 41 as illustrated in FIG. 2A is provided for each of the liquid crystal elements 100A and 100B. Therefore, one first power supply circuit 41 applies a first voltage V1 to the first electrode 1 of the liquid crystal element 100A and the other first power supply circuit 41 applies the first voltage V1 to the first electrode 1 of the liquid crystal element 100B. A second power supply circuit 42 is provided for each of the liquid crystal elements 100A and 100B. Therefore, one second power supply circuit 42 applies a second voltage V2 to the second electrode 2 of the liquid crystal element 100A and the other second power supply circuit 42 applies the second voltage V2 to the second electrode 2 of the liquid crystal element 100B.

The first power supply circuit 41 and the second power supply circuit 42 corresponding to the liquid crystal element 100A are controlled independently of the first power supply circuit 41 and the second power supply circuit 42 corresponding to the liquid crystal element 100B by a controller 40. As a result, an electric potential gradient G1 and a refractive index gradient g1 are formed independently in the liquid crystal element 100A and the liquid crystal element 100B.

Incoming beams incident on the deflection element 250 exit as outgoing beams after being deflected to a direction in accordance with the electric potential gradient G1 and the refractive index gradient g1 determined by the first voltage V1 and the second voltage V2 applied to the liquid crystal element 100A and the electric potential gradient G1 and the refractive index gradient g1 determined by the first voltage V1 and the second voltage V2 applied to the liquid crystal element 100B. That is, the incoming beams can be deflected to a desired direction by controlling the first voltage V1 and/or the second voltage V2 applied to the liquid crystal element 100A and the first voltage V1 and/or the second voltage V2 applied to the liquid crystal element 100B.

As described above with reference to FIGS. 2 and 18, in the sixth embodiment, the liquid crystal elements 100A and 100B are arranged such that unit electrodes 10 of the liquid crystal elements 100A and 100B are substantially orthogonal to each other. Therefore, a range of directions to which the incoming beams can be deflected is increased as compared with a case of the liquid crystal element 100 according to the first embodiment. In addition to the above, the deflection element 250 according to the sixth embodiment has effects similar to effects of the liquid crystal element 100 according to the first embodiment. For example, a deflection angle (refracting angle) can be increased without an increase in thickness of the deflection element 250.

Seventh Embodiment

Figure 19A:
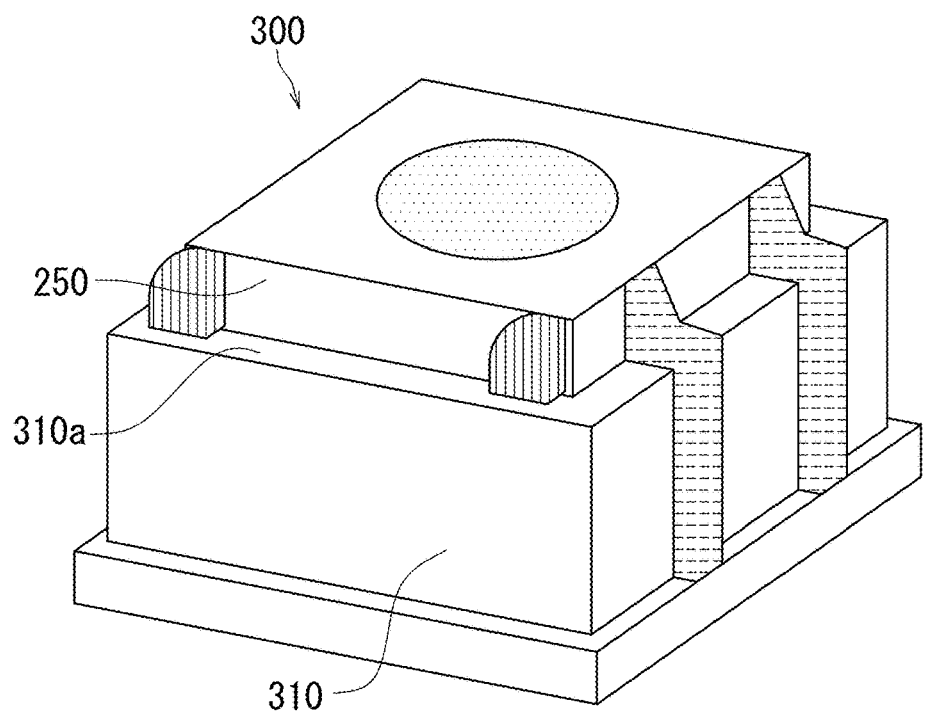
FIG. 19A is a perspective view of a liquid crystal module according to a seventh embodiment of the present invention.
Figure 19B:
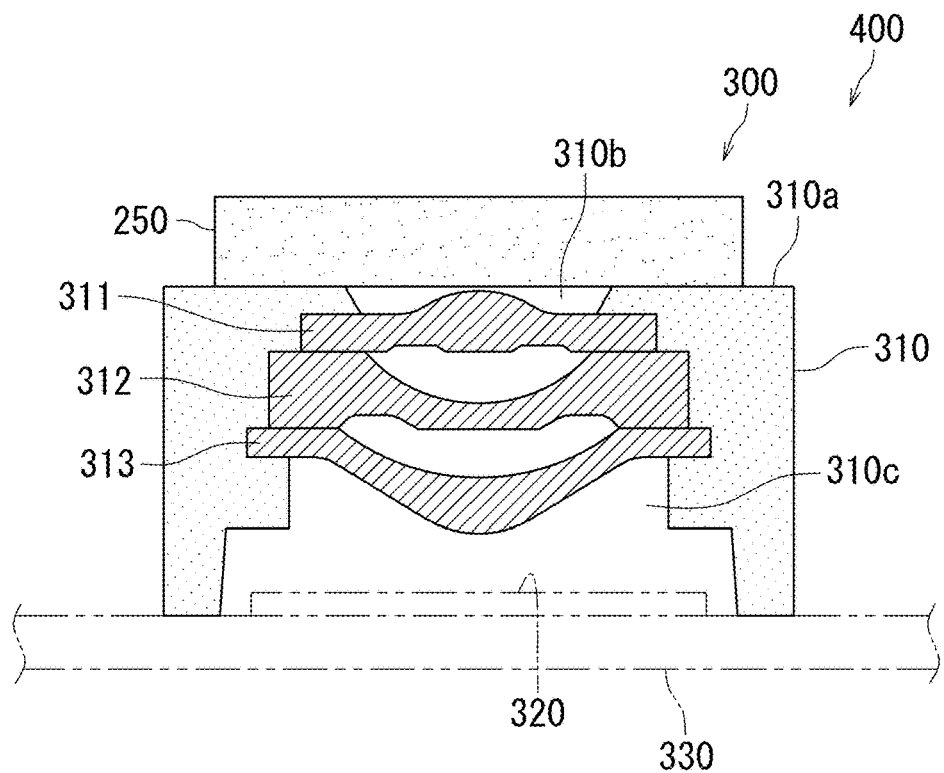
FIG. 19B is a cross-sectional view of the liquid crystal module according to the seventh embodiment of the present invention.

The following describes a liquid crystal module 300 according to a seventh embodiment of the present invention with reference to FIGS. 19A and 19B. The liquid crystal module 300 according to the seventh embodiment includes the deflection element 250 according to the sixth embodiment. The following mainly describes differences between the seventh embodiment and the sixth embodiment.

FIG. 19A is a perspective view of the liquid crystal module 300 according to the seventh embodiment. FIG. 19B is a cross-sectional view of the liquid crystal module 300. In order to simplify the drawing, illustration of a cross section of the deflection element 250 is omitted. As illustrated in FIGS. 19A and 19B, the liquid crystal module 300 is installed in an electronic device 400. The electronic device 400 is for example a camera or a mobile terminal (for example, a smartphone, a mobile phone, or a tablet computer). The electronic device 400 includes an imaging element 320 and a substrate 330 on which the imaging element 320 is mounted. The imaging element 320 is for example, a CCD (charge coupled device) image sensor or a CMOS (complementary metal oxide semiconductor) image sensor.

The liquid crystal module 300 includes the deflection element 250, a cover member 310, and a plurality of lenses 311 to 313. The cover member 310 has an open bottom. The cover member 310 is attached to the substrate 330 so as to cover the imaging element 320. The cover member 310 includes an upper surface portion 310a (outer surface portion) and has an opening 310b formed in the upper surface portion 310a and a cavity 310c. The lenses 311, 312, and 313 are provided in the cavity 310c of the cover member 310. Optical axes of the lenses 311 to 313 are in a straight line passing through the center of the opening 310b.

The deflection element 250 covers the opening 310b and is attached to the upper surface portion 310a of the cover member 310 so as to be located opposite to an imaging surface of the imaging element 320 with the lenses 311 to 313 therebetween. Therefore, the imaging element 320 images an object through the deflection element 250.

As described above with reference to FIGS. 19A and 19B, according to the seventh embodiment, the deflection element 250 can be provided as the liquid crystal module 300 including the cover member 310. Therefore, manufacture of the electronic device 400 can be facilitated as compared with a situation in which the deflection element 250 is provided as an independent component.

Further, according to the seventh embodiment, incoming beams incident on the imaging element 320 can be easily deflected (refracted) to a desired direction by controlling the first voltage V1 and/or the second voltage V2 applied to the liquid crystal element 100A and the first voltage V1 and/or the second voltage V2 applied to the liquid crystal element 100B of the deflection element 250 (see FIG. 2A). Therefore, camera-shake correction can be performed with simple structure without using complicated movable parts. Camera-shake correction refers to a process for reducing an artifact of an image due to camera shaking. Due to the absence of the complicated movable parts, a manufacturing cost of the electronic device 400 can be reduced and reliability of the electronic device 400 can be increased.

In addition to the above, the electronic device 400 according to the seventh embodiment has effects similar to effects of the deflection element 250 according to the sixth embodiment. For example, a deflection angle (refracting angle) can be increased without an increase in thickness of the deflection element 250. Therefore, a thickness of the liquid crystal module 300 and consequently a thickness of the electronic device 400 can be reduced. In other words, even where the electronic device 400 has a small thickness, the liquid crystal module 300 can be installed in the electronic device 400 in a manner that a required deflection angle (refracting angle) is achieved.

Eighth Embodiment

Figure 20A:
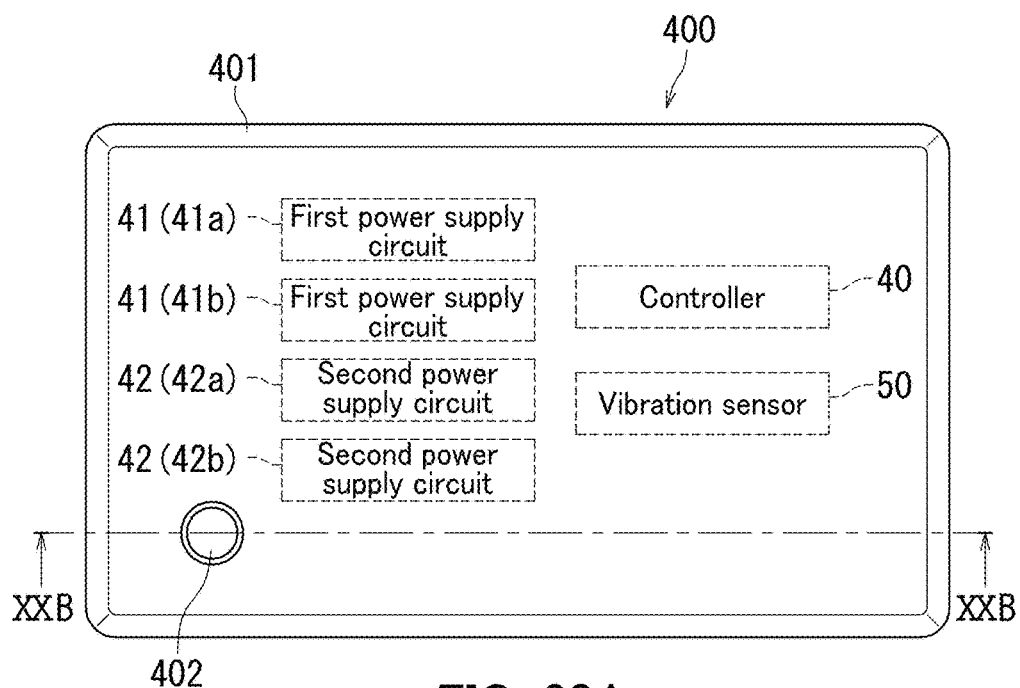
FIG. 20A is a plan view of an electronic device according to an eighth embodiment of the present invention.
Figure 20B:
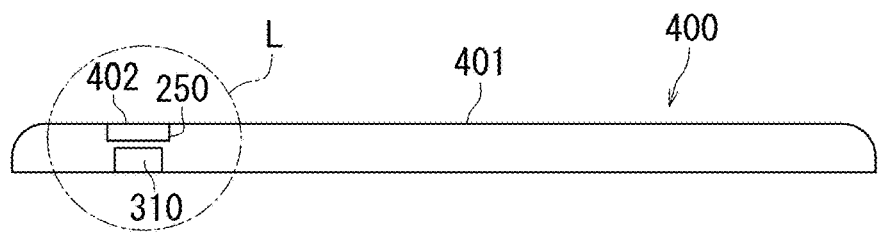
FIG. 20B is a cross-sectional view of the electronic device according to the eighth embodiment of the present invention.
Figure 20C:
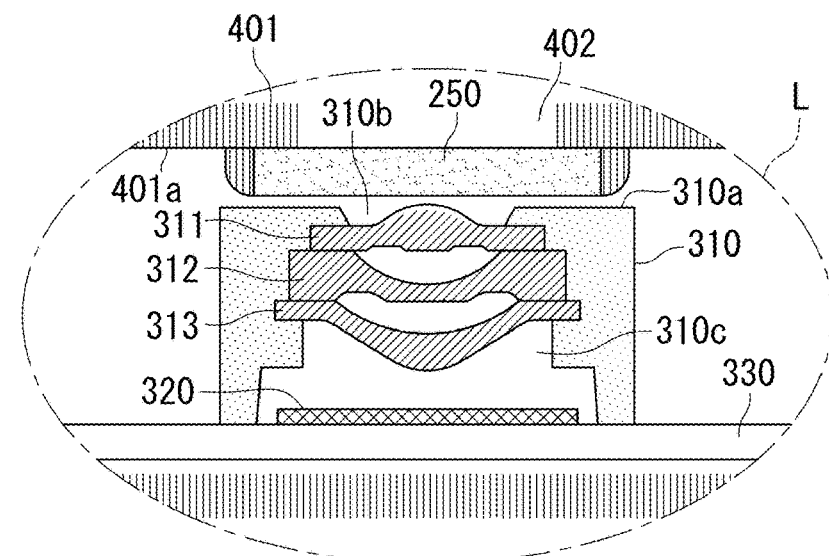
FIG. 20C is an enlarged cross-sectional view of a part of the electronic device according to the eighth embodiment of the present invention.

The following describes an electronic device 400 according to an eighth embodiment of the present invention with reference to FIGS. 20A to 20C. The electronic device 400 according to the eighth embodiment differs from the electronic device 400 according to the seventh embodiment in that a deflection element 250 is attached to a housing 401 rather than a cover member 310. The following mainly describes differences between the eighth embodiment and the seventh embodiment.

FIG. 20A is a plan view of the electronic device 400 according to the seventh embodiment. FIG. 20B is a cross-sectional view taken along a line XXB-XXB in FIG. 20A. FIG. 20C is an enlarged cross-sectional view of a region L in FIG. 20B. In order to simplify the drawings, illustration of a cross section of the deflection element 250 is omitted.

As illustrated in FIG. 20A, the electronic device 400 includes the housing 401, two first power supply circuits 41, two second power supply circuits 42, a controller 40, and a vibration sensor 50. A circular opening 402 is formed in the housing 401. The housing 401 accommodates the two first power supply circuits 41, the two second power supply circuits 42, the controller 40, and the vibration sensor 50. The two first power supply circuits 41, the two second power supply circuits 42, and the controller 40 are similar to the two first power supply circuits 41, the two second power supply circuits 42, and the controller 40 in the sixth embodiment, respectively.

In the following description, a first power supply circuit 41 that applies a first voltage V1 to the liquid crystal element 100A of the deflection element 250 (see FIG. 18) will be referred to as a first power supply circuit 41a, and a second power supply circuit 42 that applies a second voltage V2 to the liquid crystal element 100A will be referred to as a second power supply circuit 42a. Also, a first power supply circuit 41 that applies a first voltage V1 to the liquid crystal element 100B of the deflection element 250 (see FIG. 18) will be referred to as a first power supply circuit 41b, and a second power supply circuit 42 that applies a second voltage V2 to the liquid crystal element 100B will be referred to as a second power supply circuit 42b.

As illustrated in FIG. 20B, the electronic device 400 further includes the deflection element 250 and the cover member 310. As illustrated in FIG. 20C, the electronic device 400 further includes a plurality of lenses 311 to 313, an imaging element 320, and a substrate 330.

The housing 401 accommodates the deflection element 250, the cover member 310, the imaging element 320, and the substrate 330. The deflection element 250 is located above the cover member 310. The deflection element 250 covers the opening 402 and is attached to an inner surface portion 401a of the housing 401 so as to be located opposite to an imaging surface of the imaging element 320 with the lenses 311 to 313 therebetween. Therefore, the imaging element 320 images an object through the deflection element 250.

As illustrated in FIGS. 20A to 20C, the vibration sensor 50 detects vibration of the electronic device 400 due to camera shaking. The vibration sensor 50 is for example a vibrating structure gyroscope. The controller 40 performs camera-shake correction by controlling the first power supply circuit 41a and/or the second power supply circuit 42a and the first power supply circuit 41*b* and/or the second power supply circuit 42*b* depending on vibration detected by the vibration sensor 50 to deflect light incident on the imaging element 320.

As described above with reference to FIGS. 20A to 20C, in the eighth embodiment, the controller 40 performs camera-shake correction by controlling the first voltage V1 and/or the second voltage V2 applied to the liquid crystal element 100A and/or the liquid crystal element 100B depending on vibration detected by the vibration sensor 50 to deflect (refract) light incident on the imaging element 320 through the liquid crystal elements 100A and 100B. Therefore, the light incident on the imaging element 320 can be easily deflected (refracted) to a desired direction and camera-shake correction can be performed with simple structure without using complicated movable parts. In addition to the above, the electronic device 400 according to the eighth embodiment has effects similar to effects of the electronic device 400 according to the seventh embodiment.

Next, specific examples of the present invention will be described. However, the present invention is not limited to the examples described below.

EXAMPLES

First Example

Figure 21:
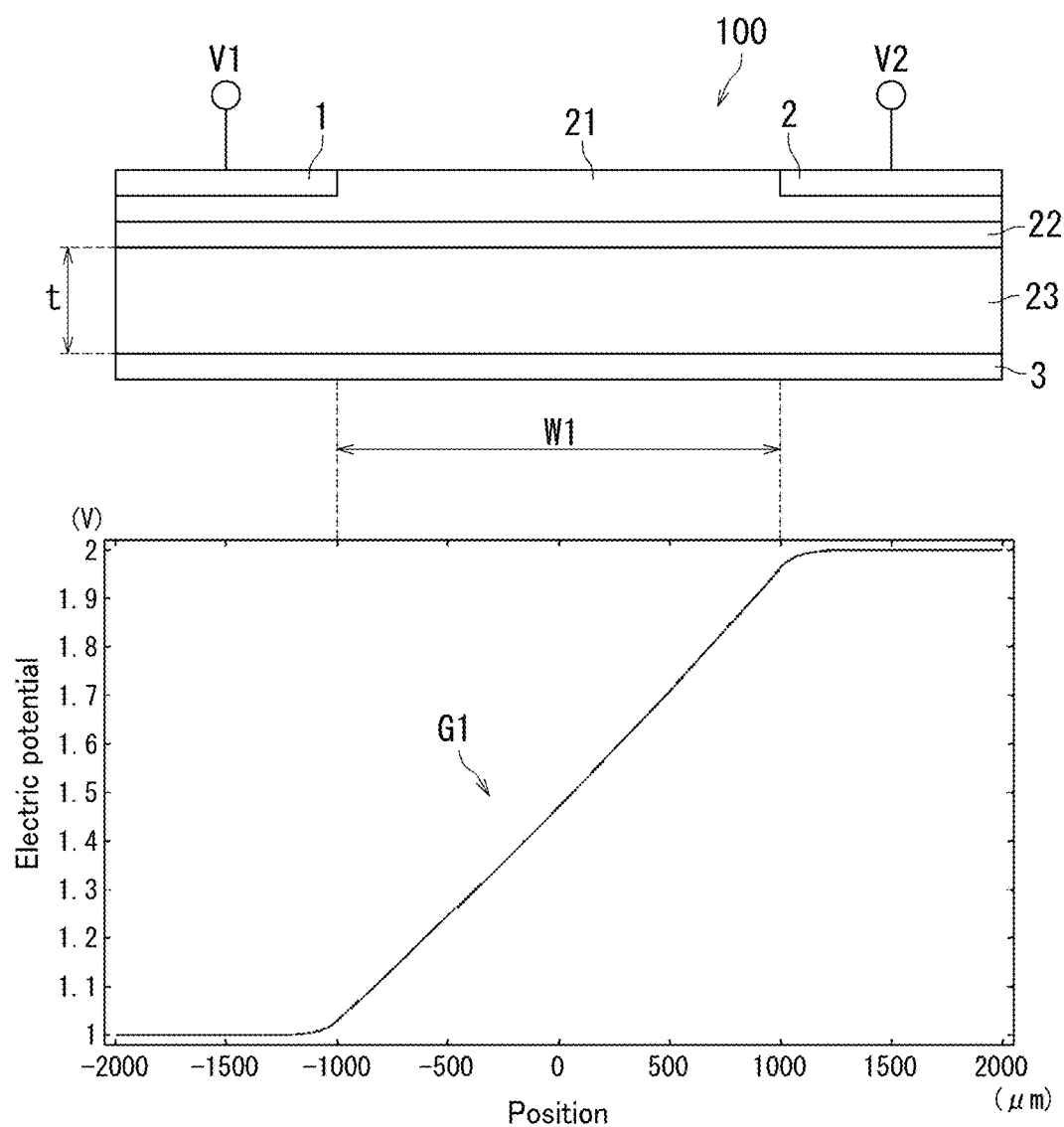
FIG. 21 is a diagram illustrating an electric potential gradient formed in a liquid crystal element according to a first example of the present invention.

The following describes a liquid crystal element 100 according to a first example of the present invention with reference to FIG. 21. In the first example, an electric potential gradient G1, a refractive index gradient g1, and a refracting angle γ1 formed in the liquid crystal element 100 according to the first embodiment were calculated by performing a simulation under the following conditions. The distance W1 between the first electrode 1 and the second electrode 2 was 2 mm. The surface resistivity of the highly resistive layer 22 was $1\times10^{10}\Omega/\square$. The first electrode 1, the second electrode 2, and the third electrode 3 were formed from ITO. The insulating layer 21 was formed from silicon dioxide ($SiO_2$). The highly resistive layer 22 was formed from a compound containing zinc oxide (ZnO) as a major component. The liquid crystal of the liquid crystal layer 23 was nematic liquid crystal. The thickness t of the liquid crystal layer 23 was 30 μm. The maximum amplitude V1*m* of the first voltage V1 was 1 V and the maximum amplitude V2*m* of the second voltage V2 was 2 V. The frequency f1 of the first voltage V1 and the frequency f2 of the second voltage V2 were 100 Hz.

FIG. 21 is a diagram illustrating the electric potential gradient G1 formed in the liquid crystal element 100 according to the first example. It was confirmed that the electric potential gradient G1 was formed in the liquid crystal layer 23. The electric potential gradient G1 was a smooth linear gradient with no steps. Further, the electric potential gradient G1 had no extrema. The gradient angle β1 of the refractive index gradient g1 corresponding to the electric potential gradient G1 was 0.172° and the refracting angle γ1 was 0.17°.

Second Example

Figure 22:
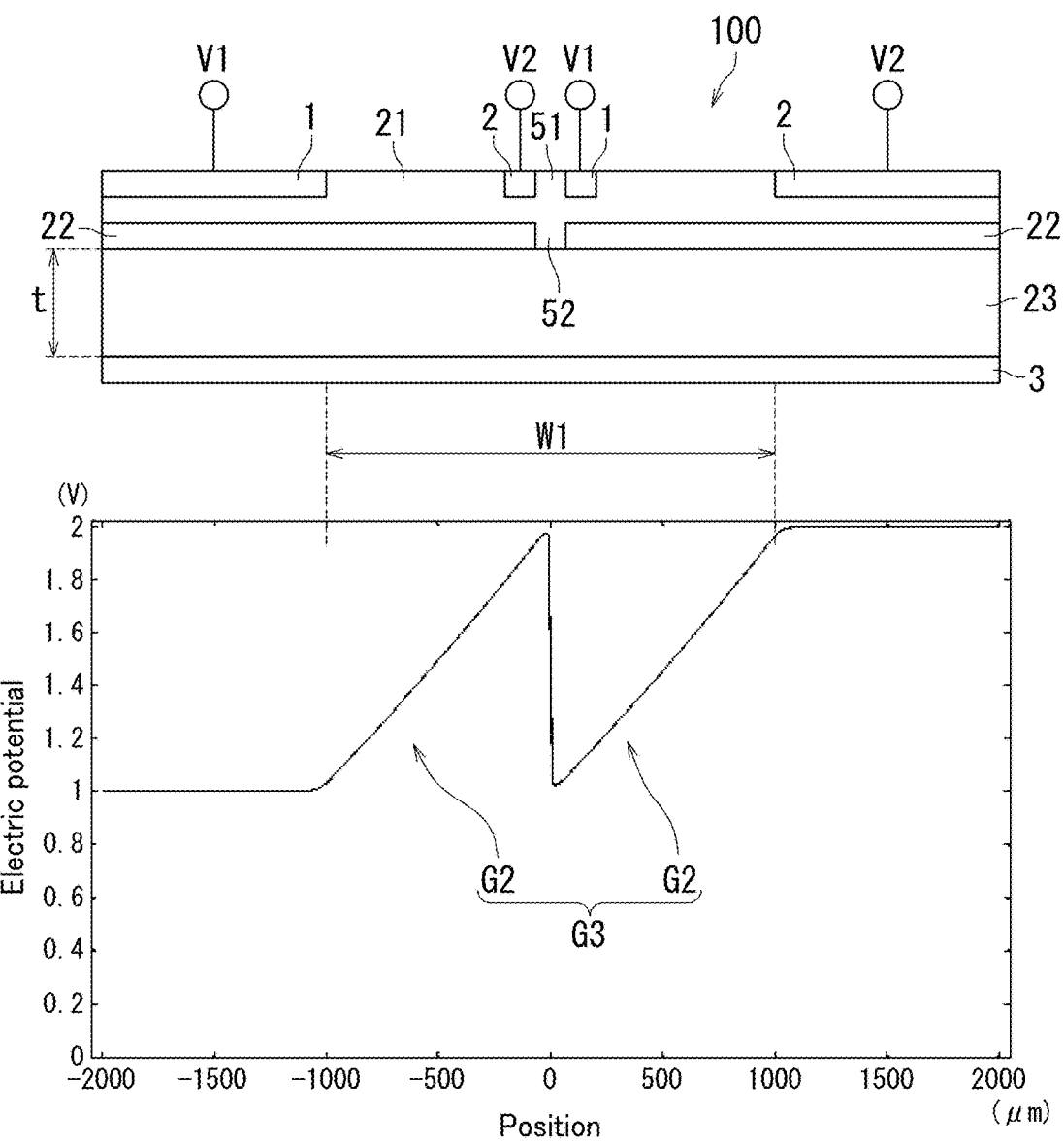
FIG. 22 is a diagram illustrating an electric potential gradient formed in a liquid crystal element according to a second example of the present invention.

The following describes a liquid crystal element 100 according to a second example of the present invention with reference to FIG. 22. In the second example, the electric potential gradient G3, the refractive index gradient g3, and the refracting angle γ2 formed in the liquid crystal element 100 according to the second embodiment were calculated by performing a simulation under the following conditions. The distance W1 between the first electrode 1 and the second electrode 2 that were farthest from each other was 2 mm. The surface resistivity of the highly resistive layers 22 was $1\times10^{10}\Omega/\square$. The maximum amplitude V1*m* of the first voltage V1 was 1 V and the maximum amplitude V2*m* of the second voltage V2 was 2 V. The frequency f1 of the first voltage V1 and the frequency f2 of the second voltage V2 were 100 Hz. The first electrodes 1, the second electrodes 2, the third electrode 3, the insulating layer 21, the highly resistive layers 22, and the liquid crystal layer 23 were formed from the same materials as those in the first example. The first boundary layer 51 and the second boundary layer 52 were formed from the same material as the insulating layer 21.

FIG. 22 is a diagram illustrating the electric potential gradient G3 formed in the liquid crystal element 100 according to the second example. It was confirmed that the serration-like electric potential gradient G3 was formed in the liquid crystal layer 23. It was also confirmed that electric potential gradients G2 included in the electric potential gradient G3 each were a smooth linear gradient with no steps. Further, the electric potential gradients G2 each had no extrema. The gradient angle β2 of the refractive index gradients g2 corresponding to the electric potential gradients G2 was about 0.6° and the refracting angle γ2 was about 0.6°. While the thickness t of the liquid crystal layer 23 was the same in the first and second examples, the gradient angle α2, the gradient angle β2, and the refracting angle γ2 in the second example were larger than those in the first example. Further, the refracting angle γ2 of about 0.6° was large enough to perform camera-shake correction of the electronic device 400.

Third Example

Figure 23:
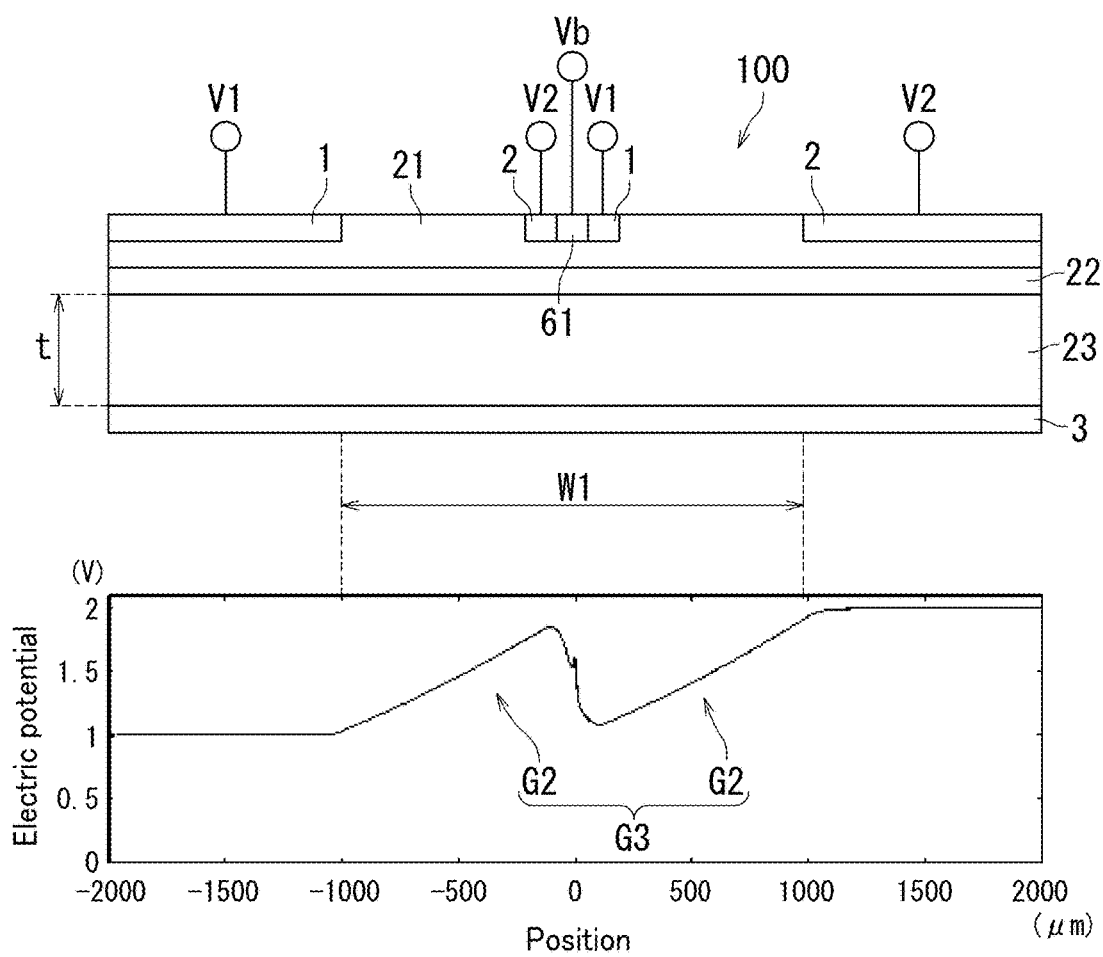
FIG. 23 is a diagram illustrating an electric potential gradient formed in a liquid crystal element according to a third example of the present invention.

The following describes a liquid crystal element 100 according to a third example of the present invention with reference to FIG. 23. In the third example, the electric potential gradient G3, the refractive index gradient g3, and the refracting angle γ2 formed in the liquid crystal element 100 according to the third embodiment were calculated by performing a simulation under the following conditions. The distance W1 between the first electrode 1 and the second electrode 2 that were farthest from each other was 2 mm. The surface resistivity of the highly resistive layer 22 was $5\times10^{9}\Omega/\square$. The boundary electrode 61 was formed from ITO. The maximum amplitude V1*m* of the first voltage V1 was 1 V. The maximum amplitude V2*m* of the second voltage V2 was 2 V. The maximum amplitude Vbm of the boundary voltage Vb was 1 V. The frequency f1 of the first voltage V1 and the frequency f2 of the second voltage V2 were 100 Hz. The frequency fb of the boundary voltage Vb was 10 kHz. The first electrodes 1, the second electrodes 2, the third electrode 3, the insulating layer 21, the highly resistive layer 22, and the liquid crystal layer 23 were formed from the same materials as those in the first example.

FIG. 23 is a diagram illustrating the electric potential gradient G3 formed in the liquid crystal element 100 according to the third example. It was confirmed that the serration-like electric potential gradient G3 was formed in the liquid crystal layer 23 similarly to the second example. It was also confirmed that electric potential gradients G2 included in the electric potential gradient G3 each were a smooth linear gradient with no steps similarly to the second example. Further, the electric potential gradients G2 each had no extrema. The gradient angle β2 of the refractive index gradients g2 corresponding to the electric potential gradients G2 was about 0.6° and the refracting angle γ2 was about 0.6°. Thus, the gradient angle α2, the gradient angle β2, and the refracting angle γ2 were similar to those in the second example. While the thickness t of the liquid crystal layer 23 was the same in the first and third examples, the gradient angle α2, the gradient angle β2, and the refracting angle γ2 in the third example were larger than those in the first example similarly to the second example. Further, the refracting angle γ2 of about 0.6° was large enough to perform camera-shake correction of the electronic device 400.

Fourth Example

Figure 24:
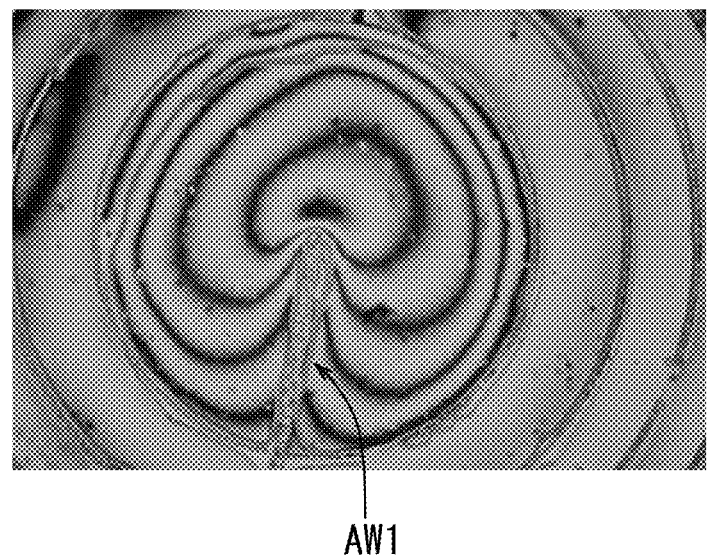
FIG. 24 illustrates interference fringes corresponding to an electric potential gradient formed in a liquid crystal element according to a fourth example of the present invention.

The following describes a liquid crystal element 100 according to a fourth example of the present invention with reference to FIG. 24. The liquid crystal element 100 according to the fourth example was obtained by providing the highly resistive layer 22 in place of the opposed layer 74 in the liquid crystal element 100 according to the variation of the fifth embodiment described above with reference to FIG. 17. Interference fringes corresponding to an electric potential gradient formed in the liquid crystal element 100 were observed using a polarizing microscope in which polarizing plates were arranged in a crossed Nicole state.

FIG. 24 illustrates the interference fringes corresponding to the electric potential gradient formed in the liquid crystal element 100 according to the fourth example. As illustrated in FIG. 24, the interference fringes having a concentric circular pattern were observed. The interference fringes having a concentric circular pattern indicated that an electric potential gradient having a concentric circular pattern (that is, a serration-like electric potential gradient that is symmetrical about a center line C) was formed in the liquid crystal element 100. Therefore, it was confirmed that a Fresnel lens can be formed in the fourth embodiment.

It should be noted that the first electrodes 1, the second electrodes 2, the third electrode 3, the first lead wire 71, and the second lead wire 72 were formed from ITO. The insulating layer 21, the first boundary layers 51, and the third boundary layer 73 were formed from silicon dioxide (SiO$_2$). The highly resistive layers 22 were formed from a compound containing zinc oxide (ZnO) as a major component. The liquid crystal of the liquid crystal layer 23 was nematic liquid crystal. The maximum amplitude V1$m$ of the first voltage V1 was 0.7 Vr.m.s. and the maximum amplitude V2$m$ of the second voltage V2 was 3.5 Vr.m.s. The frequency f1 of the first voltage V1 and the frequency f2 of the second voltage V2 were 10 kHz.

Fifth Example

Figure 25:
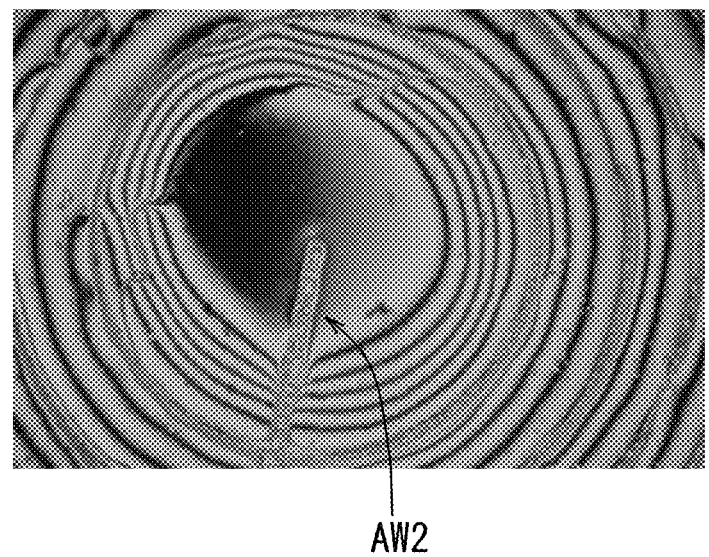
FIG. 25 illustrates interference fringes corresponding to an electric potential gradient formed in a liquid crystal element according to a fifth example of the present invention.

The following describes a liquid crystal element 100 according to a fifth example of the present invention with reference to FIG. 25. The liquid crystal element 100 according to the variation of the fifth embodiment described above with reference to FIG. 17 was used as the liquid crystal element 100 according to the fifth example. Interference fringes corresponding to an electric potential gradient formed in the liquid crystal element 100 were observed using a polarizing microscope in which polarizing plates were arranged in a crossed Nicole state.

FIG. 25 illustrates the interference fringes corresponding to the electric potential gradient formed in the liquid crystal element 100 according to the fifth example. As illustrated in FIG. 25, the interference fringes having a concentric circular pattern were observed. The interference fringes having a concentric circular pattern indicated that an electric potential gradient having a concentric circular pattern (that is, a serration-like electric potential gradient that is symmetrical about a center line C) was formed in the liquid crystal element 100. Therefore, it was confirmed that a Fresnel lens can be formed in the fifth embodiment.

The fifth example was compared with the fourth example. As illustrated in FIGS. 24 and 25, the concentric circular pattern of the interference fringes of the fifth example was less distorted than the concentric circular pattern of the interference fringes of the fourth example. Therefore, it was confirmed that the electric potential gradient formed in the fifth example had a more precise concentric circular pattern than the electric potential gradient formed in the fourth example. It was confirmed that as a result of the above, the Fresnel lens that can be formed in the fifth example is more precise than the Fresnel lens that can be formed in the fourth example. That is, effectiveness of the opposed layer 74 provided in the fifth example was confirmed.

Also, as illustrated in FIG. 24, a band-like interference fringe indicated by an arrow AW1 was observed in the fourth example. The band-like interference fringe was observed at a location corresponding to the first lead wire 71, the third boundary layer 73, and the second lead wire 72. By contrast, as illustrated in FIG. 25, a band-like interference fringe indicated by an arrow AW2 was observed in the fifth example. The band-like interference fringe was observed at a location corresponding to the first lead wire 71, the third boundary layer 73, and the second lead wire 72.

The band-like interference fringe in the fifth example had a smaller width than the band-like interference fringe in the fourth example. The smaller width of the band-like interference fringe indicated reduction of influence of the first lead wire 71 and the second lead wire 72. The influence of the first lead wire 71 and the second lead wire 72 refers to influence of the first lead wire 71 and the second lead wire 72 on the electric potential gradient of the liquid crystal element 100. That is, it was confirmed that the influence of the first lead wire 71 and the second lead wire 72 on the electric potential gradient was reduced in the fifth example due to the presence of the opposed layer 74.

The liquid crystal element 100 according to the fifth example was the same as the liquid crystal element 100 according to the fourth example other than the presence of the opposed layer 74. The opposed layer 74 was formed from the same material as the insulating layer 21.

Through the above, the embodiments and the examples of the present invention have been described with reference to the drawings (FIGS. 1A to 25). However, it should be noted that the present invention is not limited to the above embodiments and examples and is practicable in various manners within a scope not departing from the gist of the present invention (for example, as described below in sections (1) to (12)). The drawings schematically illustrate elements of configuration in order to facilitate understanding, and properties of elements of configuration illustrated in the drawings, such as thicknesses, lengths, and numbers thereof, may differ from actual properties thereof in order to facilitate preparation of the drawings. Furthermore, properties of the elements of configuration described in the above embodiments, such as shapes and dimensions, are merely examples and are not intended as specific limitations. Various alterations may be made so long as there is no substantial deviation from the effects of the present invention.

(1) While the second boundary layer 52 in the second embodiment is an electrical insulator, the second boundary layer may be a resistor having an electric resistivity (for example, surface resistivity) higher than an electric resistivity of the highly resistive layer 22. Also, while the opposed layer 74 in the fifth embodiment and the variation thereof is an electric insulator, the opposed layer may be a resistor having an electric resistivity higher than the electric resistivity of the highly resistive layer 22.

(2) While the two unit electrodes 10 are provided in the second and third embodiments, more than two unit electrodes 10 may be provided. In this case, in the second embodiment, the first boundary layers 51 are each provided between mutually adjacent unit electrodes 10 and the second boundary layers 52 are provided so as to face the respective first boundary layers 51. Also, in the third embodiment, the boundary electrodes 61 are each provided between mutually adjacent unit electrodes 10. In a configuration in which a plurality of unit electrodes 10 are provided, the maximum amplitude V1$m$ and the frequency f1 of the first voltage V1 and the maximum amplitude V2$m$ and the frequency f2 of the second voltage V2 may be controlled independently for each unit electrode 10. Also, the maximum amplitude Vbm and the frequency fb of the boundary voltage Vb may be controlled for each boundary electrode 61. Similarly to the above, in a configuration in which a plurality of unit electrodes rn are provided as in the fourth embodiment, the maximum amplitude V1$m$, the frequency f1, the maximum amplitude V2$m$, the frequency f2, the maximum amplitude Vbm, and the frequency fb can be controlled in any manner.

The gradient angle $\alpha 2$, the gradient angle $\beta 2$, and the refracting angle $\gamma 2$ can be increased by increasing the number of unit electrodes 10 without varying a distance between a first electrode 1 and a second electrode 2 that are farthest from each other. In this case, the gradient angle $\alpha 2$, the gradient angle $\beta 2$, and the refracting angle $\gamma 2$ can be increased while reducing an increase in the thickness t of the liquid crystal layer 23 or keeping the thickness t unchanged.

(3) While the five unit electrodes rn are provided in the fourth embodiment, the fifth embodiment, and the variation thereof, the number of the unit electrodes rn is not limited to five so long as at least one unit electrode rn is provided. Also, while structure similar to the structure of the liquid crystal element 100 according to the second embodiment is adopted in the fourth embodiment, structure similar to the structure of the liquid crystal element 100 according to the third embodiment may be adopted.

(4) While the liquid crystal element 100 according to the first embodiment is adopted as the liquid crystal element 100A and the liquid crystal element 100B in the sixth embodiment, the liquid crystal element 100 according to the second embodiment or the third embodiment may be adopted. Also, the liquid crystal element 100B may be inverted upside down while maintaining the positional relationship of the first electrode 1 and the second electrode 2 in the front-rear direction.

(5) While the deflection element 250 according to the sixth embodiment is adopted in the seventh embodiment and the eighth embodiment, the liquid crystal element 100 according to the first embodiment, the second embodiment, the third embodiment, the fourth embodiment, or the fifth embodiment (including the variation thereof) may be adopted in place of the deflection element 250. For example, in a configuration in which the liquid crystal element 100 according to the fourth embodiment is adopted in place of the deflection element 250 in the seventh embodiment and the eighth embodiment, focus control that realizes a wide operation range can be performed in the electronic device 400.

(6) While the first voltage V1, the second voltage V2, and the boundary voltage Vb are square waves in the first through eighth embodiments, these voltages may be for example triangular waves, sine waves, or serration-like waves.

(7) The first electrode 1, the second electrode 2, and/or the third electrode 3 in the first embodiment need not be transparent. The third electrode 3 in the second through eighth embodiments need not be transparent. The first electrode(s) 1, the second electrode(s) 2, the third electrode 3, the first boundary layer(s) 51, the second boundary layer(s) 52, the boundary electrode 61, the insulating layer 21, the first lead wire 71, the second lead wire 72, the third boundary layer(s) 73, the opposed layer 74, and/or the core electrode 75 in the first through eighth embodiments may be semitransparent.

(8) While the liquid crystal element 100 is used as a transmission type liquid crystal element in the first through third embodiments, the liquid crystal element 100 may be used as a reflection type liquid crystal element (for example, liquid crystal on silicon (LCOS)). In this case, for example the third electrode 3 is formed from silicon. Also, the liquid crystal elements 100 according to any of the first through fifth embodiments (including the variation) may be arranged in a straight line or in a grid-like pattern. Also, the deflection elements 250 according to the sixth embodiment may be arranged in a straight line or in a grid-like pattern.

(9) While the maximum amplitude V1$m$ of the first voltage V1, the maximum amplitude V2$m$ of the second voltage V2, and the maximum amplitude Vbm of the boundary voltage Vb are controlled in the first through eighth embodiments, root mean square values of the first voltage V1, the second voltage V2, and the boundary voltage Vb may be controlled.

(10) As a material of the first electrode(s) 1, the second electrode(s) 2, the third electrode 3, the boundary electrode 61, the center electrode rc, the first lead wire 71, the second lead wire 72, and the core electrode 75 in the first through eighth embodiments, for example, indium-tin oxide or a material having a resistivity and a light transmittance equivalent to those of indium-tin oxide may be used. Also, aluminum, chromium, and other highly conductive metallic materials may be used so long as light utilization efficiency is not impaired. As a material of the insulating layer 21, the first boundary layer(s) 51, and the third boundary layer 73, for example, silicon dioxide, lower oxide of silicon dioxide, zinc sulfide, silicon nitride, a silicon-aluminum-oxygen-nitrogen compound or transparent material equivalent to these materials may be used. As a material of the second boundary layer(s) 52 and the opposed layer 74, for example, the same material as the first boundary layer(s) 51, polyimide that is used as an alignment material for a liquid crystal material, or a transparent material equivalent to polyimide may be used.

As a material of the highly resistive layer(s) 22, for example, a zinc oxide-aluminum oxide-magnesium oxide compound may be used. Also, a compound obtained by adding copper oxide and/or germanium oxide to zinc oxide or a transparent material having electrical conductivity equivalent to a semiconductor may be used. It should be noted that the electric potential gradient G1, the electric potential gradient G3, and the electric potential gradient GF are difficult to form in a situation in which the highly resistive layer(s) 22 is/are formed from an electrical insulator. As the liquid crystal forming the liquid crystal layer 23, for example, nematic liquid crystal, cholesteric liquid crystal, smectic liquid crystal, or a complex material of one of these liquid crystal materials and a high molecular compound may be used.

(11) The liquid crystal element 100 according to the fourth embodiment may include the core electrode 75 in the variation of the fifth embodiment. In this case, a convex Fresnel lens can be formed by setting the maximum amplitude V2$m$ of the second voltage V2 larger than the maximum amplitude V1$m$ of the first voltage V1. By contrast, a concave Fresnel lens can be formed by setting the maximum amplitude V2$m$ of the second voltage V2 smaller than the maximum amplitude V1$m$ of the first voltage V1. The convex Fresnel lens and the concave Fresnel lens can be easily formed from the single liquid crystal element 100 by controlling the maximum amplitudes V1$m$ and V2$m$.

(12) In the present description and claims, the term straight line encompasses a substantially straight line in addition to a straight line in a strict sense. The term circular ring shape encompasses a substantially circular ring shape in addition to a circular ring shape in a strict sense. Also, the term circular ring shape encompasses a circular ring shape including a cut part. The term concentric circular pattern encompasses a substantially concentric circular pattern in addition to a concentric circular pattern in a strict sense. The term sheet-like shape encompasses a substantially sheet-like shape in addition to a sheet-like shape in a strict sense. The term serration-like shape encompasses a substantially serration-like shape in addition to a serration-like shape in a strict sense. The term annular shape encompasses a substantially annular shape in addition to an annular shape in a strict sense. The term band-like shape encompasses a substantially band-like shape in addition to a band-like shape in a strict sense. The term curve encompasses a substantial curve in addition to a curve in a strict sense. The term grid-like pattern encompasses a substantially grid-like pattern in addition to a grid-like pattern in a strict sense.

INDUSTRIAL APPLICABILITY

The present invention provides a liquid crystal element, a deflection element, a liquid crystal module, and an electronic device, and has industrial applicability.

REFERENCE SIGNS LIST

1 First electrode
2 Second electrode
3 Third electrode
10 Unit electrode
21 Insulating layer
22 Highly resistive layer (resistive layer)
23 Liquid crystal layer
40 Controller
50 Vibration sensor
51 First boundary layer
52 Second boundary layer
61 Boundary electrode
71 First lead wire
72 Second lead wire
73 Third boundary layer
74 Opposed layer
100 Liquid crystal element
100A Liquid crystal element
100B Liquid crystal element
250 Deflection element
300 Liquid crystal module
310 Cover member
320 Imaging element
400 Electronic device
401 Housing
Rc Center electrode
r1 to r5(rn) Unit electrode

The invention claimed is:

1. A liquid crystal element that refracts light exiting therefrom, the liquid crystal element comprising:
   a first electrode to which a first voltage is applied;
   a second electrode to which a second voltage is applied, the second voltage being different from the first voltage;
   an insulating layer that is an electrical insulator;
   a resistive layer;
   a liquid crystal layer containing liquid crystal;
   a third electrode to which a third voltage is applied;
   a first boundary layer that is an electrical insulator; and
   a second boundary layer that faces the first boundary layer with the insulating layer therebetween, wherein
   the insulating layer is located among the first electrode, the second electrode, and the resistive layer, and insulates the first electrode, the second electrode, and the resistive layer from one another,
   the resistive layer has an electric resistivity higher than each of electric resistivities of the first electrode and the second electrode, and lower than an electric resistivity of the insulating layer,
   the resistive layer and the liquid crystal layer are located between the insulating layer and the third electrode,
   the resistive layer is located between the insulating layer and the liquid crystal layer,
   the second boundary layer is a resistor having an electric resistivity higher than the electric resistivity of the resistive layer or an electrical insulator,
   the first electrode and the second electrode constitute a unit electrode,
   the unit electrode includes a plurality of unit electrodes,
   a second electrode of one unit electrode of mutually adjacent unit electrodes among the plurality of unit electrodes is adjacent to a first electrode of the other unit electrode of the mutually adjacent unit electrodes,
   the first boundary layer is located between the second electrode and the first electrode that are adjacent to each other,
   the resistive layer includes a plurality of resistive layers corresponding to the plurality of unit electrodes, and
   the second boundary layer is located between mutually adjacent resistive layers among the plurality of resistive layers.

2. The liquid crystal element according to claim 1, wherein
   the first electrode and the second electrode linearly extend side by side.

3. The liquid crystal element according to claim 2, wherein
   the liquid crystal layer has a linear electric potential gradient relative to a direction from the first electrode to the second electrode for each of the plurality of unit electrodes.

4. The liquid crystal element according to claim 1, further comprising a center electrode having a circular ring shape, wherein
   the center electrode and the plurality of unit electrodes are in concentric circular arrangement centered about the center electrode, in each of the plurality of unit electrodes, the unit electrode has a width that indicates a distance between the first electrode and the second electrode, and in each of the plurality of unit electrodes, the second electrode has a radius larger than a radius of the first electrode.

5. The liquid crystal element according to claim 4, wherein in mutually adjacent unit electrodes among the plurality of unit electrodes, a unit electrode having a larger radius than the other unit electrode has a width smaller than a width of the other unit electrode having a smaller radius, in each of the plurality of unit electrodes, the radius of the second electrode represents a radius of the unit electrode.

6. The liquid crystal element according to claim 5, wherein a radius Rn of each of the plurality of unit electrodes is represented by an expression shown below, where n represents an integer from 1 to N assigned to the respective plurality of unit electrodes incrementally from a unit electrode having a smallest radius to a unit electrode having a largest radius among the plurality of unit electrodes, N represents the number of the plurality of unit electrodes, and Rc represents a radius of the center electrode $Rn=(n+1)^{1/2} \times Rc$.

7. The liquid crystal element according to claim 1, further comprising:

a first lead wire to which the first voltage is applied;

a second lead wire to which the second voltage is applied;

a third boundary layer that is an electrical insulator, the third boundary layer being located between the first lead wire and the second lead wire; and an opposed layer that is a resistor having an electric resistivity higher than the electric resistivity of the resistive layer or an electrical insulator, wherein the first electrode and the second electrode each have a shape of an open curve, one end of opposite ends of the first electrode is connected to the first lead wire, the other end of the opposite ends of the first electrode is located opposite to the second lead wire, one end of opposite ends of the second electrode is connected to the second lead wire, the other end of the opposite ends of the second electrode is located opposite to the first lead wire, and the opposed layer is located opposite to the first lead wire, the third boundary layer, and the second lead wire with the insulating layer therebetween.

8. The liquid crystal element according to claim 1, wherein a distance between the first electrode and the second electrode of the unit electrode is larger than each of a width of the first electrode and a width of the second electrode.

9. A deflection element that deflects light exiting therefrom, the deflection element comprising two liquid crystal elements each being the liquid crystal element according to claim 1, wherein the first electrode and the second electrode of one liquid crystal element of the two liquid crystal elements extend along a first direction, the first electrode and the second electrode of the other liquid crystal element of the two liquid crystal elements extend along a second direction orthogonal to the first direction, and the one liquid crystal element and the other liquid crystal element overlap with each other.

10. A liquid crystal module comprising:

the liquid crystal element according to claim 1; and a cover member covering an imaging element, wherein the liquid crystal element is attached to an outer surface portion of the cover member to be located opposite to an imaging surface of the imaging element.

11. An electronic device comprising:

the liquid crystal element according to claim 1;

an imaging element;

a cover member covering the imaging element; and a housing accommodating the liquid crystal element, the imaging element, and the cover member, wherein the liquid crystal element is attached to an inner surface portion of the housing to be located opposite to an imaging surface of the imaging element.

12. An electronic device, comprising:

the liquid crystal element according to claim 1;

an imaging element configured to image an object through the liquid crystal element;

a vibration sensor configured to detect vibration due to camera shaking; and a controller configured to control either or both of the first voltage and the second voltage depending on vibration detected by the vibration sensor to refract light incident on the imaging element through the liquid crystal element.

* * * * *